US006307681B1

(12) United States Patent

Aoki et al.

(10) Patent No.: US 6,307,681 B1
(45) Date of Patent: Oct. 23, 2001

(54) ELECTRO-OPTICAL DEVICE, ELECTRONIC EQUIPMENT, AND METHOD OF DRIVING AN ELECTRO-OPTICAL DEVICE

(75) Inventors: Toru Aoki, Shiojiri; Chiharu Kaburagi, Chino, both of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/233,025

(22) Filed: Jan. 20, 1999

(30) Foreign Application Priority Data

Jan. 23, 1998 (JP) ........................................ 10-011560
Mar. 24, 1998 (JP) ........................................ 10-076335
Jan. 19, 1999 (JP) ........................................ 11-010718

(51) Int. Cl.[7] ........................................ G02B 25/00
(52) U.S. Cl. ........................ 359/645; 340/825.79; 345/94
(58) Field of Search ...................... 359/645; 340/825.79, 340/825.82; 345/94

(56) References Cited

U.S. PATENT DOCUMENTS 4,823,121 * 4/1989 Sakamoto et al. .................. 340/781
5,952,861 * 9/1999 Kim et al. .......................... 327/227
5,959,600 * 9/1999 Unchino et al. ...................... 354/94

FOREIGN PATENT DOCUMENTS 7-295520 11/1995 (JP) .
7-295521 11/1995 (JP) .
9-50263 2/1997 (JP) .

* cited by examiner

*Primary Examiner*—Georgia Epps
*Assistant Examiner*—Timothy Thompson
(74) *Attorney, Agent, or Firm*—Oliff & Berridge, PLC

(57) ABSTRACT

The present invention provides an electro-optical apparatus which, produce precharge signals PV1 and PV2 to be supplied to a precharge signal line using, for example, a differentiating circuit, outputs a peak at the rising edge or the falling edge of each signal with its successive portion progressively attenuating, and prevents the generation of luminance non-uniformity and chrominance non-uniformity attributed to parasitic capacitance and the like in a supply path of the precharge signal prior to the writing of an image signal.

26 Claims, 29 Drawing Sheets

ELECTRO-OPTICAL DEVICE, ELECTRONIC EQUIPMENT, AND METHOD OF DRIVING AN ELECTRO-OPTICAL DEVICE

BACKGROUND OF THE INVENTION

1. Field of the Invention

The present invention relates to an electro-optical apparatus, an electronic apparatus and the method for driving the electro-optical apparatus and, more particularly, to an electro-optical apparatus that precharges a data line prior to the writing of an image signal, the method for driving the electro-optical apparatus, and an electronic apparatus that incorporates the electro-optical apparatus.

2. Description of Related Art

One example of electro-optical apparatus is a liquid-crystal apparatus employing an active-matrix driving method based on thin-film transistors (hereinafter referred to as TFTs). Japanese Unexamined Patent Publication No. 2-204718 discloses a liquid-crystal apparatus that includes —liquid-crystal pixels disposed in a matrix form, thin-film transistors for driving its respective liquid-crystal pixels, rows of scanning lines and columns of data lines. In this liquid-crystal apparatus, the scanning lines, data lines and pixel electrodes corresponding to each cross of scanning lines with data lines are arranged on a TFT array substrate. Besides these elements, the TFT array substrate includes a diversity of peripheral devices, specifically peripheral circuits such as a sampling circuit, a precharge circuit, a scanning line driving circuit, a data line driving circuit, and a check circuit.

The scanning line driving circuit selects one row of liquid-crystal pixels every horizontal scanning period by scanning a plurality of scanning lines on a line-at-a-time basis. The data line driving circuit successively samples image signals to be supplied to each data line during one horizontal scanning period, and writes the image signal on the one row of liquid-crystal pixels selected by the scanning line driving circuit, on a point-at-a-time basis. To assist the writing of the image signal to the liquid-crystal pixels, the precharge circuit performs a precharge operation to write a predetermined potential to the one row of liquid-crystal pixels prior to the writing of the image signal by the data line driving circuit.

More specifically, the precharge circuit is a circuit that supplies the data line with a precharge signal (preliminary charging signal) prior to the timing at which the data line driving circuit supplies the image signal to the data line via the sampling circuit, with the purpose of enhancing a contrast ratio, stabilizing the potential level of the data line, and reducing an on-screen line non-uniformity. The precharge operation helps reduce the load of the data line driving circuit when it writes the image signal onto the data line.

Particularly when a so-called line inversion driving method commonly performed to AC-drive the liquid crystal, namely, a method in which the polarity of the voltage of the data line is inverted every predetermined period, is employed, the supply amount of charge required to write the image signal onto the data line can be substantially reduced by writing beforehand the precharge signal onto the data line in the precharge operation. One example of such a precharge circuit is disclosed, for example, in Japanese Unexamined Patent Publication No. 7-295520.

In the conventional liquid-crystal apparatus, a TFT in the precharge circuit is connected to each precharge signal line for receiving the precharge signal. The precharge signal line is connected to a large capacitance component and a large resistance component arising from the capacitance between the gate and source/drain in the TFT and the resistance of the wiring for the data line.

The precharge operation is carried out by concurrently writing a predetermined potential to the data lines and one row of liquid-crystal pixels. When the precharge signal is written in this way, a large current instantaneously flows through the precharge signal line. The wiring resistance of the precharge signal line and the capacitance component attached to the signal line increase as the wiring length of the precharge signal line becomes long in step with an increasing size of a liquid-crystal panel. As the wiring resistance and the capacitance component increase, the precharge signal is more subject to a delay. Furthermore, the larger the panel size, the more delay the precharge signal is subject to.

When a circuit arrangement with the precharge signal supplied from one end of the precharge signal line is employed, the precharge signal is more distorted in its waveform due to the signal delay and the voltage of the signal tends to drop, as the precharge signal travels further from the input end of the line. As a result, the supply amount of charge written on the data line during a predetermined precharge period becomes different depending on the distance between the input end for the precharge signal and the location of each data line.

The problem of the signal delay arises not only in the precharge signal line, but also in a precharge circuit driving signal line, namely, a signal line for supplying a precharge circuit driving signal that determines the timing of supplying the precharge signal. The precharge circuit driving signal line is the signal line connected to the gate of each TFT in the precharge circuit. The writing of the precharge signal is executed for a predetermined period, by supplying a gate signal having a predetermined pulse width to the precharge circuit driving signal line.

In the circuit in which the gate signal is supplied from one end of the precharge circuit driving signal line, the gate signal is deformed in its waveform due to the signal delay on the line and the voltage of the signal tends to drop, as the gate signal travels further from the input end of the precharge circuit driving signal line. In an area where the gate signal fails to rise sufficiently in voltage, the period during which the TFT in the precharge circuit is turned on gets shorter, and the data line is not sufficiently charged up to the precharge potential. As a result, the supply amount of charge at the data line with the precharge signal supplied becomes different depending on the layout location of each data line.

When the amount of charge which is written onto the data line by the precharge signal during the precharge period is different depending on the layout position of each data line, a potential difference takes place at the data lines subsequent to the supply of the respective image signal even if the data lines are supplied with the image signal of the same potential. The potential difference from data line to data line causes non-uniformity in luminance (transmittance ratio) in the screen of a liquid-crystal apparatus.

The luminance non-uniformity becomes problematic, particularly, in a three-panel type projector. Known as one of electro-optical apparatuses is a three-panel type projector which, employing three identically constructed liquid-crystal panels, synthesizes the three primary color lights modulated through the three liquid-crystal panels to present a color image. The projector synthesizes two primary color images which are optically inverted (hereinafter referred to as "inverted images") after being transmitted through liquid-crystal panels and one primary color image which is not optically inverted (hereinafter referred to as "non-inverted image") after being transmitted through a liquid-crystal panel, thereby producing a color image.

When the transmittance ratio of the liquid-crystal panel is different between one pixel close to and another pixel far from the input terminal side for the precharge signal, the non-uniformity in transmittance ratio in the inverted image and the non-uniformity in transmittance ratio in the non-inverted image appear at different locations. A synthesized image, based on these images, presents therefore a difference in transmittance ratio which each of the three primary color images suffers. Each liquid-crystal panel modulates its particular color light, and if there appears, on the synthesized image, a difference in transmittance ratio in each of the three primary color images, no correct color reproduction is performed, and a chrominance non-uniformity occurs between a left-hand side portion and a right-hand side portion of the synthesized image.

As described above, in the conventional liquid-crystal apparatus, the luminance non-uniformity, chrominance non-uniformity or the like are created by a diversity of causes, thereby degrading the image. The vision of humans is particularly sensitive to a difference in color, and the chrominance non-uniformity is of a particular concern in a large-size and high-definition color liquid-crystal projector employing a plurality of liquid-crystal panels.

The signal delay of the precharge signal takes place not only in a large-size panel but also in a high-definition panel. Specifically, when the precharge signal is supplied to the data line from the precharge signal line, a large charging and discharging current instantaneously flows through an opposite electrode of each liquid-crystal pixel (a common electrode that is diametrically opposed to a corresponding pixel electrode of each pixel with a liquid-crystal layer interposed between the opposite electrode and the pixel electrode), a capacitance electrode (an electrode that is diametrically opposed to the pixel electrode of each pixel with an insulating film interposed between the capacitance electrode and the pixel electrode, forming a storage capacitor), and other elements.

The higher the definition of the panel, the narrower the width of wiring of the panel, and the higher the wiring resistance of the opposite electrode and the capacitance electrode becomes. A large potential difference takes place in the wiring in the liquid-crystal apparatus when a large charging and discharging current flows. The potential difference decays with time at a time constant determined by the wiring resistance and the parasitic capacitance of the wiring section.

A short horizontal scanning period in the high-definition panel makes it difficult to set up a period for the voltage difference to decay therewithin. Because of its shorter signal period, the high-definition panel results in a relatively high inductance component in the wiring in the panel, possibly creating an oscillation while the charging and discharging current flows, and thereby suffers difficulty decaying the potential difference in the electrodes. For this reason, when the panel is a high-definition one, problems such as a degradation in contrast attributed to variations of precharged charge arise. Furthermore, when there are above-described variations in the amount of precharged charge, the device is subject to erratic operations because of variations in the potential of the opposite electrode, the potential of the capacitance electrode, and the GND potential of the circuit, and because of radiated noise that is created by the charging and discharging current to the electrodes or the like of these potentials.

SUMMARY OF THE INVENTION

The present invention has been developed in light of the foregoing problems, and it is a first object of the present invention to provide an electro-optical apparatus that controls the generation of a non-uniformity in luminance (transmittance ratio) or a chrominance non-uniformity, attributed to the parasitic capacitance, wiring resistanceor the like in the supply path of a precharge signal to a data line.

It is a second object of the present invention to provide an electronic apparatus that incorporates the electro-optical apparatus.

Furthermore, it is a third object of the present invention to provide a method for driving the electro-optical apparatus that controls the generation of a non-uniformity in luminance (transmittance ratio) or a chrominance non-uniformity, attributed to the parasitic capacitance, wiring resistanceor the like in the supply path of a precharge signal to a data line.

The electro-optical apparatus of the present invention, having a plurality of data lines, and a plurality of pixels to which an image signal is supplied through the plurality of data lines, includes a precharge signal line for transmitting a precharge signal, a precharge circuit for supplying the precharge signal to the plurality of data lines through a plurality of switching means, each of which is arranged between each of the plurality of data lines and the precharge signal line, prior to the supplying of the image signal to the data lines, and precharge signal supply means for changing continuously or stepwise the potential level of the precharge signal to be supplied to the plurality of data lines to supply the precharge signal to the precharge signal line.

With this arrangement, when the precharge signal supply means supplies the precharge signal line with the precharge signal, the precharge circuit supplies the precharge signal to the respective data lines prior to the supplying of the image signal to the data lines. The potential at each data line changes to a potential close to the image signal, reducing the load imposed during the writing of the image signal. When the precharge signal line becomes long, the parasitic capacitance and wiring resistance in the precharge signal line increases given a constant precharge signal voltage, and a time constant of these elements deforms the waveform of the precharge signal, and as a result, the amount of charge written onto the respective data lines during a fixed precharge period differs from data line to data line.

According to the present invention, however, the precharge signal supply means changes continuously or stepwise the potential level of the precharge signal within a predetermined period and then supplies it to the precharge signal line. The waveform of the precharge signal is changed so that, as a result of the precharge signal waveform deformed due to a delay caused by a wiring, the potential level of the precharge signal waveform remains substantially constant.

For example, if the voltage is heightened at the start of the precharge followed by a lowered voltage portion, the time constant, that works as a cause for delay by the capacitance component and resistance component associated with the precharge signal line, is almost offset by the high-voltage portion, and the amount of charge that is written on the data lines by the precharge signal suffers almost no difference between the data lines when the image signal is written on the data lines. The data lines have substantially uniform potential levels in the direction of layout, and luminance (transmittance ratio) non-uniformity and chrominance non-uniformity are compensated or prevented. In the following discussion, for simplicity, the control of the luminance non-uniformity or the like is included in the prevention of the generation of the luminance non-uniformity or the like.

Depending on the potential level of the data lines precharged by the precharge signal, the potential level of the data lines subsequent to a succeeding supply of the image signal becomes different. Taking advantage of this, the supply amount of charge precharged at the data lines is adjusted by changing the precharge signal waveform, when manufacturing variations make voltage-luminance (transmittance ratio) characteristics of the electro-optical apparatus different between a left-hand portion and a right-hand portion of the screen in the direction of data line layout (scanning direction). For example, when the voltage-luminance (transmittance ratio) characteristics are brighter in a pixel connected to the data line far from the supply end for the precharge signal than in a pixel close to the supply end in a normally white mode liquid-crystal panel, the precharge signal waveform is changed to increase the supply amount of charge to the pixels (data lines) by the precharge signal. In this case, if the voltage level of the precharge signal is progressively increased, more charge is supplied to a data line farther from an input terminal than to a data line closer to the input terminal, and thereby the transmittance ratio is equalized or set to be close to a uniform state. In the following description, for simplicity, making the transmittance ratio closer to a uniform state is included in the equalization of the transmittance ratio.

Since the voltage of the precharge signal is stepwise changed with this arrangement, the charging and discharging current for the data lines by the precharge signal is spread with time and their peak values are lowered. According to the present invention, variations in the potential of the opposite electrode, the potential of the capacitance electrode and the GND potential of the circuit are reduced, noise radiation is controlled, and an erratic operation of the device is thus prevented.

In the electro-optical device of the present invention, the precharge signal, supplied by the precharge signal supply means, has preferably a signal waveform in which the signal voltage level of the precharge signal becomes progressively lower.

With this arrangement, the precharge signal has a waveform with a peak value at its rising edge followed by its progressively attenuating portion. The peak voltage of the precharge signal cancels out the time constant of the signal delay caused by the capacitance component and resistance component associated with the precharge signal line, and the respective data lines are approximately equal to each other in level in the amount of charge written thereon. In this way, the differences in the capacitance component and resistance component associated with the precharge signal line are canceled out, and no difference in the amount of charge between the data lines occurs when the image signal is written onto the data lines. Accordingly, the respective data lines are at a uniform potential level in the direction of layout, and the generation of the luminance non-uniformity and chrominance non-uniformity is thus prevented.

As already described, taking advantage of the fact that the potential level of the data lines subsequent to a succeeding supply of the image signal becomes different, depending on the potential level of the data lines precharged by the precharge signal, when the voltage-luminance (transmittance ratio) characteristics of the electro-optical apparatus are brighter in a screen area closer to the supply terminal for the precharge signal in the normally white mode, the precharge signal is enlarged in its first half waveform so that the supply amount of charge to the data lines at precharging is adjusted to be larger on corresponding pixel areas. In this way, the luminance (transmittance ratio) on the entire screen is equalized.

In the electro-optical apparatus of the present invention, the precharge signal, supplied by the precharge signal supply means, has preferably a signal waveform in which the signal voltage level of the precharge signal becomes progressively higher.

With this arrangement, the precharge signal has a waveform that progressively rises and finally reaches its peak value. The closer the data line is to the terminating end for the precharge signal, the larger the integral value of the written precharge signal becomes, and the closer the data line is to the terminating end for the precharge signal, the greater the amount of charge written thereon becomes. Specifically, as already described, the potential level of the data lines subsequent to a succeeding supply of the image signal becomes different, depending on the potential level of the data lines precharged by the precharge signal, and when the voltage-luminance (transmittance ratio) characteristics of the electro-optical apparatus are different between a left-hand portion and a right-hand portion of the screen in the direction of data line layout (scanning direction), the supply amount of charge precharged to the data lines is adjusted by progressively enlarging the precharge signal waveform. For example, when the luminance (transmittance ratio) is brighter in a pixel connected to the data line far from the supply end for the precharge signal than in a pixel close to the supply end in a normally white mode liquid-crystal panel, the precharge signal waveform is changed to increase the supply amount of charge to the pixels (data lines) by the precharge signal. In this case, if the voltage level of the precharge signal is progressively increased, more charge is supplied to a data line farther from an input terminal than to a data line closer to the input terminal, and thereby the transmittance ratio is equalized. The generation of the luminance non-uniformity and chrominance non-uniformity is thus prevented.

In the electro-optical apparatus of the present invention, the precharge signal, supplied by the precharge signal supply means, has preferably a pulse waveform.

With this arrangement, the precharge signal has a pulse waveform with a pulse width extending within a precharge period, and in the course of the transmission of the precharge signal line, the precharge signal has a waveform with a peak value at its rising edge followed by a progressively attenuating portion when the pulse is positioned at a leading edge of the precharge period, and the precharge signal has a waveform rising progressively and reaching finally its peak value when the pulse is positioned at a trailing edge of the precharge period. The precharge signal has an inverted-V-shaped waveform if the pulse is positioned in the middle of the precharge period. Depending on the position of the pulse within the precharge period, the supply amount of charge to a plurality of data lines is thus adjusted. The supply amount of charge to each data line by precharge is thus rendered uniform, and the generation of the luminance non-uniformity and chrominance non-uniformity is thus prevented.

As already described, taking advantage of the fact that the potential level of the data lines subsequent to a succeeding supply of the image signal becomes different, depending on the potential level of the data lines precharged by the precharge signal, when the voltage-luminance (transmittance ratio) characteristics of the electro-optical apparatus are brighter in a screen area closer to the supply terminal for the precharge signal in the normally white mode, the precharge signal is enlarged in its first half waveform so that the supply amount of charge to the data lines at precharging is adjusted to be larger on corresponding pixel areas. In this way, the luminance (transmittance ratio) on the entire screen is equalized.

In the electro-optical apparatus of the present invention, signal supplying is preferably made at both ends of a precharge circuit driving signal line for transmitting a driving signal to the plurality of switching means of the precharge circuit and at both ends of the precharge signal line.

With this arrangement, the precharge circuit drive signal line and the precharge signal line are routed on the substrate so that both ends, in the direction of layout, of each of the plurality of data lines are connected to the precharge circuit, and the capacitance component and resistance component, associated with the wiring of the signal line, viewed from the input terminals at both ends, are halved, and the deformation of the signal waveform is thus reduced. As a result, the luminance non-uniformity and chrominance non-uniformity are efficiently reduced.

In the electro-optical apparatus of the present invention, the precharge circuit causes preferably the plurality of switching means to concurrently conduct.

Since, with this arrangement, the precharge circuit causes the switching means to concurrently conduct, parasitic capacitance of all data lines is attached to the precharge signal line, but as described above, the precharge signal supply means supplies, to the precharge signal line, the precharge signal that changes continuously or stepwise to compensate for the potential level difference between the respective data lines arising from the effect of parasitic capacitance. With the precharge signal concurrently supplied, control is simplified while the luminance non-uniformity and chrominance non-uniformity are lowered.

In the electro-optical apparatus of the present invention, the precharge circuit causes preferably the switching means to conduct in a predetermined sequence prior to the timing of supplying the image signal to the data lines, and the precharge signal supply means changes preferably the precharge signal continuously or stepwise within one horizontal scanning period.

With this arrangement, the precharge circuit supplies the data lines with the precharge signal in the predetermined sequence and the precharge signal is appropriately written. Although, with this arrangement, the capacitance of the data lines attached to the precharge signal line through the switching means of the precharge circuit is smaller than that in the concurrent precharging, the amount of charge written on the data lines may be different from data line to data line because of the parasitic capacitance of the precharge signal line and the parasitic capacitance of the precharge circuit driving signal line. According to the present invention, however, even when the precharge signal is successively written, the precharge signal supply means supplies the precharge signal that changes continuously or stepwise, and in the same manner as already described, the potential level of the precharge signal is changed with time to reduce the luminance non-uniformity and chrominance non-uniformity.

In the electro-optical apparatus of the present invention, the precharge signal supply means changes preferably the precharge signal waveform so that the potential levels of the plurality of data lines immediately subsequent to the supplying of the precharge signal are approximately equal to each other.

With this arrangement, the potential levels of the respective data lines prior to the writing of the image signal are equalized. The luminance non-uniformity and chrominance non-uniformity are thus reduced.

Preferably, the electro-optical apparatus of the present invention includes a data line driving circuit for supplying the image signal to the plurality of data lines in a predetermined sequence in accordance with a shift operation of a bidirectional shift register, wherein the precharge signal supply means modifies a change in the precharge signal in accordance with the direction of shifting of the bidirectional shift register.

With this arrangement, the bidirectional shift register of the data line driving circuit supplies bidirectionally the image signal to the data lines, permitting the image to appear inverted or the like. With this arrangement, however, depending on the transfer direction of the data line driving circuit, the luminance non-uniformity changes on the entire screen, but the change in the precharge signal is modified in accordance with the scanning direction of the bidirectional shift register. The supply amount of charge to the data lines is rendered uniform on the entire screen, and the luminance non-uniformity and chrominance non-uniformity are reduced.

An electronic apparatus of the present invention includes the electro-optical apparatus described above.

With the electro-optical apparatus incorporated, a high-quality electronic apparatus free from the luminance non-uniformity and chrominance non-uniformity is provided.

A driving method for an electro-optical apparatus of the present invention, having a plurality of data lines, and a plurality of pixels to which an image signal is supplied through the plurality of data lines, includes the steps of supplying the precharge signal to the plurality of data lines, through a plurality of switching means connected to the plurality of data lines, prior to the supplying of the image signal to the data lines, and changing continuously or stepwise the potential level of the precharge signal to be supplied to the plurality of data lines.

According to the above-described driving method, the precharge signal is supplied to each data line prior to the image signal. Since the potential of each data line gets close to a potential of the image signal, the load during the writing of the image signal is reduced. As the wiring transmitting the precharge signal is lengthened, the capacitance component and resistance component associated with the precharge signal line increase. Depending on the location of the data line, the deformation of the precharge signal waveform causes a difference in the written amount of charge from data line to data line during precharging.

In the present invention, the potential level of the precharge signal is continuously or stepwise changed within a predetermined period and is then supplied to the precharge signal line. The precharge signal waveform is changed so that the potential level of the precharge signal waveform is substantially equalized at a constant level as a result of deformation of the precharge signal waveform.

For example, if the voltage is heightened at the start of the precharge followed by a lowered voltage portion, the time constant, that works as a cause for delay by the capacitance component and resistance component associated with the precharge signal line, is almost offset by the high-voltage portion, and the amount of charge that is written on the data lines by the precharge signal suffers almost no difference between the data lines when image signals are written on the data lines. The data lines have substantially uniform potential levels in the direction of layout, and the luminance non-uniformity and chrominance non-uniformity are prevented.

As already described, depending on the potential level of the data lines precharged by the precharge signal, the potential level of the data lines subsequent to a succeeding supply of the image signal becomes different, and when the voltage-luminance (transmittance ratio) characteristics of the electro-optical apparatus is different between a left-hand portion and a right-hand portion of the screen in the direction of data line layout (scanning direction), the supply amount of charge precharged at the data lines is adjusted by changing the precharge signal waveform. For example, when the luminance (transmittance ratio) is brighter in a pixel connected to the data line far from the supply end for the precharge signal than in a pixel close to the supply end in a normally white mode liquid-crystal panel, the amount of voltage supply to the pixels (data lines) is small, and the precharge signal waveform is changed to increase the supply amount of charge to the data lines by the precharge signal. In this case, if the voltage level of the precharge signal is progressively heightened, more charge is supplied to a data line farther from an input terminal than to a data line closer to the input terminal, and thereby the transmittance ratio is rendered uniform.

Since the voltage of the precharge signal is stepwise changed with this arrangement, the charging and discharging current for the data lines by the precharge signal is spread with time and their peak values are lowered. According to the present invention, variations in the potential of the opposite electrode, the potential of the capacitance electrode and the GND potential of the circuit are reduced, noise radiation is controlled, and an erratic operation of the device is thus prevented.

In the driving method for an electro-optical apparatus of the present invention, the precharge signal has preferably a signal waveform in which the signal voltage level of the precharge signal becomes progressively lower.

According to the driving method, the precharge signal waveform reaches a peak value at its rising edge, ending with a progressively attenuating portion. The peak voltage of the precharge signal cancels out the time constant of the signal delay caused by the capacitance component and resistance component associated with the precharge signal line, and the respective data lines are approximately equal to each other in level in the amount of charge written thereon. In this way, the differences in the capacitance component and resistance component associated with the precharge signal line are canceled out, and no difference in the amount of charge between the data lines occurs when the image signal is written onto the data lines. The respective data lines are at an uniform potential level in the direction of layout, and the generation of the luminance non-uniformity and chrominance non-uniformity is thus prevented.

As already described, taking advantage of the fact that the potential level of the data lines subsequent to a succeeding supply of the image signal becomes different, depending on the potential level of the data lines precharged by the precharge signal, when the voltage-luminance (transmittance ratio) characteristics of the electro-optical apparatus are brighter in a screen area closer to the supply terminal for the precharge signal in the normally white mode, the precharge signal is enlarged in its first half waveform so that the supply amount of charge to the data lines at precharging is adjusted to be larger on corresponding pixel areas. In this way, the luminance (transmittance ratio) on the entire screen is rendered uniform.

In the driving method for an electro-optical apparatus, of the present invention, the precharge signal has preferably a signal waveform in which the signal voltage level of the precharge signal becomes progressively higher.

According to the driving method, the precharge signal has a waveform that progressively rises and finally reaches its peak value. The closer the data line is to the terminating end for the precharge signal, the larger the integral value of the written precharge signal becomes, and the closer the data line is to the terminating end for the precharge signal, the greater the amount of charge written thereon becomes. Specifically, as already described, the potential level of the data lines subsequent to a succeeding supply of the image signal becomes different, depending on the potential level of the data lines precharged by the precharge signal, and when the voltage-luminance (transmittance ratio) characteristics of the electro-optical apparatus are different between a left-hand portion and a right-hand portion of the screen in the direction of data line layout (scanning direction), the supply amount of charge precharged to the data lines is adjusted by progressively enlarging the precharge signal waveform. For example, when the luminance (transmittance ratio) is brighter in a pixel connected to the data line far from the supply end for the precharge signal than in a pixel close to the supply end in a normally white mode liquid-crystal panel, the precharge signal waveform is changed to increase the supply amount of charge to the pixels (data lines) by the precharge signal. In this case, if the voltage level of the precharge signal is progressively increased, more charge is supplied to a data line farther from an input terminal than to a data line closer to the input terminal, and thereby the transmittance ratio is rendered uniform.

In the driving method for an electro-optical apparatus of the present invention, the precharge signal has preferably a pulse waveform.

According to the driving method, the precharge signal has a pulse waveform with a pulse width extending within a precharge period, and in the course of the transmission of the precharge signal along the precharge signal line, the precharge signal has a waveform with a peak value at its rising edge followed by a progressively attenuating portion when the pulse is positioned at a leading edge of the precharge period, and the precharge signal has a waveform rising progressively and reaching finally its peak value when the pulse is positioned at a trailing edge of the precharge period. The precharge signal has an inverted-V-shaped waveform if the pulse is positioned in the middle of the precharge period. Depending on the position of the pulse within the precharge period, the supply amount of charge to a plurality of data lines is thus adjusted. The generation of the luminance non-uniformity and chrominance non-uniformity is thus prevented.

As already described, taking advantage of the fact that the potential level of the data lines subsequent to a succeeding supply of the image signal becomes different, depending on the potential level of the data lines precharged by the precharge signal, when the voltage-luminance (transmittance ratio) characteristics of the electro-optical apparatus are brighter in a screen area closer to the supply terminal for the precharge signal in the normally white mode, the precharge signal is enlarged in its first half waveform so that the supply amount of charge to the data lines at precharging is adjusted to be larger on corresponding pixel areas. In this way, the luminance (transmittance ratio) on the entire screen is rendered uniform.

In the driving method for an electro-optical apparatus of the present invention, according to one of the driving methods of the electro-optical apparatus described above, the precharge signal is preferably supplied from both ends of a supply wiring that supplies the precharge signal to the precharge circuit.

According to the driving method, the precharge circuit driving signal line and the precharge signal line are routed on the substrate so that both ends, in the direction of layout, of each of the plurality of data lines are connected to the precharge circuit, and the capacitance component and resistance component, associated with the signal wiring, viewed from the input terminals at both ends, are halved, and the deformation of the signal waveform is thus reduced. As a result, the luminance non-uniformity and chrominance non-uniformity are efficiently reduced.

In the driving method for an electro-optical apparatus of the present invention, the plurality of switching means preferably become concurrently conductive when the precharge signal is supplied.

Since the precharge circuit causes the switching means to concurrently conduct according to the driving method, parasitic capacitance of all data lines is attached to the precharge signal line, but as described above, the precharge signal supply means supplies, to the precharge signal line, the precharge signal that changes continuously or stepwise to compensate for the potential level difference between the respective data lines arising from the effect of parasitic capacitance. With the precharge signal concurrently supplied, control is simplified while the luminance non-uniformity and chrominance non-uniformity are lowered.

In the driving method for an electro-optical apparatus of the present invention, the switching means preferably become conductive in a predetermined sequence prior to the timing of supplying the image signal to the data lines, and the potential level of the precharge signal preferably changes continuously or stepwise within one horizontal scanning period.

According to the driving method, the precharge circuit supplies the data lines with the precharge signal in the predetermined sequence and the precharge signal is thus appropriately written. Although, with this arrangement, the capacitance of the data lines attached to the precharge signal line through the switching means of the precharge circuit is smaller than that in the concurrent precharging, the amount of charge written on the data lines may be different from data line to data line because of the parasitic capacitance of the precharge signal line and the parasitic capacitance of the precharge circuit driving signal line or the like. According to the present invention, however, even when the precharge signal is successively written, the precharge signal supply means supplies the precharge signal that changes continuously or stepwise, and in the same manner as already described, for example, the potential level of the precharge signal is changed with time to reduce the luminance non-uniformity and chrominance non-uniformity.

In the driving method for an electro-optical apparatus of the present invention, the precharge signal supply means preferably changes the precharge signal waveform so that the potential levels of the plurality of data lines immediately subsequent to the supplying of the precharge signal are approximately equal to each other.

According to the driving method, the potential levels at the respective data lines immediately prior to the writing of the image signal are equalized to each other. Thus, the luminance non-uniformity and chrominance non-uniformity are reduced.

In the driving method for an electro-optical apparatus of the present invention, voltage-transmittance ratio characteristics of the electro-optical apparatus are preferably adjusted to be equalized on screen by adjusting the waveform of the precharge signal.

According to the driving method, the luminance (transmittance ratio) non-uniformity of the electro-optical apparatus is attributed to the lack of voltage written onto the pixels (data lines) or the non-uniformity in voltage-luminance (transmittance ratio) characteristics or the like. The luminance (transmittance ratio) on screen is equalized by adjusting the amount of voltage applied, and the non-uniformities are thus improved. The improvements are attained by reshaping the precharge signal waveform to unequalize the amounts of charge written onto the data lines. Since adjustments are performed by reshaping the precharge signal waveform within a predetermined period to eliminate the luminance non-uniformity, the quality of display is improved.

A driving method for an electro-optical apparatus of the present invention, having a plurality of data lines, and pixels to which an image signal is supplied through the plurality of data lines, includes the steps of supplying a precharge signal to the plurality of data lines through each of a plurality of switching means connected to the plurality of data lines, prior to the supplying of the image signal to the data lines, and adjusting on-screen variations in voltage-luminance characteristics or transmittance ratio characteristics of the electro-optical apparatus by adjusting the potential level of the precharge signal supplied to the plurality of data lines.

According to the driving method, the characteristics of the luminance (or transmittance ratio) to the voltage applied to each pixel in the electro-optical apparatus after its production are often different depending on manufacturing variations, and varying the potential level of the image signal on a pixel-by-pixel basis for compensation is difficult in view of the requirement for a complex circuit arrangement. The potentials at the pixels and the data lines that supply voltages to the pixels, can be adjusted not only by the image signal but also by the potential level of the precharge signal. Specifically, taking advantage of the phenomenon that different potential levels through precharging result in different potentials at the pixels and the data lines subsequent to the supplying of the image signal even if an equal image signal is applied to the data lines, the potential level by the precharge signal is adjusted on a pixel-by-pixel basis or on a data-line-by-data-line basis to adjust the potential level subsequent to the supplying of the image signal, and the luminance (transmittance ratio) of a screen area suffering poor luminance (transmittance ratio) characteristics is compensated for and equalized.

An electro-optical apparatus of the present invention, having a plurality of scanning lines, a plurality of data lines crossing mutually the plurality of scanning lines, and a plurality of pixels respectively connected to the scanning lines and the data lines, includes a scanning line control circuit for selecting the scanning lines, a data line control circuit for outputting an image signal to the data lines each time the scanning line is selected to supply the image signal to the pixel connected to the selected scanning line, and a precharge signal control circuit for outputting a precharge signal to the data lines prior to the output of the image signal to the data lines, wherein the polarity of the potential level of the image signal output to the data lines with respect to a reference voltage is inverted every predetermined period, and the precharge signal control circuit outputs, to the data lines, a precharge signal having at least two potential levels prior to the output of the image signal to the data lines.

Since the voltage of the precharge signal is stepwise changed with this arrangement, the charging and discharging current for the data lines by the precharge signal is spread within time and their peak values are lowered, and variations in the potential of the opposite electrode, the potential of the capacitance electrode and the GND potential of the circuit are reduced, noise radiation is controlled, and an erratic operation of the device is thus prevented.

Since the voltage of the precharge signal is stepwise changed with this arrangement, the respective pixels in the electro-optical apparatus are given a charge different from that with the voltage of the precharge signal being constant. According to the present invention, by varying appropriately the voltage of the precharge signal, a charge desirable for controlling the luminance non-uniformity is precharged to each pixel. For this reason, the present invention offers an excellent display having a small luminance non-uniformity.

A driving method for an electro-optical apparatus having a plurality of scanning lines, a plurality of data lines crossing mutually the plurality of scanning lines, and a plurality of pixels respectively connected to the scanning lines and the data lines, includes the steps of selecting successively the plurality of scanning lines, outputting an image signal to the data lines each time the scanning line is selected to supply the image signal to the pixel connected to the selected scanning line, outputting a precharge signal to the data lines prior to the output of the image signal to the data lines, and inverting the polarity of the potential level of the image signal output to the data lines with respect to a reference voltage every predetermined period, wherein the precharge signals have at least two precharge signal potential levels, and the precharge signals are output successively so that one precharge signal potential having a smaller difference from the potential at the data lines immediately prior to the output of the precharge signal is output first.

Since the charging and discharging current for the data lines by the precharge signal is spread with time and their peak values are lowered according to the driving method, variations in the potential of the opposite electrode, the potential of the capacitance electrode and the GND potential of the circuit are reduced, noise radiation is controlled, and an erratic operation of the device is thus prevented.

With this arrangement, by varying stepwise the voltage of the precharge signal, a charge desirable for controlling the luminance non-uniformity is precharged to each pixel. For this reason, the present invention offers an excellent display having a small luminance non-uniformity.

An electro-optical apparatus of the present invention, having a plurality of scanning lines, a plurality of data lines crossing mutually the plurality of scanning lines, and a plurality of pixels respectively connected to the scanning lines and the data lines, includes a scanning line control circuit for selecting the scanning lines, a data line control circuit for outputting an image signal to the data lines every horizontal scanning period in which the scanning line is selected to supply the image signal to the pixel connected to the selected scanning line, and a precharge signal control circuit for outputting a precharge signal, having a continuously changing potential level, to the data lines prior to the output of the image signal to the data lines, wherein the polarity of the potential level of the image signal output to the data lines with respect to a reference voltage is inverted every predetermined period.

Since the voltage of the precharge signal is continuously changed with this arrangement, the charging and discharging current for the data lines by the precharge signal is spread with time and their peak values are lowered, variations in the potential of the opposite electrode, the potential of the capacitance electrode and the GND potential of the circuit are reduced, noise radiation is controlled, and an erratic operation of the device is thus prevented.

With this arrangement, by varying appropriately the voltage of the precharge signal, a charge desirable for controlling the luminance non-uniformity is precharged to each pixel. For this reason, the present invention offers an excellent display having a small luminance non-uniformity.

A driving method for an electro-optical apparatus of the present invention, having a plurality of scanning lines, a plurality of data lines crossing mutually the plurality of scanning lines, and a plurality of pixels respectively connected to the scanning lines and the data lines, includes the steps of selecting successively the plurality of scanning lines, outputting an image signal to the data lines each time the scanning line is selected to supply the image signal to the pixel connected to the selected scanning line, outputting a precharge signal to the data lines prior to the output of the image signal to the data lines, and inverting the polarity of the potential level of the image signal output to the data lines with respect to a reference voltage every predetermined period, wherein the precharge signal changes in voltage successively from a predetermined potential close to the potential level of the data lines immediately prior to the output of the precharge signal.

Since the charging and discharging current for the data lines by the precharge signal is spread with time and their peak values are lowered according to the driving method, variations in the potential of the opposite electrode, the potential of the capacitance electrode and the GND potential of the circuit are reduced, noise radiation is controlled, and an erratic operation of the device is thus prevented.

With this arrangement, by varying appropriately the voltage of the precharge signal, a charge desirable for controlling the luminance non-uniformity is precharged to each pixel. For this reason, the present invention offers an excellent display having a small luminance non-uniformity.

An electro-optical apparatus of the present invention, having a plurality of scanning lines, a plurality of data lines crossing mutually the plurality of scanning lines, and a plurality of pixels respectively connected to the scanning lines and the data lines, includes a scanning line control circuit for selecting the scanning lines, a data line control circuit for outputting an image signal to the data lines each time the scanning line is selected to supply the image signal to the pixel connected to the selected scanning line, and a precharge signal control circuit that outputs a precharge signal to the data lines prior to the output of the image signal to the data lines, while limiting an output current to within a predetermined value during the output of the precharge signal, wherein the polarity of the potential level of the image signal output to the data lines with respect to a reference voltage is inverted every predetermined period.

Since the charging and discharging current for the data lines by the precharge signal is limited below the predetermined value according to the driving method, variations in the potential of the opposite electrode, the potential of the capacitance electrode and the GND potential of the circuit are reduced, noise radiation is controlled, and an erratic operation of the device is thus prevented.

A driving method for an active-matrix type electro-optical apparatus of the present invention, having a plurality of scanning lines, a plurality of data lines crossing mutually the plurality of scanning lines, a plurality of pixels respectively connected to the scanning lines and the data lines, and switching elements included in the respective pixels, includes the steps of selecting successively the plurality of scanning lines, outputting an image signal to the data lines each time the scanning line is selected to supply the image signal to one end of liquid crystal of the pixel connected to the selected scanning line, inverting the polarity of the potential level of the image signal output to the data lines with respect to a reference voltage every predetermined period, and outputting, to the data lines, a precharge signal with an output current limited to within a predetermined value, prior to the output of the image signal to the data lines.

Since the charging and discharging current for the data lines by the precharge signal is limited below the predetermined value according to the driving method, variations in the potential of the opposite electrode, the potential of the capacitance electrode and the GND potential of the circuit are reduced, noise radiation is controlled, and an erratic operation of the device is thus prevented.

DETAILED DESCRIPTION OF PREFERRED EMBODIMENTS

Figure 1:
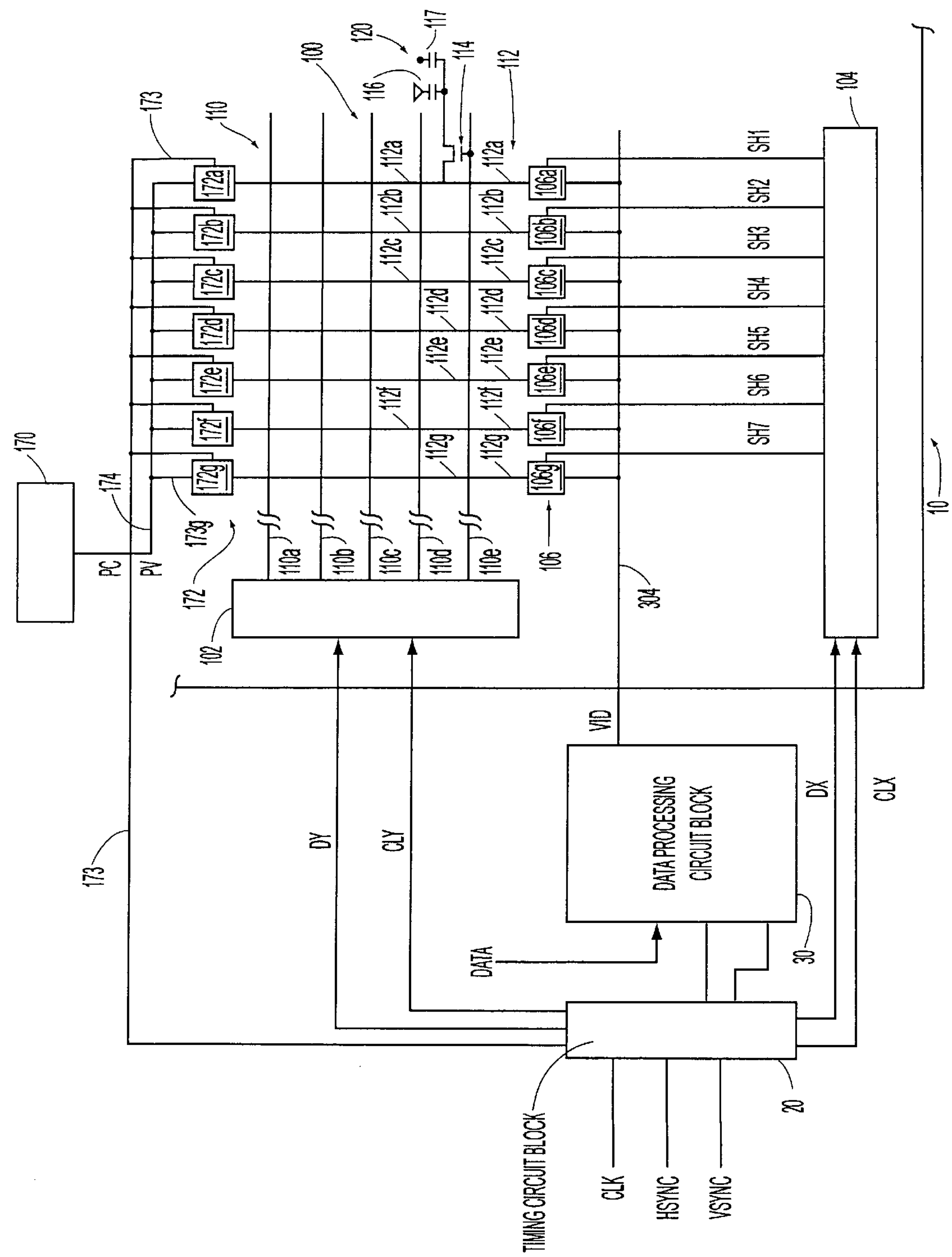
FIG. 1 is a schematic diagram of an active-matrix-type liquid-crystal apparatus of a first embodiment of the present invention.

Referring now to the drawings, the preferred embodiments of the present invention are discussed.

[First Embodiment]

Referring to FIG. 1 through FIG. 12, a first embodiment of the present invention is now discussed.

(Basic construction of a liquid-crystal apparatus)

In this embodiment, the present invention is implemented in a liquid-crystal apparatus as an example of an electro-optical apparatus.

FIG. 1 shows the outline of the liquid-crystal apparatus of the first embodiment of the present invention. As shown, the liquid-crystal apparatus is a compact liquid-crystal apparatus that is used as a light valve in an electronic apparatus, for example, a liquid-crystal projector, and is basically divided into a liquid-crystal panel block 10, a timing circuit block 20, and a data processing circuit block 30.

The timing circuit block 20 generates and outputs predetermined timing signals such as shift clock signal CLX for a data line driving circuit as a data line driving circuit, a shift clock signal CLY/CLY* for a scanning line driving circuit, a shift data signal DX and a Y-side shift data signal DY for the data line driving circuit based on a dot clock signal CLK, a horizontal synchronizing signal HSYNC, and a vertical synchronizing signal VSYNC.

The data processing circuit block 30 is a circuit block that processes data by amplifying, inverting and performing other operations for the data to be suitable for presentation on a liquid-crystal display. The data processing circuit block 30 produces an image signal VID by inverting the polarity of an image data signal Data input from outside with respect to a polarity inversion reference potential every scanning line or every dot.

The liquid-crystal panel block 10 includes a pixel area 100 having a pair of substrates such as glass with a liquid crystal interposed therebetween and pixel electrodes arranged in a matrix form on one of the substrates, a scanning line driving circuit 102, a data line driving circuit 104, sampling switches 106, and precharge switches 172 as switching means, and a common electrode provided on the other opposing substrate. Arranged outside of the pair of substrates is a polarizer. These driving circuits may be separated from the panel substrates, and organized in an IC external to the panel substrate. One of the substrates bearing the pixel electrodes may be manufactured of a semiconductor substrate.

Arranged on the pixel area 100 are, for example, a plurality of scanning lines 110 extending in the direction of row as shown in FIG. 1, and, for example, a plurality of data lines 112 extending in the direction of column.

A display element, constructed of a switching element 114 and a pixel 120 connected in series, is formed at each position where each scanning line 110 and each data line 112 cross. Each pixel 120 is constructed of a pixel electrode connected to the switching element 114 that is manufactured together on the one of the substrates, a storage capacitor 117 formed between the pixel electrode and a scanning line or capacitance line adjacent to it, a common electrode formed on the other opposed substrate, and a liquid-crystal layer 116 interposed between the two electrodes.

The period throughout which the switching element 114 of each pixel 120 is turned on is called a selection period and the period throughout which the switching element 114 is turned off is called a non-selection period. The storage capacitor 117, which accumulates, during the non-selection period, the voltage that is supplied to the pixel 120 through the switching element 114 during the selection period, is connected to the liquid-crystal layer 116.

In this embodiment, the switching element 114 is a three-terminal type switching element, for example, a TFT (thin-film transistor). The switching element 114 is not limited to this, and alternatively, the switching element 114 may be other three-terminal type switching elements such as a MOS transistor or a two-terminal type switching element such as a thin-film diode. The pixel area 100 in this embodiment is not limited to an active-matrix-type liquid-crystal panel employing the two-terminal type or three-terminal type switching element, and may be other types of liquid-crystal panel such as a passive-matrix-type liquid-crystal panel.

The scanning line driving circuit 102 includes a shift register and a logic circuit, and the shift register receives the Y-side shift data signal DY and Y-side shift clock signals CLY and CLY* generated by the timing circuit block 20, and outputs horizontal scanning signals h1, h2, h3, . . . , each having its selection period for selecting successively at least one scanning line 110 from a plurality of scanning lines 110*a,* 110*b,* . . . (see FIG. 4).

The shift register in the scanning line driving circuit 102 has the number of stages corresponding to the number of scanning lines 110, and its adjacent stages are mutually connected to each other so that the Y-side shift data signal DY is successively shifted.

Figure 4:
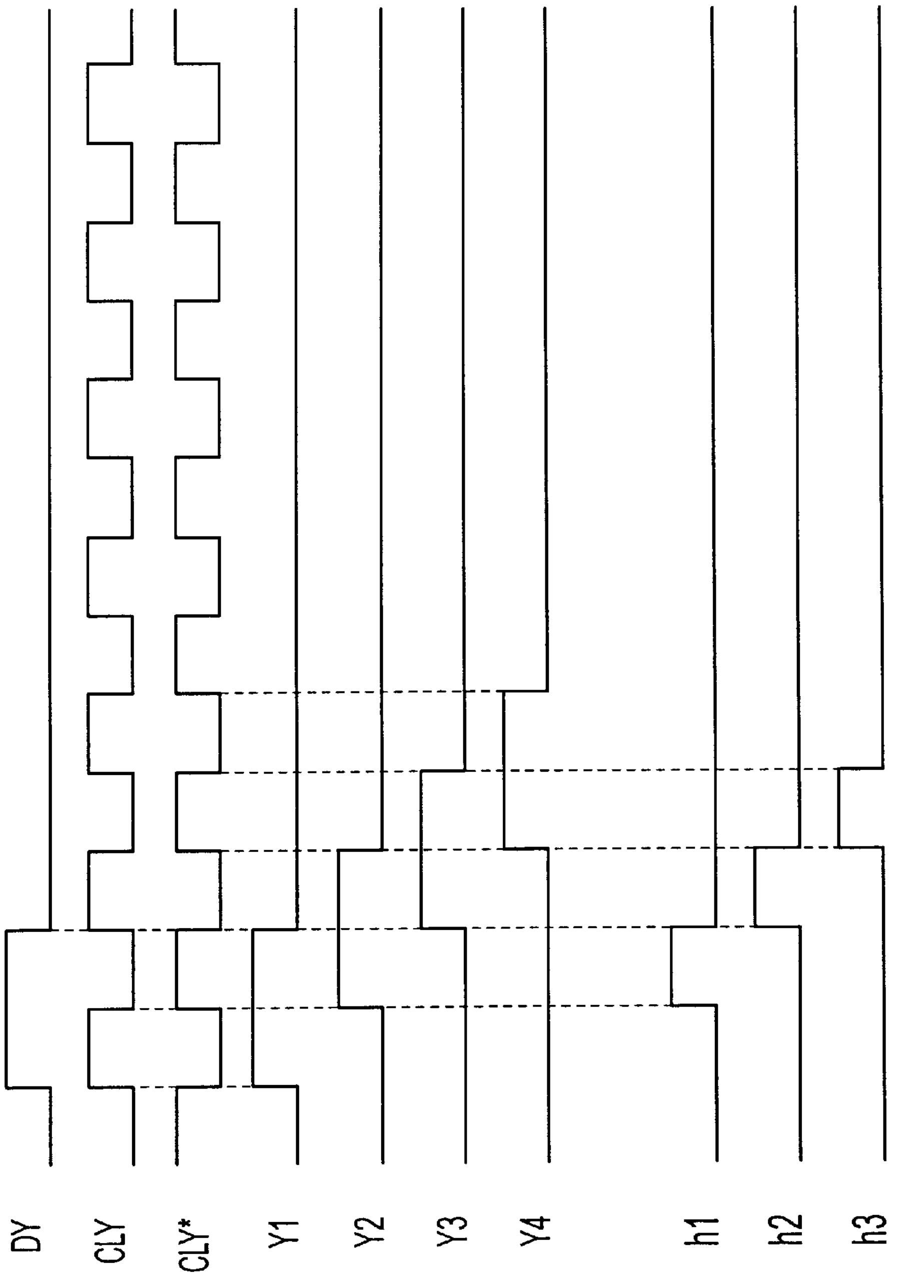
FIG. 4 is a timing chart illustrating the operation of a scanning line driving circuit in the active-matrix type liquid-crystal apparatus of the first embodiment of the present invention.

The respective stages of the shift register output the Y-side shift register output signals Y1, Y2, Y3, . . . as shown in FIG. 4. By ANDing the Y-side shift register output signals Y1 and Y2, the horizontal scanning signal h1 is produced. Similarly, the horizontal scanning signals h2, h3, . . . are produced by ANDing the two adjacent Y-side shift register stage outputs Yn and Yn+1.

These horizontal scanning signals h1, h2, h3, . . . are output subsequent to the input of the Y-side shift data signal DY.

The data line driving circuit 104 as a data line driving circuit receives the X-side shift clock signal CLX and the X-side shift data signal DX generated by the timing circuit block 20, and outputs sampling signals SH1, SH2, SH3, . . . to a plurality of sampling switches 106 arranged between, for example, a single image signal line 304 that is an output line for the data processing circuit block 30 and data lines 112*a,* 112*b,* . . . in the pixel area 100, thereby successively driving the pixel area 100 on a point-at-a-time basis.

Like the scanning line driving circuit 102, the data line driving circuit 104 includes a shift register having the number of stages corresponding to the number of data lines, and its adjacent stages are connected to each other so that the X-side shift data signal DX is successively transmitted.

The data line driving circuit 104 operates in the same way as shown in the timing chart in FIG. 4, and referring to FIG. 1, sampling signals SH1, SH2, . . . are produced subsequent to the input of the shift data signal DX.

When the data processing circuit block 30 has a known phase expansion circuit, the number of the image signal lines 304 output from the data processing circuit block 30 is the same number as the number of expanded phases. The data line driving circuit 104 outputs the sampling signals for sampling concurrently the image signals that are transmitted in parallel along the plurality of image signal lines. The phase expansion circuit is a serial-parallel conversion circuit which samples the image signal as serial data according to a sampling period determined by a reference clock, expands the serial data over every fixed number of pixels, and outputs in parallel the plurality of image signals with one data output period converted into an integer multiplication of the reference clock to the plurality of image signal lines 304.

In the precharge switches 172 as the switching means forming the precharge circuit, respective switches 172*a,* 172*b,* . . . are turned on at a predetermined timing in accordance with a gate signal supplied to a precharge circuit driving signal line 173, and a precharge signal of a positive polarity or a negative polarity supplied to a precharge signal line 174 is supplied to the respective data lines 112*a,* 112*b,* . . . , thereby precharging the data lines 112. The polarity here refers to the one relative to the common electrode potential applied to the common electrode.

The precharge signal supply circuit 170 supplies the precharge signal line 174 with a precharge signal PV, the polarity of which is switched each time the scanning line 110 is selected (every horizontal scanning line).

In this embodiment, the polarity inversion driving is performed every scanning line (on a scanning-line-by-scanning-line basis), and the polarity inversion timing of the precharge signal is determined in agreement with it. The method of polarity inversion driving is not limited to the one which performs the polarity inversion every scanning line, and may be a method in which the polarity inversion is performed every dot (pixel) or every data line. In such a case, the polarity inversion needs to be carried out in the precharge signal as well, every dot or every data line, and, for example, two precharge signal lines are arranged and respectively connected to an odd-numbered data line and an even-numbered data line, via precharge switches so that precharge signals of different polarities are respectively supplied to the precharge lines. Furthermore, the polarities of the precharge signals supplied to the respective precharge signal lines are inverted every vertical scanning period.

Figure 2:
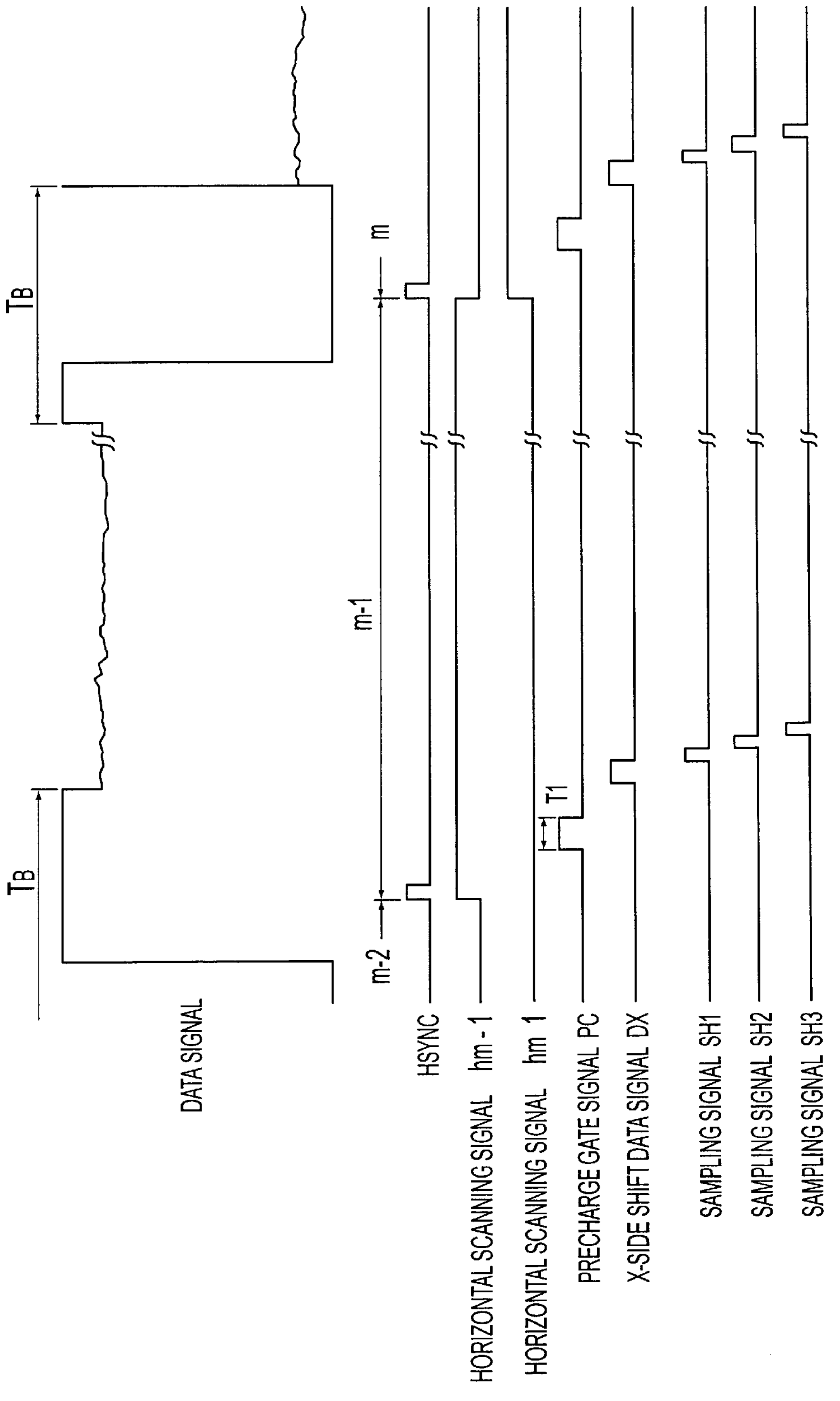
FIG. 2 is a timing chart illustrating a precharge operation and a data sampling operation performed by the active-matrix-type liquid-crystal apparatus of the first embodiment of the present invention.

In the liquid-crystal apparatus of this embodiment, each data line 112 is provided, within a precharge period T1 in a blanking period (retrace line period) TB as shown in FIG. 2, with the precharge signal voltage of the same polarity as that of the voltage that is applied to the pixel based on the image signal that is sampled during which each of the sampling signals SH1, SH2, SH3, . . . shown in FIG. 2 is at a high level, and precharge is performed.

The precharge signal in this embodiment is a signal having a precharge potential changing continuously or stepwise with time, rather than a signal that keeps its potential at a fixed level during the precharge period in the conventional art. In this embodiment, the use of the precharge signal having such a waveform reduces the luminance non-uniformity or chrominance non-uniformity in the liquid-crystal apparatus as the electro-optical apparatus.

The precharge signal in this embodiment is now detailed, and the causes for the generation of luminance non-uniformity and chrominance non-uniformity are first discussed.

(1. Signal response delay difference of the precharge signal)

As described above, the precharge signal line 174 supplied with the negative precharge signal (hereinafter referred to as precharge signal PV1) and the positive precharge signal (hereinafter referred to as precharge signal PV2) is respectively connected to the precharge switches 172. When each of the precharge switches 172 is constructed of a TFT, the precharge signal line 174 is connected to the TFTs, and a large capacitance component is thus attached to the precharge signal line 174. The larger the size of the liquid-crystal panel, the greater the wiring resistance of the precharge signal line 174. When the precharging is carried out every horizontal retrace line period, the respective data lines 112 are connected through the precharge signal line 174 and the precharge switches 172 within the same period, and the capacitive loads of the data lines are connected together within the same period. The precharge signal line 174 is manufactured of a metal selected from the group consisting of aluminum, tantalum, chromium, titanium, tungsten, molybdenum, and silicon or an alloy of two or more metals selected from the group, and as the wiring length of the precharge signal line 174 is long, the wiring resistance and parasitic capacitance in the precharge signal line 174 are large, working as a load, and the problem of wiring delay thus arises.

When the wiring delay takes place in the arrangement of this embodiment in which the precharge signals PV1 and PV2 are supplied from one side of the precharge signal line 174 (the input terminal side of PV in FIG. 1), the waveform of the precharge signal is distorted more and the signal response is delayed more as the data line is further apart from the signal input terminal side, and the signal level of the precharge signal drops, causing a difference in the amount of written charge between the data lines 112 within the precharge period T1.

Figure 3:
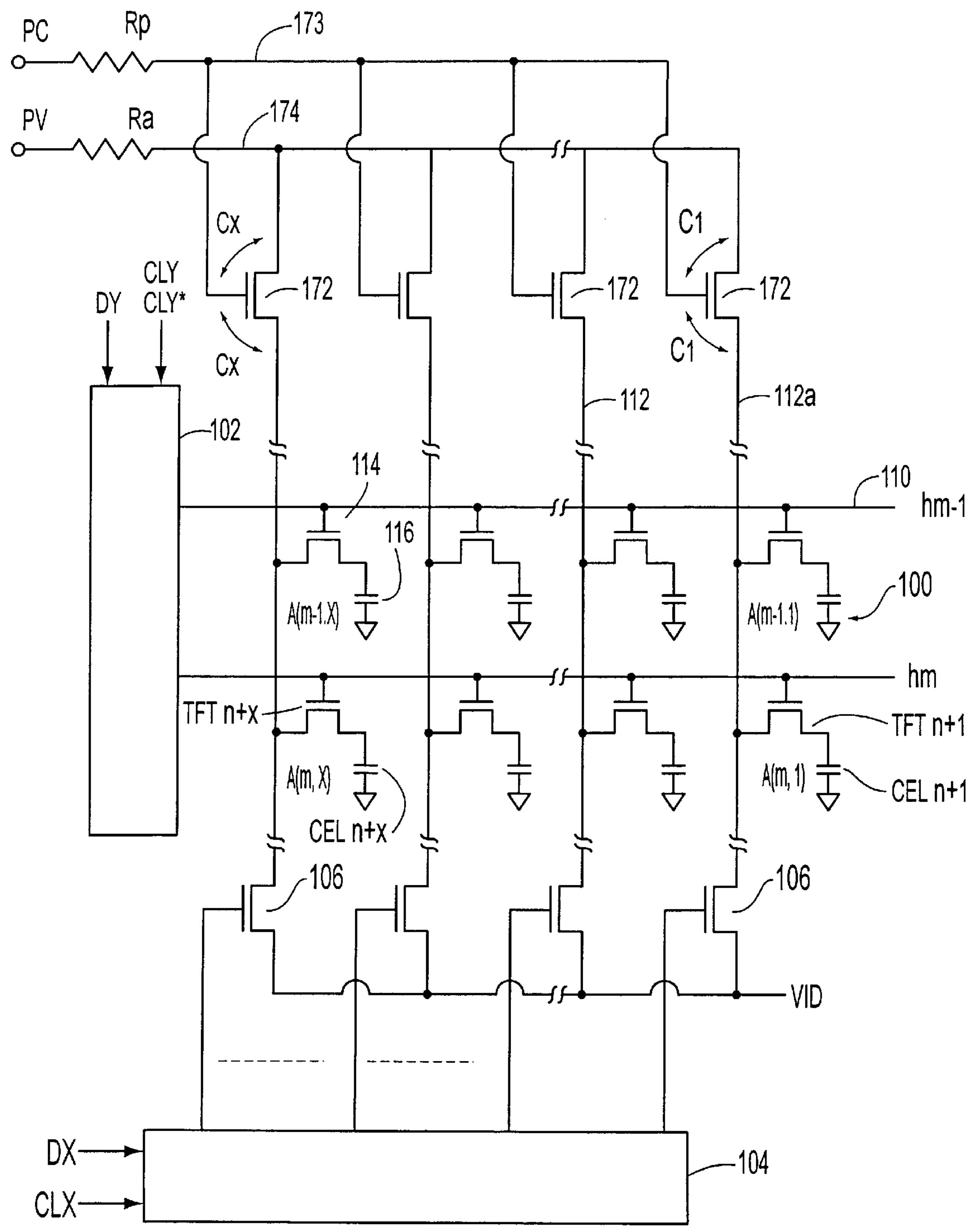
FIG. 3 is a diagram showing precharge switches and sampling switches in the active-matrix-type liquid-crystal apparatus of the first embodiment of the present invention.
Figure 5:
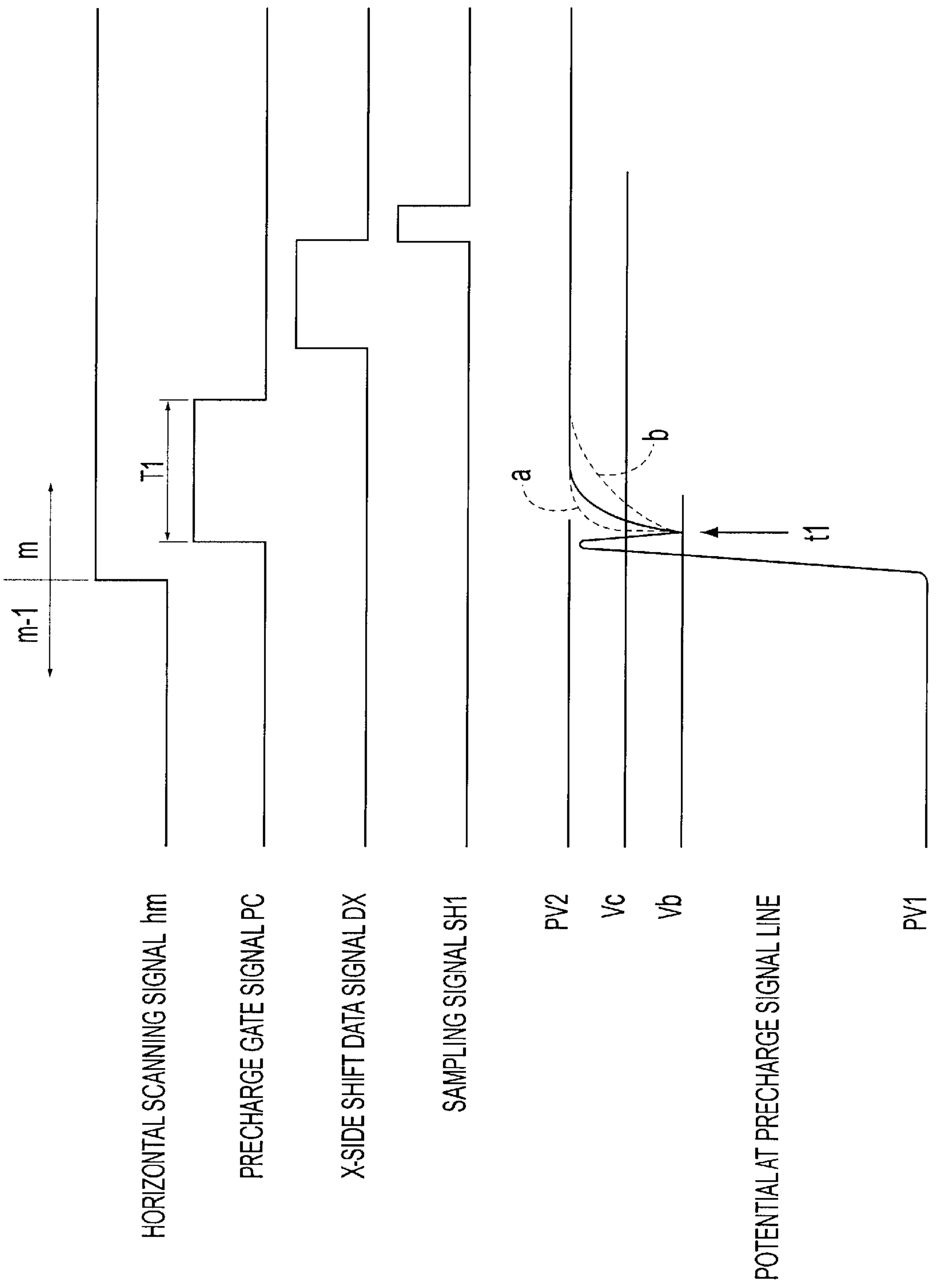
FIG. 5 is a timing chart illustrating a change in the potential of a data line when the data line is supplied with a precharge signal in the active-matrix-type liquid-crystal apparatus of the first embodiment of the present invention.

The signal response delay of the precharge signal refers to the delay in the change of the precharge signal waveform. When an m-th horizontal scanning period starts as shown in FIG. 5, the potential level of the precharge signal at the input terminal for the precharge signal line 174 is switched from PV1 to PV2, and the precharge signal is supplied. As shown, Vc is a central value of a voltage amplitude of the image signal applied to the data lines. The potential of the precharge signal line 174 that was at PV1 is once transitioned to PV2. When the precharge circuit driving signal PC turns on the precharge switch 172 at the timing t1, a plurality of data lines 112 are connected to the precharge signal line 174, gate-drain (a terminal on the data line side) capacitances C1, C2, . . . , Cx of the TFTs in the switches 172 as shown in FIG. 3, and the parasitic capacitance of the data lines 112 are attached to the precharge signal line 174, charge supply is performed to these parasitic capacitances, and the potential of the precharge signal line 174 sharply drops to Vb. Since the precharge signal is continuously supplied thereafter, the precharge signal line 174 returns to the original potential of the precharge signal PV2. The signal response delay of the precharge signal refers to such a delay in the precharge signal response.

Figure 6:
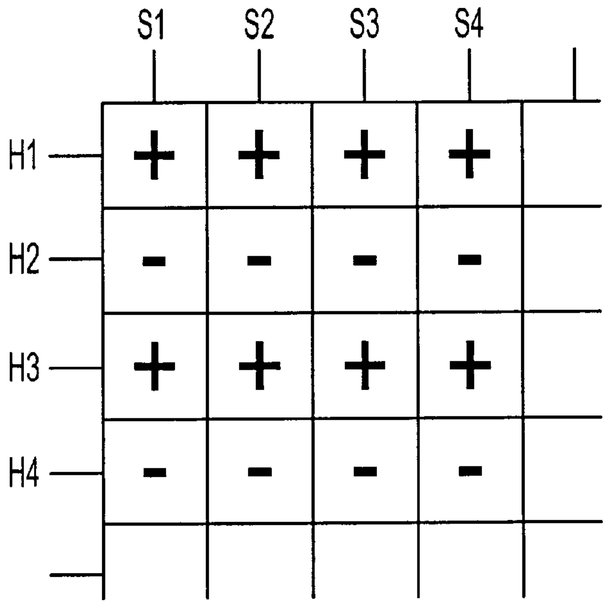
FIG. 6 is a schematic diagram illustrating a polarity inversion operation in an N-th field.
Figure 7:
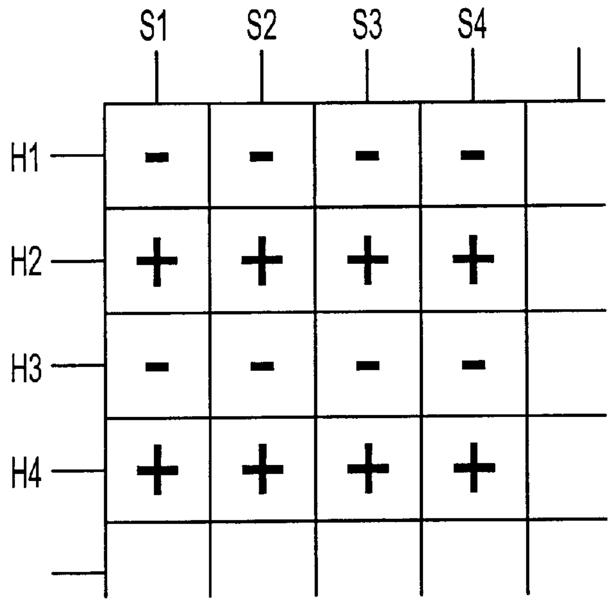
FIG. 7 is a schematic diagram illustrating a polarity inversion operation in an (N+1)-th field.

Referring to FIG. 5, the potential of the precharge signal line 174 once drops to Vb because the so-called line-by-line line inversion driving in which polarity inversion is performed in the pixels connected to one scanning line (the same is true of the dot inversion driving) is performed. FIG. 6 and FIG. 7 show the polarities of the voltages applied to the liquid-crystal layer of respective pixels arranged in a matrix form when the line inversion driving is performed. FIG. 6 shows the voltage polarities in an N-th field and FIG. 7 shows the voltage polarities in an (N+1)-th field. Prior to the application of the precharge signal to the data lines and pixels, the parasitic capacitance of the data lines 112 holds the potential, the polarity of which is opposite to the potential of the precharge signal to be supplied, and the precharge signal cancels out the stored charge in the parasitic capacitance of the data lines 112, and a large instantaneous current flows through the precharge signal line, and in response to it, the potential of the precharge signal line 174 once drops. Referring to FIG. 6 and FIG. 7, S1–S4 designate data lines, H1–H4 designate scanning lines, and + and − designate the polarities of each pixel.

The potential of the precharge signal line 174 changes from its dropped state, gradually rising to a predetermined precharge signal potential.

The rate of rise of the precharge signal potential is different depending on the location along the precharge signal line, and near a signal input terminal side (the side of a switch 172*g* in FIG. 1), the precharge signal, suffering a smaller wiring delay, rises faster to the precharge potential as represented by a dotted line a in FIG. 5, resulting in a faster signal response. On the other hand, apart from the signal input terminal side (the side of a switch 172*a* in FIG. 1), the precharge signal, suffering a greater wiring delay, takes more time to rise to the precharge potential as represented by a dotted line b in FIG. 5, resulting in a slower signal response.

For example, a data line 112 on the signal input terminal side and a data line 112 far apart from the signal input terminal side are different in the precharge signal waveform within the fixed precharge period T1, thereby being different in the amount of charge written thereon. As a result, the potentials of the respective data lines 112 immediately subsequent to the end of the precharge period T1 are different from data line to data line depending on their layout positions, and even if an image signal of equal potential is supplied to the data lines 112 subsequent to the precharging, a potential difference takes place between the respective data lines. As a result, the luminance non-uniformity is generated between a left-hand side and a right-hand side of the screen area, and the chrominance non-uniformity is generated when a color image is presented.

(2. Difference in the precharge circuit driving signal waveform)

The above wiring delay is the phenomenon which occurs not only in the precharge signal line 174 but also in the precharge circuit driving signal line 173 that supplies the precharge circuit driving signal for determining the supply timing of the precharge signal as shown in FIG. 1. Since the precharge circuit driving signal line 173 is manufactured in the same process in which the scanning lines 110 in the pixel area are manufactured, the precharge circuit driving signal line 173 is formed of a polycrystalline silicon layer. This polycrystalline silicon layer also serves as a layer for a gate electrode of each TFT functioning as a precharge switch 172. The precharge gate signal line and scanning line may be formed of high melting-point metals laminated on the silicon layer.

Figure 8:
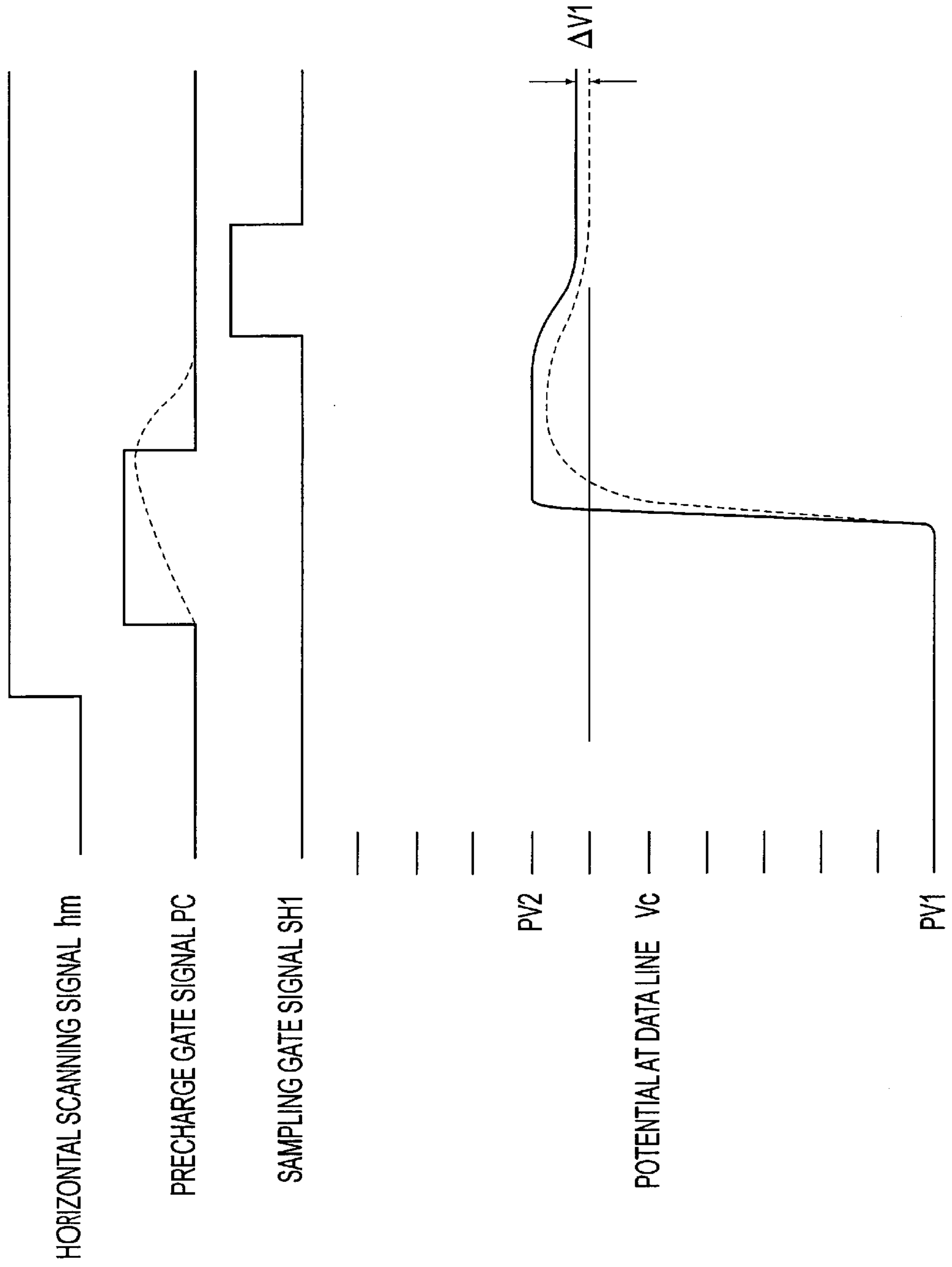
FIG. 8 is a timing chart illustrating a change in the potential of the data line when a distortion takes place in a precharge circuit driving signal in the active-matrix-type liquid-crystal apparatus.

Referring to FIG. 3 and FIG. 8, the wiring delay is now discussed. FIG. 3 shows in more detail the liquid-crystal apparatus shown in FIG. 1. The storage capacitor 117 of each pixel is not shown. FIG. 8 shows a horizontal scanning signal hm, a precharge circuit driving signal PC in an m-th horizontal scanning period, a sampling gate signal SH for supplying an image signal potential to the data line 112, and a potential of the data line 112. The X-side shift data signal DX is omitted in FIG. 8.

The horizontal scanning signal hm shown in FIG. 8 is a signal that is applied to the gates of the switching elements 114 of all pixels connected to an m-th scanning line 110 shown in FIG. 3 to turn on and off the switching elements 114.

Subsequent to the transition of the horizontal scanning signal hm to a high level at one timing, the precharge circuit driving signal PC is driven high. Since the above-described wiring delay takes place in the precharge circuit driving signal line 173 as well, the precharge circuit driving signal PC is distorted in waveform as represented by a dotted line in FIG. 8 when the precharge circuit driving signal PC is applied to the gates of all precharge switches 172.

When the voltage of the precharge signal drops to or below a threshold value of the precharge switch 172 with the waveform distorted and voltage lowered as shown in FIG. 8, the switch 172 may not be fully turned on, and the precharge signal may not be fully written onto the data line 112 via the switch. The potential of the data line 112, which would change as represented by a full line, drops due to the waveform distortion as shown by a dotted line in FIG. 8.

Suppose that the potential of the data line 112 prior to precharging is set to PV1 (=1 V) to present a black color display with a pixel at a negative polarity voltage. When the precharge circuit driving signal PC is turned on at the m-th horizontal scanning period as shown in FIG. 8, the data line 112 is precharged so that its potential is changed from PV1(=1 V) to a positive precharge signal potential PV2 (=8 V). Thereafter, sampling gate signal SH is driven high, and an image signal potential (7.5 V) for halftone gray scale display at a positive voltage is supplied to the data line through the sampling switch 106.

A distorted waveform of the precharge circuit driving signal PC causes an insufficient precharging at the data line, the potential of the data line becomes a value lower than 7.5 V as represented by the dotted line in FIG. 8, and the potential of the data line 112 becomes lower than the originally intended 7.5 V by ΔV1 as represented by the dotted line in FIG. 8. When the insufficient precharging takes place in the data line, the data line is provided with a voltage lower than the originally intended image signal voltage even if the image signal is supplied to the data line, and the display is shifted into a level brighter than an originally intended level on gray scale in the normally white mode display.

The distorted waveform of the precharge circuit driving signal PC is caused by the time constant attributed to the following loads. Referring to FIG. 3, the loads include wiring resistance Rb and parasitic capacitance Cb (not shown) of the precharge signal line 174 connected to the precharge switches 172 connected to the data lines 112, and the wiring resistance Rp and parasitic capacitance Cp (not shown) of the precharge circuit driving signal line 173 for supplying the precharge signal PC. In all precharge switches 172, the sources and the drains are capacitively coupled with the respective gates. For this reason, a parasitic capacitance C1 is created in the precharge switch 172 connected to the data line 112*a* as shown in FIG. 3, and the time constant arising from this load also affects the precharge circuit driving signal PC. Any other precharge switch, for example, an x-th precharge switch shown in FIG. 3, creates a parasitic capacitance Cx. When the precharge signal PC is input to the gate of each of the precharge switches 172, it takes time for all precharge switches 172 to be fully turned on, and the signal waveform of the precharge circuit driving signal PC supplied to the gate of each precharge switch 172 is thus distorted.

The distortion of the precharge circuit driving signal PC discussed above becomes larger on the data line farther apart from the input terminal side for the gate signal PC, and the amount of charge written on the data line at precharging becomes smaller on the data line farther apart from the input terminal side for the gate signal PC. Referring to on-screen brightness level in FIG. 9, an area B far from the signal input terminal provides a brighter display than an area A at the signal input terminal side in the normally white mode.

The amount of charge precharged to the data lines is different between a data line at the signal input terminal side and a data line farther apart from the signal input terminal, and as a result, the luminance non-uniformity and chrominance non-uniformity take place.

As described above, conventionally, no consideration is given to the parasitic capacitance, wiring resistance, and the like in the precharge signal line and the precharge circuit driving signal line, and since the precharge signal of a constant potential is supplied during the precharge period, the amount of charge written onto the respective data lines and pixels at the end of precharge period is different from data line to data line and from pixel to pixel, and the amount of charge at the data lines and pixels immediately prior to the writing of the image signal is different from data line to data line and from pixel to pixel, and these differences lead to the drop in subsequent image signal potential, causing the luminance non-uniformity and chrominance non-uniformity.

In this embodiment, the potential of the precharge signal is changed with time within the precharge period to compensate for the precharge unevenness to the data lines so that the amounts of charge supplied to the respective data lines and pixels are substantially equalized prior to the writing of the image signal to the respective data lines.

Figure 10:
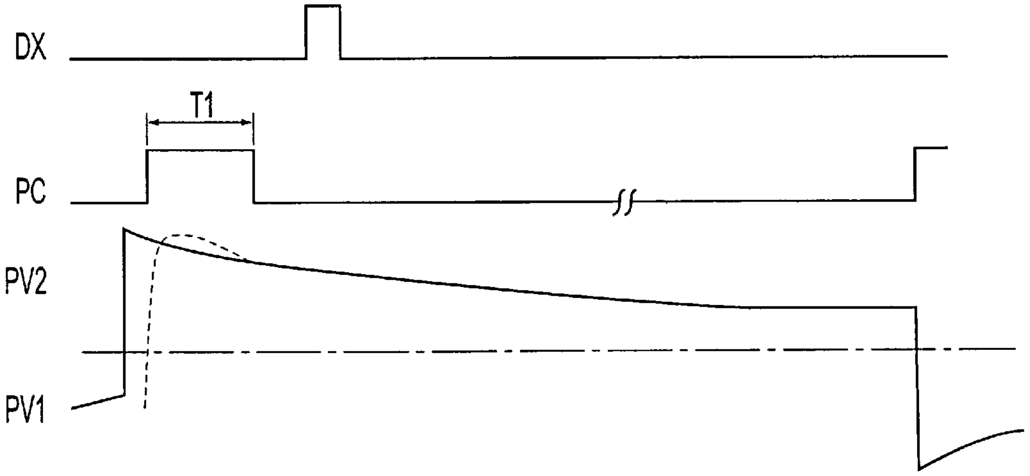
FIG. 10 is a timing chart illustrating the waveform of a precharge signal in the active-matrix-type liquid-crystal apparatus of the first embodiment of the present invention.
Figure 12:
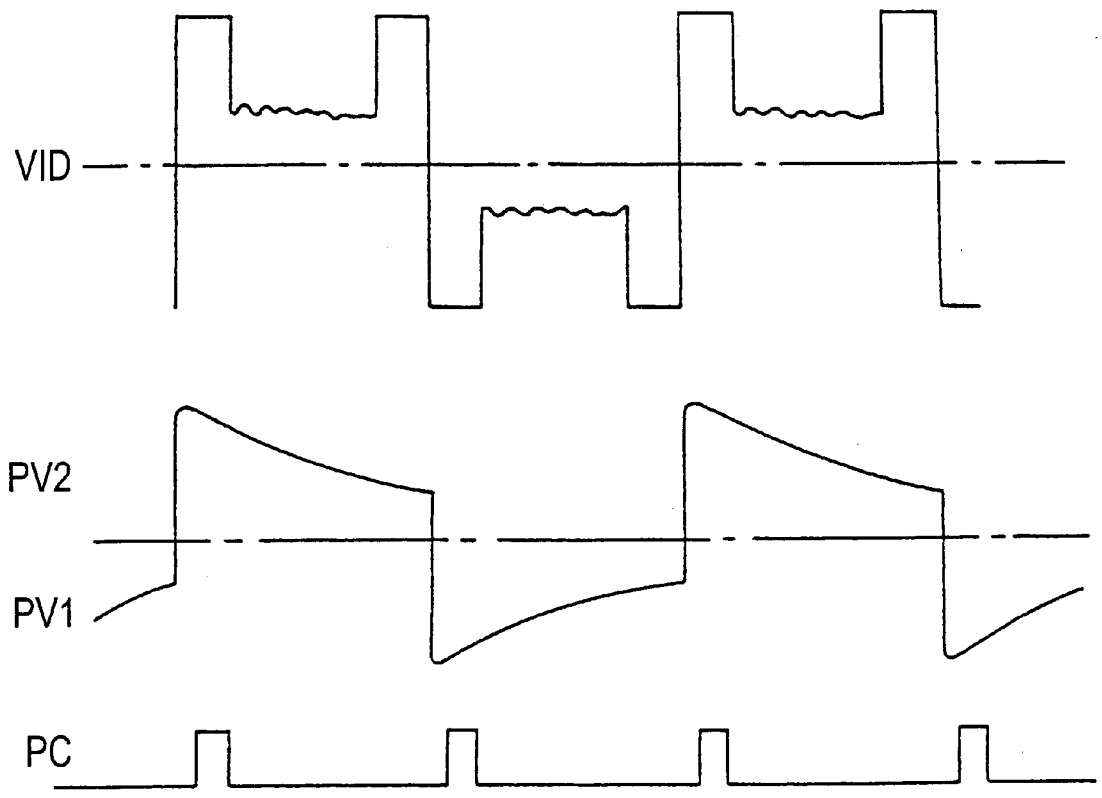
FIG. 12 is a timing chart illustrating the waveform of the precharge signal corresponding to the polarity inversion operation in the active-matrix-type liquid-crystal apparatus of the first embodiment of the present invention.

For example, when a data line at the terminating end has a smaller supply amount of charge by the precharge signal than a data line at the precharge signal input terminal side in the arrangement shown in FIG. 1, precharge signals PV1 and PV2 represented by a full line shown in FIG. 10 and FIG. 12 are supplied. The precharge signal PV2 has a waveform that is obtained by differentiating a rectangular pulse waveform, and gradually attenuates after reaching a peak value at its rising edge. The precharge signal PV1 on the opposite polarity side is also a differentiated waveform as shown in FIG. 12.

Figure 11:
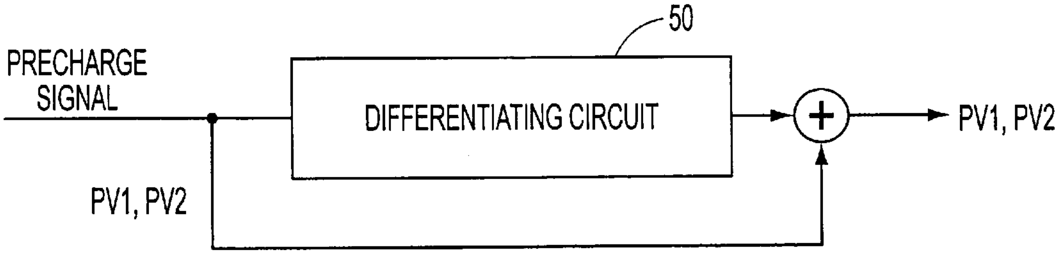
FIG. 11 is a block diagram illustrating a circuit which generates the precharge signal shown in FIG. 10.

To produce the precharge signals PV1 and PV2, for example, a differentiating circuit 50 is arranged in the precharge signal supply unit as shown in FIG. 11, and a waveform that is obtained by differentiating the precharge signals PV1 and PV2 as an original pulse waveform by the differentiating circuit 50 is added to the original precharge signals PV1 and PV2. The precharge signal output from this circuit thus has a waveform in which the differentiated waveform is superimposed onto the original precharge signal voltage.

The waveform of the precharge signal PV1 and PV2 which is actually used for precharging is the waveform corresponding to the precharge period T1 throughout which the precharge circuit driving signal PC supplied concurrently to the precharge switches 172 is at a high level. In the precharge period T1, the high-voltage peak portions of the precharge signals PV1 and PV2 charge the parasitic capacitance component of the precharge signal line 174 and the parasitic capacitance component of the data lines 112 through the wiring resistance of the precharge signal line 174. Under the influence of the time constant resulting from the capacitance and resistance, the potential at a location on the precharge signal line 174 far from the signal supply side becomes a rather flattened voltage waveform throughout the precharge period T1 as represented by a dotted line in FIG. 10 because the high-voltage portion of the precharge signals PV1 and PV2 is distorted and drops in voltage in the course of transmission. The first half portion of the precharge period is slightly higher in the waveform.

At the location far from the signal input terminal side where the precharge signals PV1 and PV2 suffer response delay as described above, the amount of charge consequently written onto the data line is made approximately equal to the amount of charge written onto the data line at the precharge signal input terminal side featuring a fast signal response. Although the precharge circuit driving signal PC supplied to the gates of the precharge switches 172 still suffers the response delay, the precharge signal in the first half of the precharge period T1 is set to be larger in waveform than the latter half as shown by the dotted line in FIG. 10, and the precharge signal voltage is thus increased during the corresponding period even if the gate signal is distorted, and thus the charge supplying to the data lines is carried out.

According to this embodiment, the difference in potential from data line to data line is eliminated prior to the writing of the image signal, the potentials at the data lines are substantially equalized, and the luminance non-uniformity and chrominance non-uniformity are thus compensated for.

As already described, taking advantage of the fact that the potential level of the data lines subsequent to a succeeding supply of the image signal becomes different, depending on the potential level of the data lines precharged by the precharge signal, when the voltage-luminance (transmittance ratio) characteristics of the electro-optical apparatus are brighter in a screen area closer to the supply terminal for the precharge signal in the normally white mode, the precharge signal is enlarged in its first half waveform so that the supply amount of charge to the data lines at precharging is adjusted to be larger on corresponding pixel areas. This is attained by increasing the peak value of the precharge signal in FIG. 10. In this way, the luminance (transmittance ratio) on the entire screen is rendered uniform.

The peak values and decay rates of the precharge signals PV1 and PV2 shown in FIG. 10 and FIG. 12 are set in the precharge signal supply unit in accordance with the characteristics of the liquid-crystal panel to which the precharge signals PV1 and PV2 are supplied. The parasitic capacitance and wiring resistance vary depending on the transistor characteristics such as the size of the transistors, pattern widths, and leaks, and the potential difference between the data lines subsequent to the precharging is different between liquid-crystal panels. The peak values and decay rates are thus set in accordance with the individual liquid-crystal panels.

[Second Embodiment]

In a second embodiment, the precharge signal that is output from the precharge signal supply means in the first embodiment has a waveform that is progressively heightened in voltage level.

Figure 13:
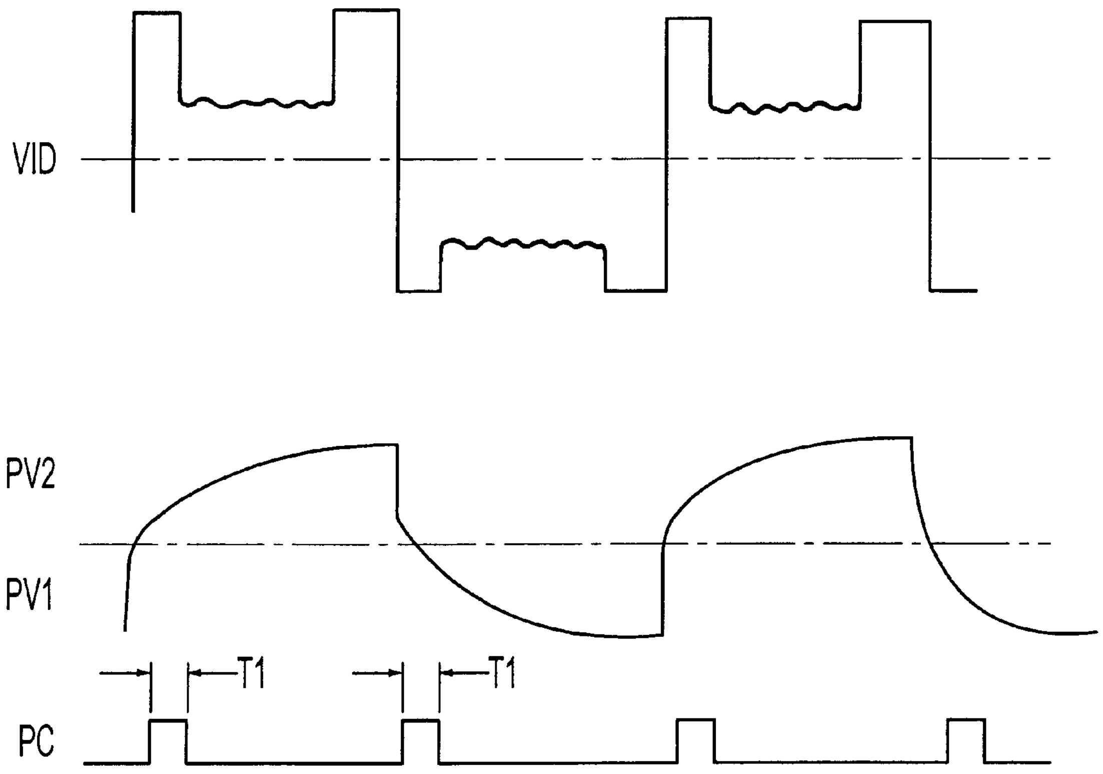
FIG. 13 is a timing chart illustrating an example of the waveform of a precharge signal in an active-matrix-type liquid-crystal apparatus of a second embodiment of the present invention.

Specifically, the waveform of the precharge signal PC is not limited to the ones shown in FIG. 10 and FIG. 12, and alternatively, the precharge signal PC may have a waveform that is formed using an integrating circuit for integrating rectangular wave precharge signals PV1 and PV2 as shown in FIG. 13. Also in this precharge signal waveform, the signal actually supplied to the data lines 112 has a voltage waveform within the period T1 during which the precharge circuit driving signal PC is at a high level.

The operation and advantage of this embodiment is different from those of the first embodiment.

If the precharge signals PV1 and PV2 supplied from the precharge signal supply means have a signal waveform that is progressively increased in signal voltage level, the precharge signal finally obtained has a waveform that progressively rises and reaches a peak value at the end in a location far from the input terminal side of the precharge signal line 174. The farther the data line is from the input terminal for the precharge signal, the greater the amount of charge of the precharge signal written thereon becomes.

Specifically, the potential level of the data lines subsequent to a succeeding supply of the image signal becomes different, depending on the potential level of the data lines precharged by the precharge signal, and when the voltage-luminance (transmittance ratio) characteristics of the liquid-crystal panel are different between a left-hand portion and a right-hand portion of the screen in the direction of data line layout (scanning direction), the supply amount of charge precharged to the data lines is adjusted by progressively enlarging the precharge signal waveform. For example, when the voltage-luminance (transmittance ratio) characteristics are poorer in a pixel connected to the data line 112*a* far from the supply end for the precharge signal than in a pixel close to the supply end in a normally white mode liquid-crystal panel, the area B far from the signal input terminal provides a brighter display (normally white mode) than the area A at the signal input terminal side as shown in the on-screen brightness level in FIG. 9. In other words, there are less variations in the transmittance ratio even if a voltage of equal level is applied to the pixels. By adjusting the precharge signals PV1 and PV2 to be increased in the latter half of the precharge period so that the supply amount of voltage to the pixels (data lines) in the pixel area B is increased, the precharge signal waveform is changed so that the supply amount of charge to the data line 112*a* far from the input terminal is thus increased. In this case, if the precharge signal is progressively increased in voltage level, more charge is supplied to the data line 112*a* far from the input terminal side than to the data line close to the input terminal side, and the transmittance ratio is thus equalized.

The peak values and decay rates of the precharge signals PV1 and PV2 shown in FIG. 13 are set in the precharge signal supply unit in accordance with the characteristics of the liquid-crystal panel to which the precharge signals PV1 and PV2 are supplied. The parasitic capacitance and wiring resistance vary depending on the transistor characteristics such as the size of the transistors, pattern widths, and leaks, and the potential difference between the respective data lines subsequent to the above described precharging is different from liquid-crystal panel to liquid-crystal panel. The peak values and decay rates are thus set in accordance with the individual liquid-crystal panels.

When the precharge signal has a voltage waveform with a progressively increasing voltage value in such a case as this embodiment, the peak value may be easily lowered by spreading, in time, a charging and discharging current generated in the course of precharging, compared with a case where a rectangular wave signal is used. According to this embodiment, variations in the potential of the opposite electrode, the potential of the capacitance electrode, and the GND potential are controlled in the process of precharging, noise radiation is controlled and an erratic operation of the device is thus prevented.

[Third Embodiment]

In a third embodiment, the precharge signal output from the precharge signal supply means in the first embodiment has a pulse waveform within the precharging period.

Figure 14A:
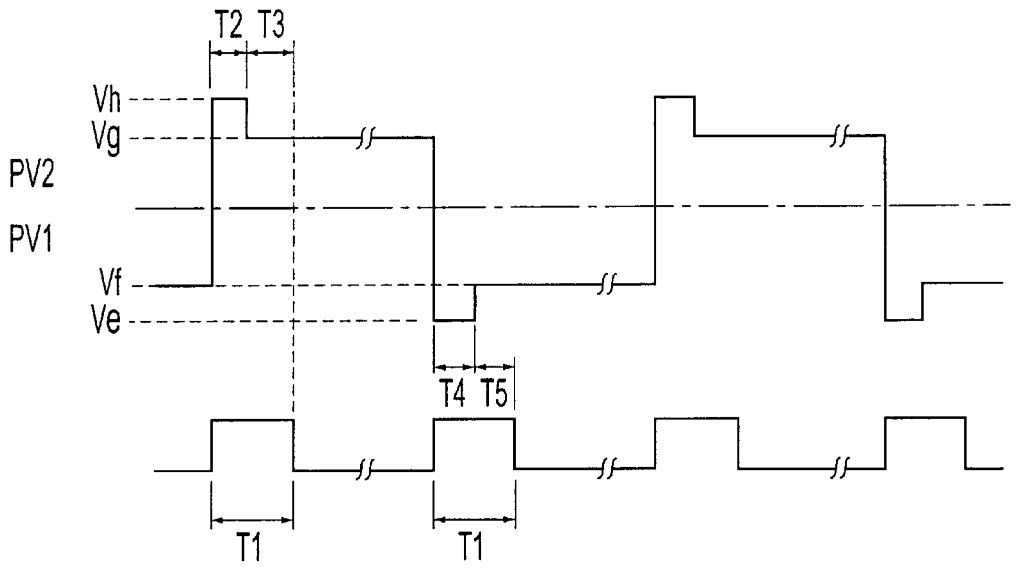
FIGS. 14(*a*) and 14(*b*) show wave form charts illustrating the waveform of a precharge signal in an active-matrix-type liquid-crystal apparatus of a third embodiment of the present invention.
Figure 14B:
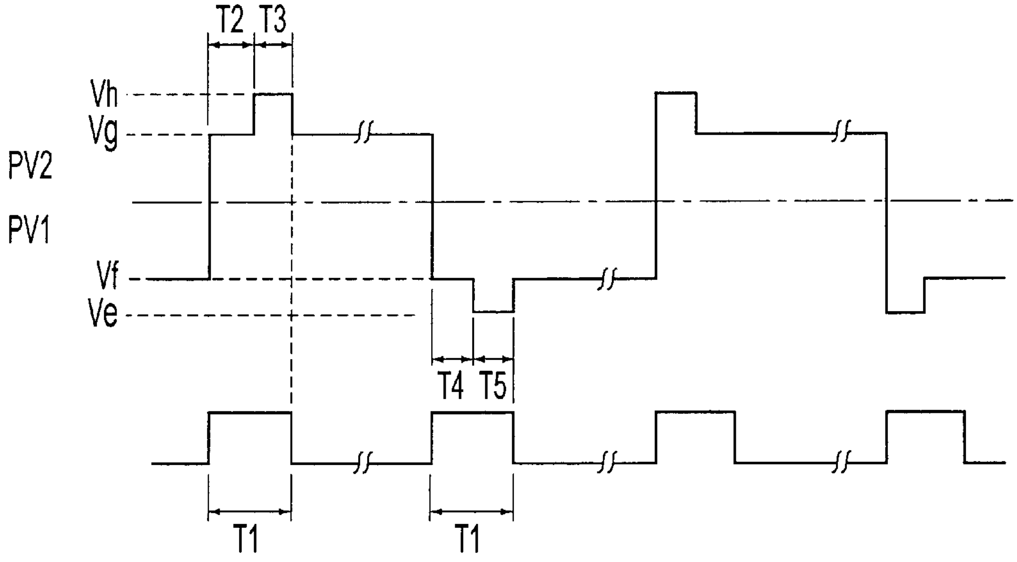

The waveform of the precharge signal PC is not limited to the ones shown in FIG. 10, FIG. 12, and FIG. 13, and alternatively, the precharge signal PC may be precharge signals PV1 and PV2 having a pulse waveform with two-voltage levels within the precharge period T1 as shown in FIGS. 14(*a*) and 14(*b*).

The precharge signal shown in FIG. 14(*a*) has, on its positive polarity side, a potential Vh throughout a period T2, higher than a potential Vg throughout a period T3, and has, on its negative polarity side, a potential Ve throughout a period T4, lower than a potential Vf throughout a period T5. By inputting a pulse waveform from the precharge signal input terminal, the same operation and advantage as those of the precharge signal waveform discussed in connection with the first embodiment are provided. Specifically, high voltage portions of the pulse waveform (portions T2 and T4) are distorted by the capacitance component and resistance component of the precharge signal line 174, and cancels out the time constant resulting from the parasitic capacitance and wiring resistance, and the voltage change represented by the dotted line shown in FIG. 10 takes place at the location farther from the signal input terminal for the precharge signal line 174.

By supplying such a waveform, the response delay is compensated for in the same manner as in the first embodiment even if the precharge circuit driving signal PC suffers from the response delay under the presence of the wiring resistance and parasitic capacitance at the location far from the signal input terminal.

According to this embodiment, the difference in potential from data line to data line is eliminated prior to the writing of the image signal, the potentials at the data lines are substantially equalized, and the luminance non-uniformity and chrominance non-uniformity are thus compensated for. As already described, taking advantage of the fact that the potential level of the data lines subsequent to a succeeding supply of the image signal becomes different, depending on the potential level of the data lines precharged by the precharge signal, when the voltage-luminance (transmittance ratio) characteristics of the electro-optical apparatus are brighter in a screen area closer to the supply terminal for the precharge signal in the normally white mode, the precharge signal is enlarged in its first half waveform so that the supply amount of charge to the data lines at precharging is adjusted to be larger on corresponding pixel areas. This is attained by increasing the voltage of the pulse portion in FIG. 14(*a*). In this way, the luminance (transmittance ratio) on the entire screen is equalized.

The precharge signal shown in FIG. 14(*b*) has, on its positive polarity side, a potential Vg throughout a period T2, and a potential Vh throughout a period T3 so that the potential in the latter half of the precharge period T1 is set to be higher, and the precharge signal has, on its negative polarity side, a potential Vf throughout a period T4 and a potential Ve throughout a period T5 so that the potential in the latter half of the precharge period T1 is set to be lower. By inputting a pulse waveform from the precharge signal input terminal, the same operation and advantage as those of the precharge signal waveform discussed in connection with the second embodiment are provided.

If the precharge signals PV1 and PV2 supplied from the precharge signal supply means has a signal waveform with an enlarged voltage level in the latter half of the period T1, the corresponding pulse portions are distorted by the wiring resistance and parasitic capacitance of the precharge signal line 174, and a resultant waveform has progressively increasing signal voltage level. The precharge signal obtained at a location far from the input terminal for the precharge signal line has the waveform progressively rising and reaching its peak value in the latter half. For this reason, the farther from the input terminal for the precharge signal line, the more the amount of charge written there on becomes.

Figure 9:
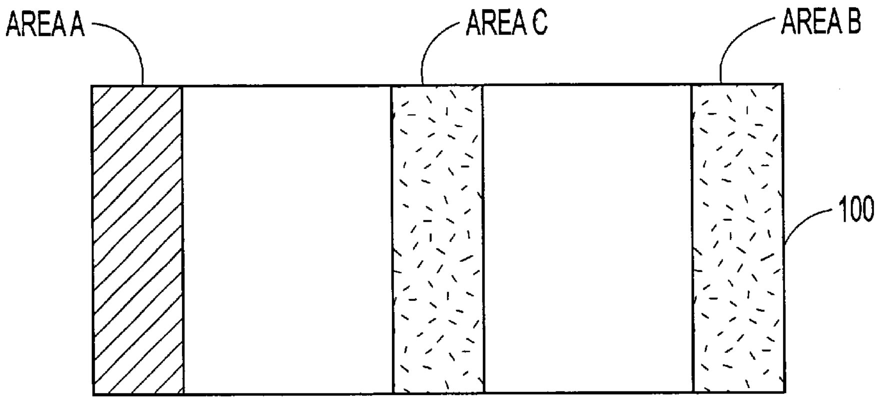
FIG. 9 is a schematic explanatory diagram illustrating an area where image degradation takes place.

For example, when the voltage-luminance (transmittance ratio) characteristics are poorer in a pixel connected to the data line 112*a* far from the supply end for the precharge signal than in a pixel close to the supply end in a normally white mode liquid-crystal panel, the area B far from the signal input terminal side provides a brighter display (normally white) than the area A at the signal input terminal side as shown in the on-screen brightness level in FIG. 9. In other words, there are less variations in the transmittance ratio even if a voltage of equal level is applied to the pixels. Bu adjusting the precharge signals PV1 and PV2 to be enlarged in the latter half of the precharge time so that the supply amount of voltage to the pixels (data lines) in the pixel area B is increased, the precharge signal waveform is changed so that the supply amount of charge to the data line 112*a* far from the input terminal is increased. If the precharge signal is progressively increased in voltage level, more charge is supplied to the data line 112*a* far from the input terminal side than to the data line close to the input terminal side, and the transmittance ratio is thus equalized.

When the precharge signal has a voltage waveform with a progressively increasing voltage value in the latter half of the precharge period as shown in FIG. 14(*b*), the peak value may be easily lowered by spreading, in time, a charging and discharging current generated in the course of precharging. According to this embodiment, in the process of precharging, variations in the potential of the opposite electrode, the potential of the capacitance electrode, and the GND potential of the circuit are controlled, noise radiation is controlled and an erratic operation of the device is thus prevented.

As described above, this embodiment has the advantage that the arrangement for imparting the pulse width waveform to the precharge signal is constructed by incorporating, in the precharge signal supply unit, a digital circuit for controlling variably a pulse width such as a pulse width modulation circuit and is easily built in the liquid-crystal apparatus. The parasitic capacitance and wiring resistance vary depending on the transistor characteristics such as the size of the transistors, pattern widths, and leaks, and the potential difference between the data lines subsequent to the precharging is different between liquid-crystal panels. Since the individual liquid-crystal panels need to be set individually, the arrangement of this embodiment capable of varying the pulse width in digital adjustment simplifies the setting of the panels.

[Fourth Embodiment]

Figure 15:
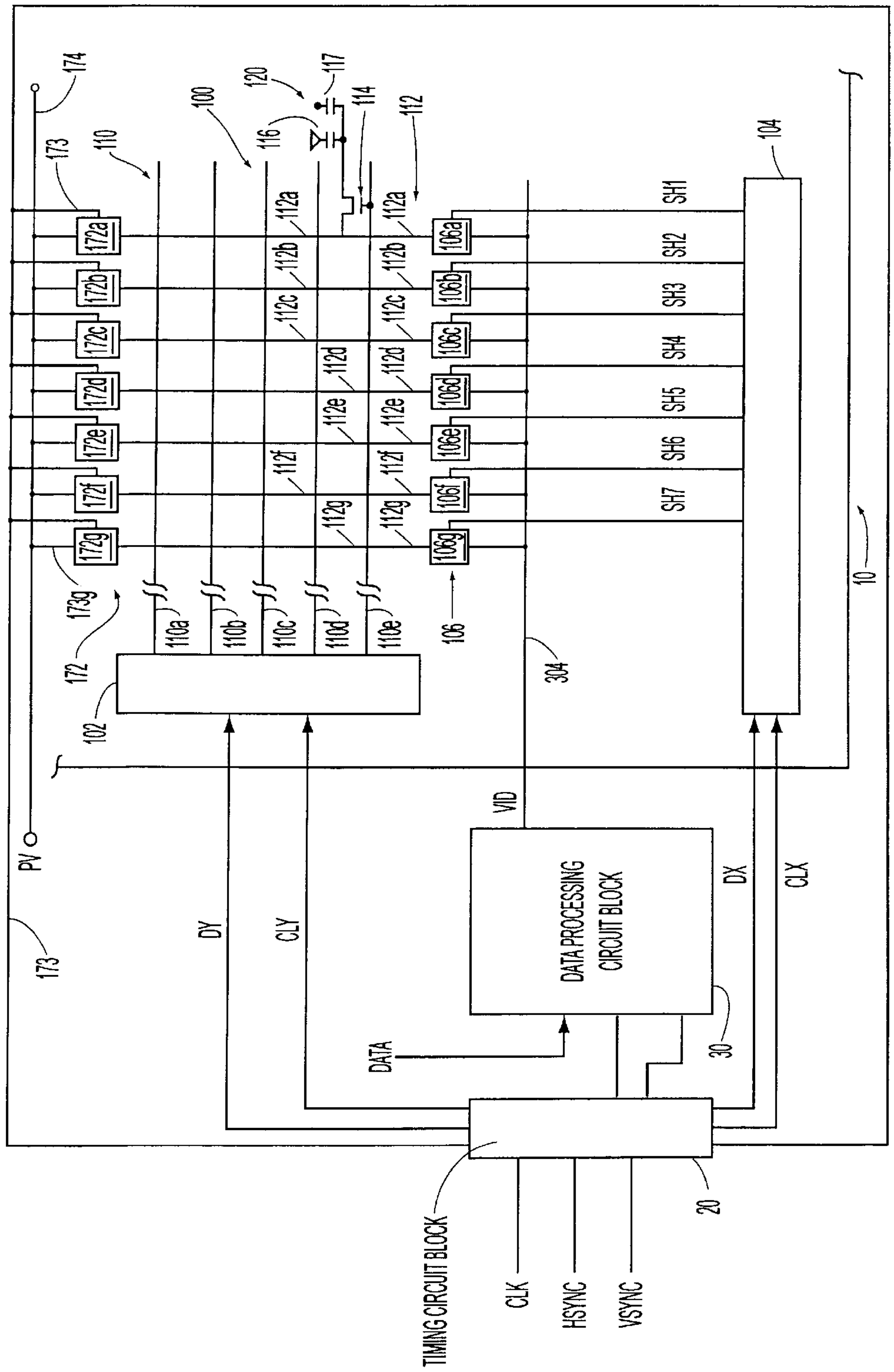
FIG. 15 is a schematic diagram illustrating an active-matrix-type liquid-crystal apparatus of a fourth embodiment of the present invention.

A fourth embodiment of the present invention is now discussed referring to FIG. 15. Components identical to those in the first embodiment are designated with the same reference numerals, and the discussion about them is omitted here. Unless otherwise noted, the construction of the liquid-crystal apparatus shown in FIG. 15 remains unchanged from that described with reference to FIG. 1.

In the above-described embodiments of the liquid-crystal panel, as shown in FIG. 1, the precharge signals PV1 and PV2 are input to the one side of the precharge signal line 174 and the precharge circuit driving signal PC is input to the one side of the precharge circuit driving signal line 173, but in this embodiment, the precharge signal line 174 and the precharge circuit driving signal line 173 are routed along both sides of the screen area where the data lines 112 are arrayed so that respective signals are supplied to the precharge switches 172 from both sides of the array of the data lines 112.

This arrangement eliminates the difference in the amount of written charge on the data lines due to the wiring resistance and parasitic capacitance of the precharge signal line 174 and precharge circuit driving signal line 173, and the luminance non-uniformity and chrominance non-uniformity are even further reduced. Specifically, this arrangement is equivalent to the configuration in which precharge signal supply units are arranged respectively on both sides of the screen area, and the wiring resistance and parasitic capacitance of the signal lines 173 and 174 are approximately halved when viewed from both input terminals of the signal lines. The distortions of the precharge signal and the precharge circuit driving signal supplied at both input terminals of the lines are substantially small, compared with the construction shown in FIG. 1.

Even in this arrangement, the amount of response delay in the waveform of the transmitting signal is different between both signal supply unit and a central portion, and in this embodiment as well, the precharge signal waveform is changed in the same way as in the first and third embodiments. Specifically, when the waveform having a peak in the first half of the precharge period T1, as shown in FIG. 10, FIG. 12, and FIG. 14(*a*), is supplied form both signal input terminals of the signal lines, the peak of the waveform is distorted at the central portion of the signal wiring by the wiring resistance and parasitic capacitance, and the resultant voltage change is thus substantially equalized in level.

The construction shown in FIG. 15 improves the insufficient precharging taking place to the data lines in a central portion area C on a screen 100 as shown in FIG. 9 so that the precharge potentials at the data lines are substantially equalized. The luminance (transmittance ratio) non-uniformity is thus reduced, and this embodiment offers substantial improvements in luminance non-uniformity and chrominance non-uniformity over the first embodiment, presenting a high-quality image.

Also in the construction shown in FIG. 15, the luminance (transmittance ratio) non-uniformity associated with the liquid-crystal apparatus is compensated for by inputting, from both input terminals of the precharge signal line, the waveform described in connection with the second and third embodiments, shown in FIG. 13 and FIG. 14(*b*). Specifically, when the voltage-transmittance ratio characteristics of the liquid-crystal apparatus are poorer in the central portion area C in FIG. 9 than in the remaining areas of the liquid-crystal apparatus, the precharge signals PV1 and PV2 are formed of a waveform having a peak in its latter half to increase the supply amount of charge to the pixels and data lines in the central portion area C, and the precharge signal is input from both sides of the precharge signal line 174, and more amount of charge is thus supplied to the data lines 112 in the central portion area C to compensate for the poor transmittance ratio characteristics. As a result, a substantially uniform luminance (transmittance ratio) results on the entire screen.

When the voltage waveform of the precharge signal has the waveform with its peak reached in the latter half of the precharge period as shown in FIG. 13 and FIG. 14(*b*), variations in potentials at a variety of components in the process of precharging are controlled, noise radiation is controlled and an erratic operation of the device is thus prevented in the same way as in the second and third embodiments.

[Fifth Embodiment]

(Basic construction of liquid-crystal apparatus)

Figure 16:
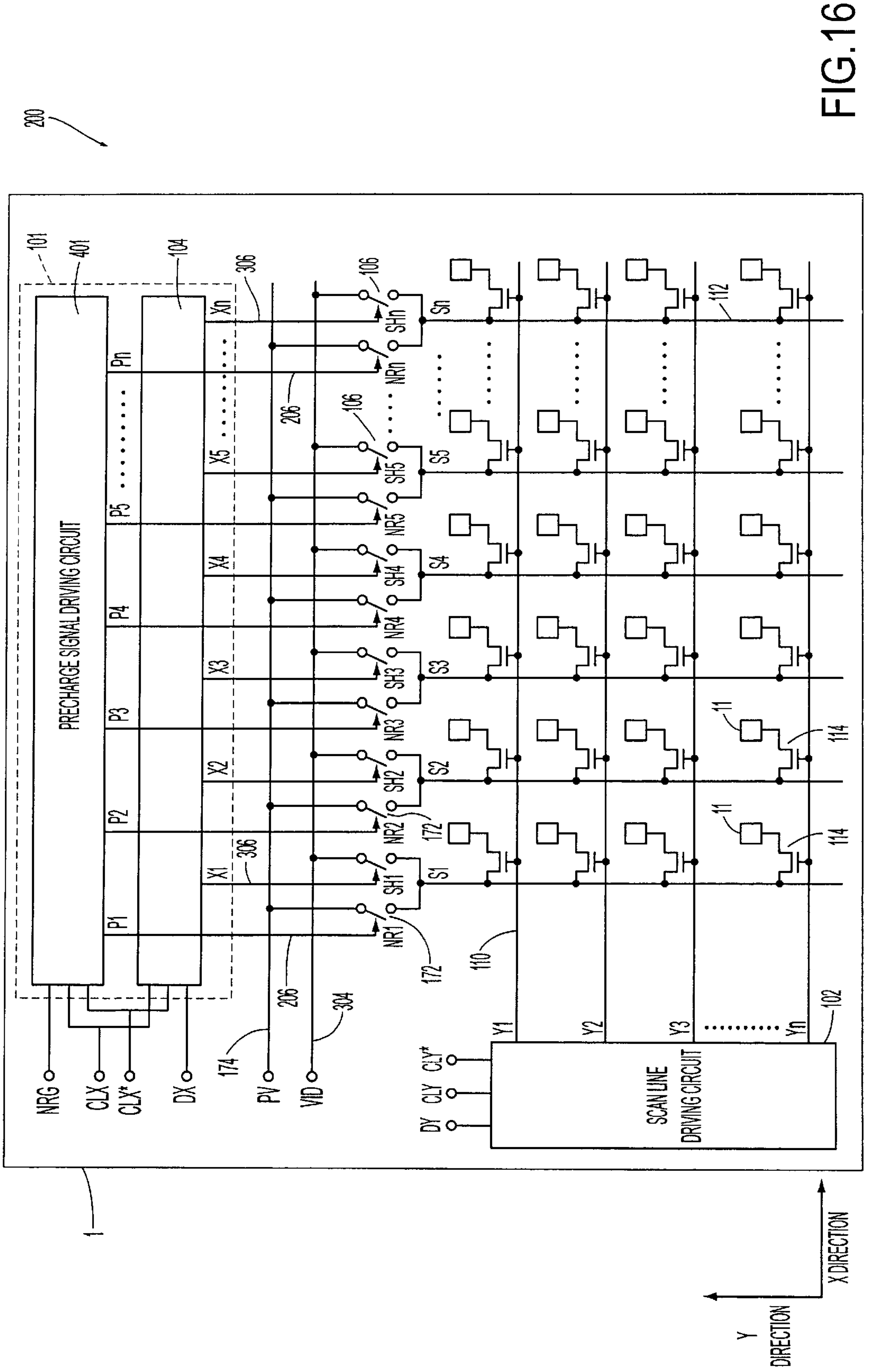
FIG. 16 is a schematic diagram illustrating an active-matrix-type liquid-crystal apparatus of a fifth embodiment of the present invention.
Figure 17:
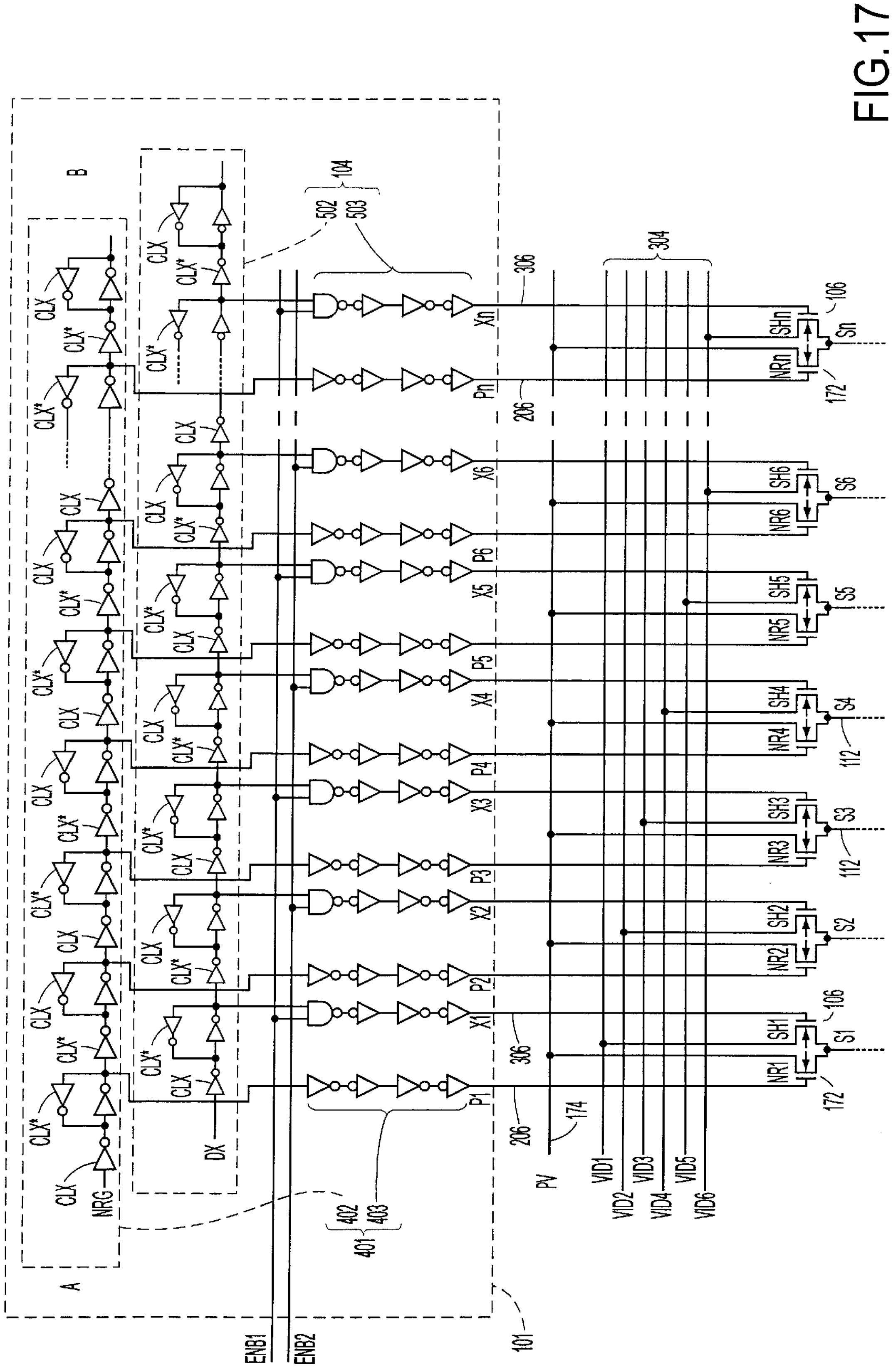
FIG. 17 is a constitutional diagram illustrating a data line driving circuit in the active-matrix-type liquid-crystal apparatus of the fifth embodiment of the present invention.
Figure 18:
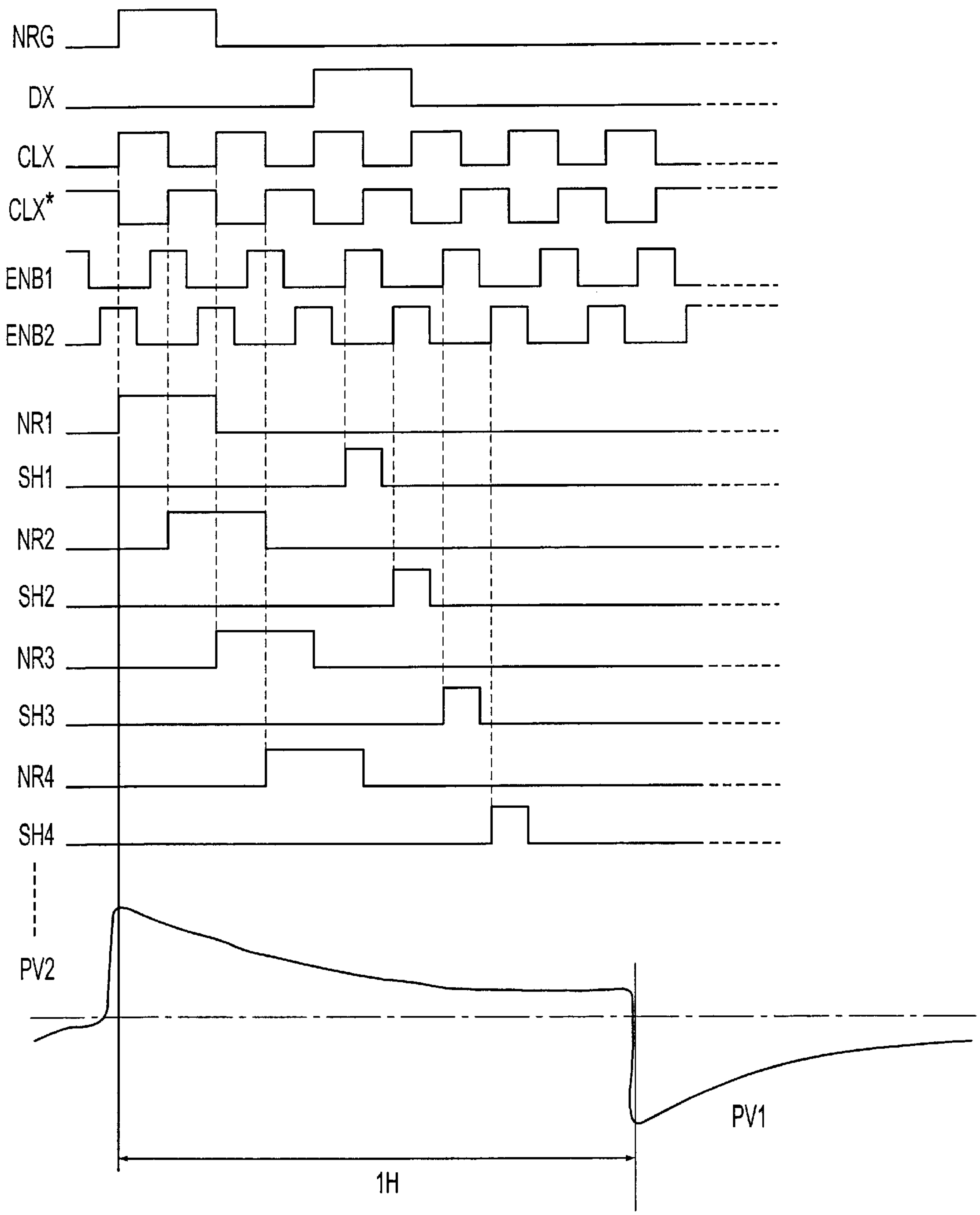
FIG. 18 is a timing chart illustrating an example of the waveform of a precharge signal in the active-matrix-type liquid-crystal apparatus of the fifth embodiment of the present invention.

A fifth embodiment of the present invention is now discussed, referring to FIG. 16, FIG. 17, and FIG. 18. Unless otherwise noted, the constructions shown in FIG. 16 and FIG. 17 remain unchanged from those described with reference to FIG. 1 and FIG. 15, and components identical to those described with reference to FIG. 1 and FIG. 15 are designated with the same reference numerals.

Referring to FIG. 16, the general construction of a liquid-crystal apparatus as an example of electro-optical apparatus is discussed. FIG. 16 is a block diagram showing such as varieties of wirings and peripheral circuits arranged on a TFT array substrate 1 in the liquid-crystal apparatus 200.

As shown in FIG. 16, the liquid-crystal apparatus 200 includes a TFT array substrate 1 manufactured of a quartz substrate, a hard-glass substrate, or the like. Arranged on the TFT array substrate 1 are a plurality of pixel electrodes 11 arranged in a matrix form, data lines 112 each extending in the Y direction and arranged side by side in the X direction, scanning lines 110 each extending in the X direction and arranged side by side in the Y direction, and a plurality of switching elements 114 as one example of switching element, each arranged between each data line 112 and a pixel electrode 11 for selecting a conductive state and a non-conductive state between the data line 112 and the pixel electrode 11 in response to a scanning signal supplied through the scanning line 110. A capacitance line, though not shown, as a wiring for storage capacitor, may be arranged generally in parallel with the scanning line 110 on the TFT array substrate 1, or a storage capacitor, though not shown, may be formed below a preceding-stage scanning line on the TFT array substrate 1.

Arranged further on the TFT array substrate 1 are precharge switches 172 for supplying the precharge signal PC of a predetermined voltage level to the plurality of data lines 112 respectively prior to the supplying of the image signal, sampling switches 106 for sampling the image signal and supplying the sampled image signal to the plurality of data lines 112 respectively, a data line driving circuit block 101, and a scanning line driving circuit 102.

The scanning line driving circuit 102 successively applies, to the scanning lines 110, the scanning signal in the form of pulse on a line-at-a-time basis at a predetermined timing, based on a power source, a reference clock signal CLY, an inverted signal CLY*, and a shift data signal DY and the like supplied by an external control circuit (not shown).

The data line driving circuit block 101 includes a precharge signal driving circuit 401 and a data line driving circuit 104. Based on the power source, a reference clock signal CLX, an inverted signal CLX*, a shift data signal DX, an image signal VID, and the like supplied from the external control circuit (not shown), the data line driving circuit 104 supplies the sampling signal through a sampling signal line 306 to sampling switch 106 on a per data line 112 basis in order to sample the image signal VID as the image signal at the timing the scanning line driving circuit 102 applies the scanning signal.

On the other hand, based on the power source, the reference clock signal CLX and the inverted signal CLX* common to the ones for the data line driving circuit 104, a precharge period setting pulse signal NRG, and the like supplied from the external control circuit (not shown), after the polarity of the image signal is inverted (the phase of the image signal is inverted) in one horizontal retrace line period subsequent to the supplying of the scanning signal by the scanning line driving circuit 102 to the scanning line 110 for one horizontal scanning period, the precharge signal driving circuit 401 supplies the precharge circuit driving signal through precharge circuit driving signal lines 206 to the precharge switches 172 on a per data line 112 basis in order to sample the precharge signal PC.

The precharge switches 172 include switching elements NR1–NRn, each constructed of a TFT, for the respective data line 112. The source electrodes of the switching elements NR1–NRn are connected to the precharge signal line 174, and the gate electrodes of the switching elements NR1–NRn are respectively connected to the precharge circuit driving signal lines 206. The precharge signal line 174 is manufactured of a metal selected from the group consisting of aluminum, tantalum, chromium, titanium, tungsten, molybdenum, and silicon or an alloy of two or more metals selected from the group. The external control circuit (not shown) supplies the precharge signal of the predetermined voltage via the precharge signal line 174, and for each data line 112, the precharge signal driving circuit 401 supplies the precharge circuit driving signal via the precharge circuit driving signal lines 206 to turn the switching elements NR1–NRn into a conductive state, at a timing prior to the writing of the image signal to be described later, and the precharge signal is thus written onto the respective data lines 112. The precharge signal supplied to the precharge switches 172 is preferably a signal (image auxiliary signal) of the same polarity as that of the image signal (for inversion of signal phase) and corresponding to pixel data on an intermediate level on a gray scale.

The sampling switches 106 include the switching elements SH1–SHn, each constructed of a TFT, for the respective data lines 112. The source electrodes of the switching elements SH1–SHn are connected to an image signal line 304, and the gate electrodes of the switching elements SH1–SHn are respectively connected to sampling signal lines 306. When the data line driving circuit 104 inputs a sampling signal through the sampling signal line 306, the image signal VID supplied through the image signal line 304 from the external control circuit (not shown) is sampled and then successively supplied to the data lines 112.

Although FIG. 1 shows only a single image signal line 304 for simplicity, the image signal VID may be phase-expanded into several phases to lower the frequency of the image signal when the dot frequency is high. No particular constraints are set on the number of expanded phases of the image signal, but the external control circuit will be relatively easily constructed if the number of expanded phases is a multiplication of three because one signal line is required for each of RGB signals to be displayed as a image. The required number of image signal lines 304 is at least the number of expanded phases of the image signal.

The drain electrodes of the switching elements NR1–NRn in the precharge switches 172 and the drain electrodes of the switching elements SH1–SHn in the sampling switches 106, in parallel, are commonly connected to the respective data lines 112, and the precharge signal driving circuit 401 and data line driving circuit 104 cause respectively the switching elements NR1–NRn and the switching elements SH1–SHn to switch to a conductive state at predetermined timings, thereby supplying the precharge signal to the data lines 112 prior to the supplying of the image signal.

The TFT array substrate 1 in FIG. 16 is a substrate manufactured of quartz or glass or the like as already described with reference to FIG. 1, and is attached to a transparent opposite substrate of glass or the like using a sealing material, and a liquid crystal is inserted into the gap between the substrates, and the construction of each pixel remains unchanged from the one shown in FIG. 1. The polarity of the voltage applied to liquid crystal layer of each pixel is inverted every line in the line inversion driving method or inverted every dot (pixel) in the dot inversion driving method in the same manner as FIG. 1.

Referring to FIG. 17 and FIG. 18, the construction of the driving circuit is discussed. FIG. 17 is a detailed diagram of the data line driving circuit, and FIG. 18 is a timing chart showing various signals for the data line driving circuit shown in FIG. 17.

Referring to FIG. 17, the data line driving circuit 104 and precharge signal driving circuit 401, both constituting the data line driving circuit block 101, includes a shift register 502 as a first shift register, a buffer circuit 503 including a waveform control circuit such as an AND gate, a shift register 402 as a second shift register having the same construction as the first shift register 402, and a buffer circuit 403.

In this embodiment, each of the data line driving circuit 104 and precharge signal driving circuit 401, both constituting the data line driving circuit block 101 as an example of the data line driving means, outputs successively the sampling signal as a first driving signal from each stage of the shift register 502 and the precharge circuit driving signal as a second driving signal from each stage of the shift register 402 in the transfer direction corresponding to the X direction (in the scanning direction P1, P2, P3, . . . , Pn, X1, X2, X3, . . . ) shown in FIG. 16, in order to supply them through the buffer circuits 503 and 403 to the sampling switches 106 and precharge switches 172.

In the data line driving circuit 104, enable signals are separately supplied to the buffer circuit 503 for odd-numbered columns and the buffer circuit 503 for even-numbered columns from external. The odd-numbered column buffer circuit 503 and the even-numbered column buffer circuit 503 are driven by the enable signals so that their on state periods do not concurrently happen. The buffer circuits 503 are driven to generate the sampling signals and supply successively the signals to the sampling switches 106. With this arrangement, the signals to be written on preceding and succeeding sampling switch 106 are not picked up, and a degradation in display quality such as ghost images is thus prevented.

The shift data signal DX, as a first transfer starting signal for starting the transfer of the sampling signal, is input from the A direction of the shift register 502 of the data line driving circuit 104. With the shift data signal DX, the clock signal CLX, and its inverted signal CLX* input thereto at the timings shown in the timing chart of FIG. 18, the data line driving circuit 104 successively delays the sampling signal SH, having a pulse width narrower than that of the signal DX, by half the period of the clock signal CLX and supplies them to the sampling switches 106.

A precharge period setting pulse signal NRG, as a second transfer starting signal for setting the precharge time, is input to the A direction of the shift register 402 in the precharge signal driving circuit 401. During the same one horizontal retrace line period, the precharge period setting pulse signal NRG is designed to certainly input thereto prior to the inputting of the data signal DX of the data line driving circuit 104. With the precharge period setting pulse signal NRG, the clock signal CLX, and its inverted signal CLX* input thereto at the timings shown in the timing chart of FIG. 18, the precharge signal driving circuit 401 successively delays the precharge circuit driving signal, having the same pulse width as that of the precharge period setting pulse signal NRG, by half the period of the clock signal and supplies them to the precharge switches 172. The buffer circuit 403 in the precharge signal driving circuit 401 is constructed of cascaded inverters so that the signal amplification and waveform shaping are carried out as described above. Like the buffer circuit 503 in the data line driving circuit 104, the buffer circuit 403 may be constructed of a waveform control circuit such as an AND gate. With this arrangement, the precharge circuit driving signal is freely controlled in pulse width within the period of the pulse width of the precharge period setting pulse signal NRG, by an enable signal from a display information processing circuit or the like connected to the outside of the liquid-crystal panel.

Although the scanning line driving circuit 102 is not shown here, it includes a shift register and a buffer circuit like the data line driving circuit 104.

With each stage of the shift registers 402 and 502 provided with the above-described circuits, pulse signals, with one pulse signal delayed from its preceding one by half the period of the clock signal CLX, are supplied to the precharge circuits NRl-NRn as the precharge circuit driving signals. Although the signals output by the shift register 502 of the data line driving circuit 104 for transferring the shift data signal DX are pulse signals having the same pulse width as that of the shift data signal DX, these pulse signals are ANDed with the enable signal ENB1 or ENB2 at each stage as shown in FIG. 18 by the waveform control circuit such as the AND circuit provided in the buffer circuit 503 in the data line driving circuit 104. Since the pulse width of the enable signal ENB1 or ENB2 is equal to or narrower than half the period of the clock signal CLX, pulse signals having no overlapped high-level periods therebetween as shown in FIG. 18 are supplied to the switching elements SH1–SHn as sampling signals. In this way, the image signal is not concurrently supplied to the switching elements 114 in the pixel area between the respective data lines 112 when the image signal is sampled, and ghost images or the like is reduced.

Since the precharge time setting pulse signal NRG is designed to be output a predetermined period earlier than the shift data signal DX as shown in FIG. 18, the precharge switch 172 is turned to a conductive state prior to the timing of sampling of the image signal, and the precharge signal PV supplied via the precharge signal line 174 is supplied to each data line 112. Since the precharge signal is the one having an appropriately set potential level, the amount of charge required to write the image signal onto the data line 112 is strikingly reduced with such a precharge signal written onto the data line 112 prior to the supplying of the image signal to the data line 112. Even when the image signal is supplied to the data lines 112 at a high rate, the potential level of each data line 112 is stabilized, an on-screen line non-uniformity is reduced, and an improved contrast thus results on the screen.

In this embodiment, the image signal is inverted in voltage polarity every predetermined period such as one horizontal scanning period (one frame) or one field (for example, two frames) to AC-drive the liquid crystal, and since, as described above, each data line 112 is supplied with the precharge signal, preferably corresponding to the image signal at an intermediate level on the gray scale, and having the same polarity as that of the image signal, prior to the supplying of the respective image signals to the switching element 114, the load during the writing of the image signal is lightened, and the potential level of each data line 112 remains stabilized regardless of the potential level previously applied. For this reason, the current image signal is supplied to the respective data lines 112 at a stable potential level.

Compared with the construction shown in FIG. 1 described in connection with the first embodiment, this embodiment is advantageous in driving the liquid-crystal panel in a fast display mode because the precharge signals are successively written on the data lines 112 as described above. For example, in such a display mode as XGA or EWS, the horizontal retrace line period is as short as 4.1 μsec or 3.8 μsec, and the precharge period is extremely short, approximately 1.6 μsec in the XGA mode, and approximately 1.3 μsec in the EWS mode, and a sufficient precharging cannot be performed in the concurrent precharging method shown in FIG. 1. Particularly in the EWS mode, the number of pixels in the horizontal direction is 1280, the precharging for at least 1280 stages needs to be concurrently down, and the precharge period has to be at least 1.0 μsec in light of the driving capability of the TFT in the precharge circuit and the time constant of the data line, and a sufficient precharging is thus impossible.

In contrast, this embodiment precharges successively the data lines as described above, the load during precharging is a single data line only, and even if several data lines are precharged at a time, the capacitance of the data lines as a load is strikingly smaller than that in the conventional art. In this embodiment, even when a fast display mode such as the EWS mode is employed as a display mode, a sufficient precharging is possible.

(Precharge signal waveform)

In the first through fourth embodiments, the precharge signals are concurrently supplied during the horizontal retrace line period, whereas in this embodiment, the data lines 112 are precharged at the timings (period throughout which each of NR1, NR2, NR3, . . . is at a high level) before the sampling switches 106 successively samples the image signal VID in response to the sampling signals SH.

In accordance with the timing chart shown in FIG. 18, the writing of the precharge signal onto the data lines is performed on a line-at-a-time basis in the same way as the image signal is written. When the precharge period setting pulse signal NRG is supplied to the shift register as shown in FIG. 16, precharge circuit drive signal NR1, NR2, NR3, NR4, . . . for respective data lines, resulting from shifting in synchronization with the X-side shift clock signals CLX and CLX*, are supplied to the precharge switches 172 corresponding to the respective data lines. When the X-side shift data DX is output to the shift register after a predetermined interval from the precharge period setting pulse signal NRG, the signal having the same pulse width as that of the X-side shift data signal DX is successively shifted to each stage in synchronization with the X-side shift clock signals CLX and CLX*, and are reshaped by the enable signals ENB1 and ENB2 to have a pulse width so that the signals of the two adjacent stages are not overlapped in time, and the sampling signals SH1, SH2, SH3, SH4, . . . are supplied to the sampling switches 106.

The waveform of the precharge signal used in this embodiment, as in PV1 and PV2 in FIG. 18, changes progressively in potential over the entire period (one horizontal scanning period) during which the precharge signal is successively supplied to all data lines. The waveform shown is formed using the differentiating circuit similar to that used in the first embodiment, and the precharge signal that is changed continuously or stepwise with time using an integrating circuit, or pulse width control circuit may also be used as described in the above embodiment. Specifically, in the waveform used here, the waveform changes of the precharge signal within the precharge period T1 shown in FIG. 10, FIG. 12, FIG. 13, FIG. 14(*a*), and FIG. 14(*b*), are spread over one horizontal scanning period. The operation and advantage of this embodiment remains unchanged from those of the first through fourth embodiments.

The arrangement in which the precharge signal is supplied to the data lines on a line-at-a-time basis, presents a smaller parasitic capacitance in the precharge signal line or the like than in the already-described arrangement in which the precharge signal is concurrently supplied. However, the parasitic capacitance itself of the precharge signal line is still present, and the use of the precharge signal changing with time in this embodiment reduces even more the luminance (transmittance ratio) non-uniformity and chrominance non-uniformity, and a higher quality image is thus presented.

[Sixth Embodiment]

Figure 19:
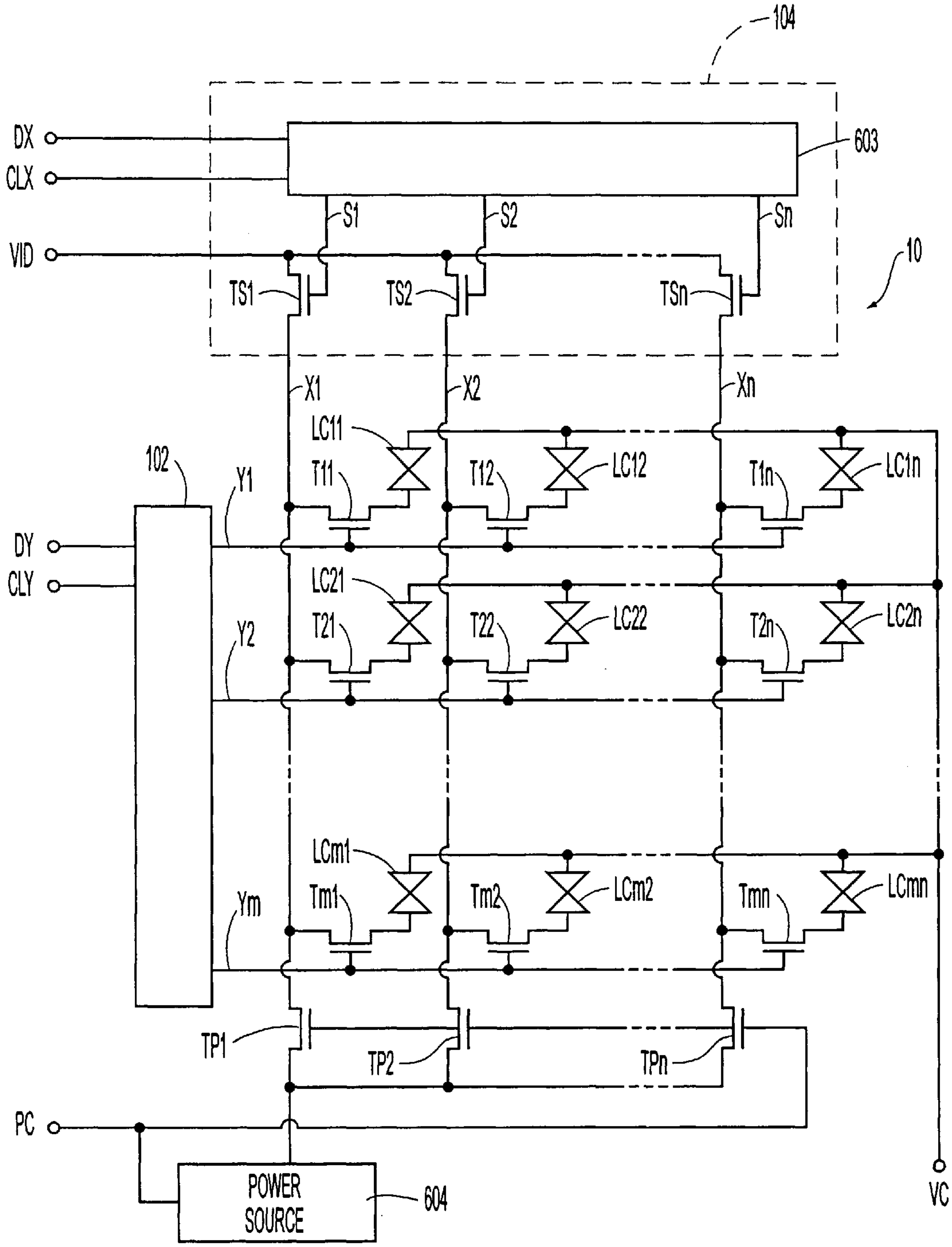
FIG. 19 is a schematic diagram illustrating an active-matrix-type liquid-crystal apparatus of a sixth embodiment of the present invention.

Referring to FIG. 19, a sixth embodiment using an active-matrix-type liquid-crystal apparatus as an example of an electro-optical apparatus of the present invention is now discussed.

FIG. 19 shows a liquid-crystal panel block 10 of the active-matrix-type liquid-crystal apparatus of this embodiment.

The liquid-crystal apparatus of this embodiment includes rows of scanning lines Y1, Y2, . . . , Ym, columns of data lines X1, X2, . . . , Xn, and liquid-crystal pixels LC11, LC12, . . . , LCmn, each arranged at a cross of one scanning line and one data line. This embodiment includes the pixels that employ a liquid crystal as an electro-optical material, but the present invention is not limited to this, and other electro-optic material may be used.

Each liquid-crystal pixel LC is provided with a switching element that is electrically connected to the liquid crystal in series to switch the pixels successively and selectively on a row-at-a-time basis. FIG. 19 shows thin-film transistors T11, T12, . . . , Tmn as an example of the switching element. The gate electrode of the thin-film transistor T is connected to the corresponding scanning line Y, the source electrode of the thin-film transistor T is connected to the corresponding data line X, and the drain electrode of the thin-film transistor T is connected to the corresponding liquid-crystal pixel LC. Each liquid-crystal pixel LC is constructed of a pixel electrode connected to each of the switching elements T11, T12, . . . , Tmn, an opposite electrode which faces the pixel electrode with the liquid crystal interposed therebetween, and to which a potential VC is applied, and a storage capacitor (formed of an insulating film interposed between the pixel electrode and a preceding stage scanning line or a capacitance electrode line) for holding the voltage applied to the pixel electrode as necessary.

Each end of the scanning line Y is provided with a scanning line driving circuit 102, and the scanning line driving circuit 102 successively scans the respective scanning lines Y, selects a row of liquid-crystal pixels every horizontal scanning period. Specifically, the scanning line driving circuit 102, having the function of a shift register, transfers successively the Y-side shift data signal DY in the shift register in synchronization with the Y-side shift clock signal CLY, and outputs a high-potential Y-side shift register output signal to each scanning line Y in step with the transferring.

Receiving the Y-side shift register output signal at its gate electrode, the thin-film transistor T becomes conductive, and the image signal is then supplied to the liquid-crystal pixel LC through the conducting thin-film transistor T from the data line X. When one horizontal scanning period that selected that row ends, the scanning line driving circuit 102 outputs a non-selective potential to the scanning line Y, turning the thin-film transistor T non-conductive, and thereby permitting the voltage held in the liquid-crystal pixel LC and/or the storage capacitor to be continuously applied to the liquid crystal in the pixel. The scanning lines Y are typically selected one by one, but when the same image signal is written on a plurality of rows of liquid-crystal pixels LC, these scanning lines Y are concurrently selected.

Each end of the data line X is provided with a data line driving circuit 104, and the data line driving circuit 104 successively samples the image signal VID in one horizontal scanning period, supplies the sampled signals to the respective data lines X. The sampled image signals VID are written onto the row of the liquid-crystal pixels LC selected by the scanning line driving circuit 102, on a dot-at-a-time basis. Specifically, the ends of the respective data lines X are provided with the respective sampling switches TS1, TS2, . . . , TSn to sample the VID, and the sampling switches receive the image signal VID.

The shift register 603 successively transfers the X-side shift data signal DX in synchronization with the predetermined X-side shift clock signal CLX, and outputs sampling signals S1, S2, . . . , Sn in step with the transferring. These sampling signals are supplied to the gate electrodes of the corresponding sampling switches TS1, TS2, . . . , TSn, thereby turning them on. The image signal VID is sampled and held at each data line X through the conducting sampling switch TS.

Referring to FIG. 19, transmission line of the image signal VID is one, and the sampling switches TSX for sampling become successively conductive one by one to supply the image signal to the data lines X one by one, but the present invention is not limited to this arrangement. For example, the serial image signal VID is serial-parallel converted to be phase-expanded into a plurality (for example, 3 channels, 6 channels, 12 channels, 24 channels, . . . ) of image signals VID, and image signals to be applied to different pixels are transmitted in parallel to a plurality of transmission lines, the sample switches TS of the number (for example, 3, 6, 12, 24, . . . ) equal to the number of the transmission lines become concurrently conductive so that the image signal VID is concurrently supplied to a plurality of corresponding data lines X. In this case, successive sampling control is performed in steps of the number of sampling switches TS that become concurrently conductive and is controlled, and the image signal is thus written on one row of liquid-crystal pixels LC on a dot-at-a-time basis in steps of the number of concurrently conducted sampling switches TS in the one horizontal scanning period.

Prior to the successive sampling of the image signal VID to the respective data lines X, the precharge operation is performed to concurrently supply the output of a voltage power source 604 to the respective data lines X every horizontal scanning period (during which the scanning lines Y are selected and scanned) to control the charging and discharging current to each data line X taking place at the sampling of the image signal VID. Specifically, the precharge switches TP1, TP2, . . . , TPn connected to the ends of the respective data lines X are controlled to be opened and closed in response to the precharge circuit driving signal PC. The precharge circuit driving signal PC causes the precharge switches TP to be conductive, before the sampling switches TS start sampling the image signal VID so that the precharge signal is supplied to the data lines X from the voltage power source 604.

Figure 20:
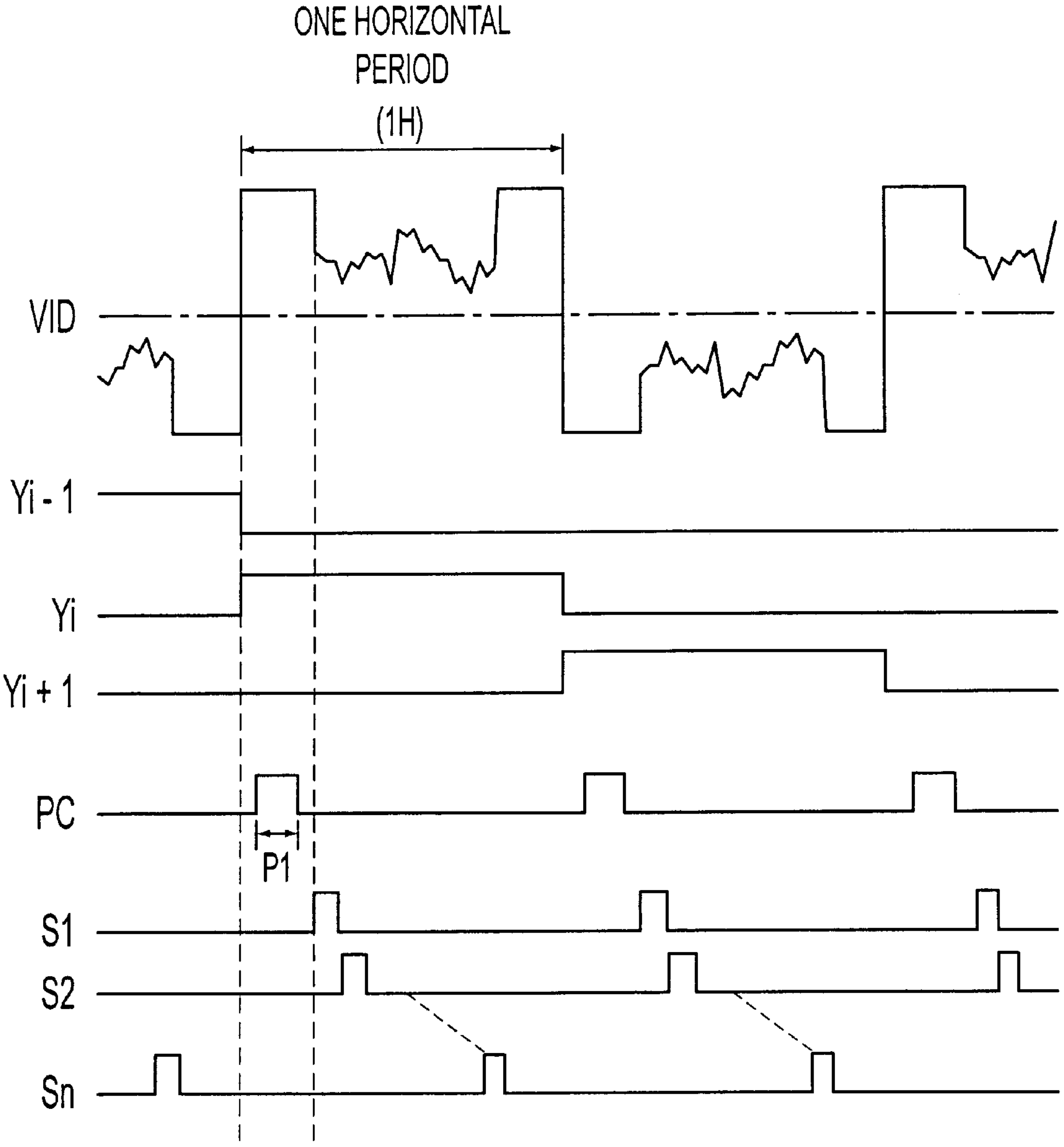
FIG. 20 is a timing chart illustrating the general operation of the active-matrix-type liquid-crystal apparatus of the sixth embodiment of the present invention.
Figure 21:
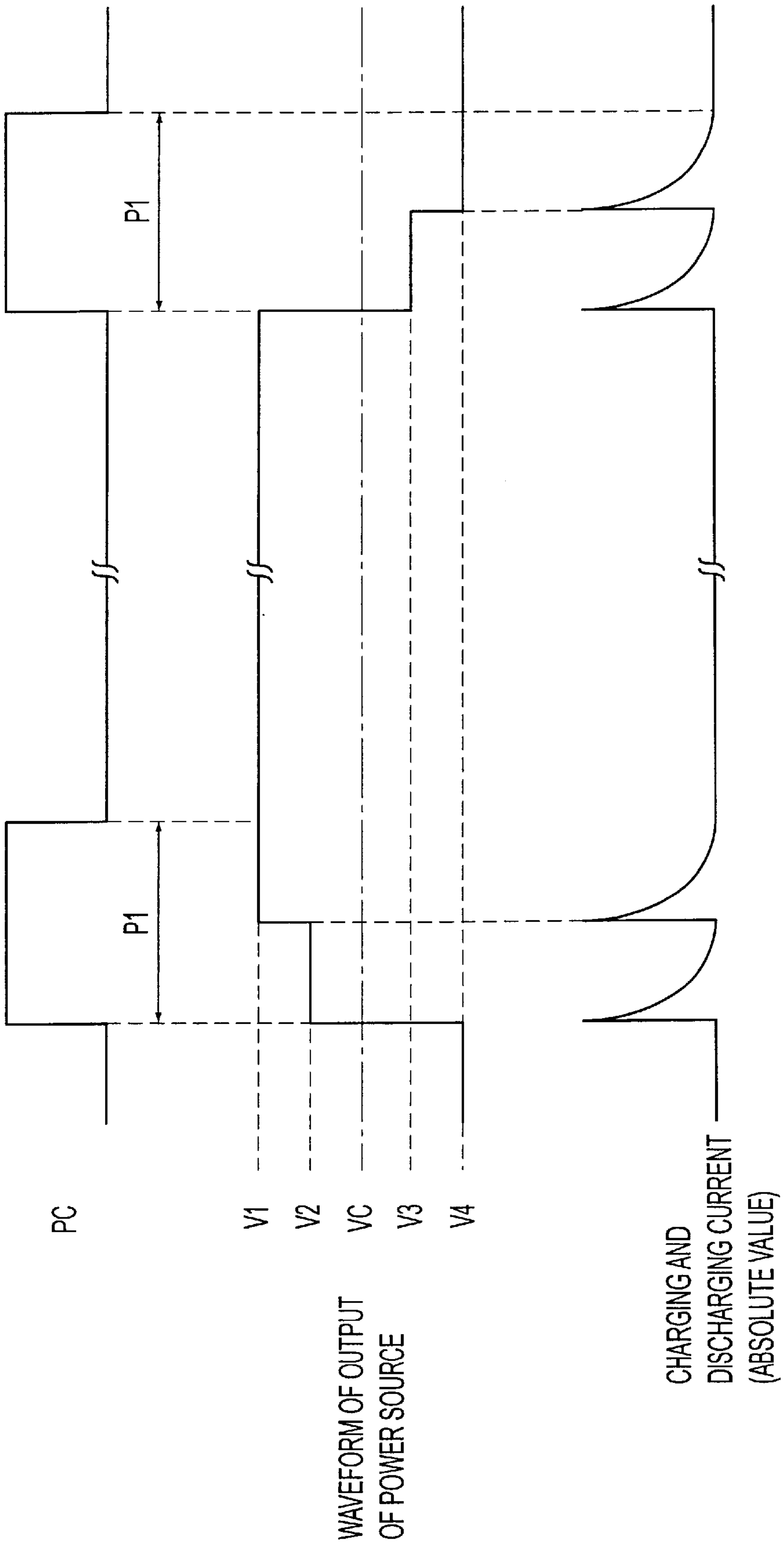
FIG. 21 is a timing chart illustrating an example of the output waveforms of a voltage power source shown in FIG. 19.

Referring to timing charts in FIG. 20 and FIG. 21, the driving method of the active-matrix-type liquid-crystal apparatus shown in FIG. 19 is now discussed in detail.

In response to the input of the Y-side shift data signal DY, the scanning line driving circuit 102 successively outputs the Y-side shift register output signals, each having a pulse width of 1H, to the scanning lines in synchronization with the Y-side shift clock signal CLY. FIG. 20 shows the state in which the Y-side shift register output signals are successively output to any given row of scanning lines Yi−1, Yi, and Yi+1.

When the respective thin-film transistors T in a row become conductive with the Y-side shift register output signals given, the precharge circuit driving signal PC is output, causing the precharge switches TP1, TP2, . . . , TPn to be conductive and writing the output of the voltage power source 604 onto the respective data lines X and respective liquid-crystal pixels LC.

In response to the input of the X-side shift data signal DX, the data line driving circuit 104 successively outputs the sampling signals S1, S2, . . . , Sn in synchronization with the X-side shift clock signal CLX, turning successively the sampling switches TS1, T2, . . . , Tn conductive, connecting successively the image signal VID to the data lines X1, X2, . . . , Xn, and thereby writing the image signal VID supplied to the data lines X onto the respective liquid-crystal pixels LC via the thin-film transistors T for the respective pixels.

This embodiment provides an example in which the polarity of the image signal is inverted every scanning line in the liquid-crystal panel, namely, the line inversion driving method, and when a image signal line having a positive polarity with respect to the central potential of the amplitude of the image signal VID (dot-dash line) as shown in FIG. 20 is written onto a row of liquid crystal pixels, a negative polarity image signal is written on a next row of liquid crystal pixels, and these steps are repeated. In a next vertical scanning period (frame), a negative polarity image signal is written on the liquid-crystal pixels on which a positive polarity image signal was written while a positive polarity image signal is written on the liquid-crystal pixels on which a negative polarity image signal was written.

Reference is made to FIG. 21 which shows the waveforms of the outputs of the voltage power source 604.

The voltage power source 604 writes the positive polarity or negative polarity image signal onto the liquid-crystal pixels LC during the horizontal scanning period (the polarity in the liquid-crystal pixel refers to the polarity of the electric field taking place to the potential VC of the opposite electrode facing the pixel electrode, and the polarity of the image signal supplied to the data line refers to the one relative to the central potential of the amplitude of the image signal or relative to the opposite electrode potential VC). When the positive polarity image signal is written onto the liquid-crystal pixel LC, the voltage power source 604 outputs successively voltages of level V2 and level V1 to the data lines and liquid-crystal pixels LC within a period P1 during which the precharge circuit driving signal PC is output. The voltage levels V2 and V1 are positive in polarity relative to the opposite electrode potential VC. After these voltage levels are applied, the positive polarity image signal is successively sampled in response to the sampling signals S1–Sn from the data line driving circuit 104, and is written onto the liquid-crystal pixels LC through the data lines X and the thin-film transistors T.

When the positive polarity image signal is written onto the liquid-crystal pixels LC, the data lines X are in the potential state of negative polarity image signal in the prior horizontal scanning period, and the liquid-crystal pixels LC are held in the potential of the negative polarity image signal that was written before the vertical scanning period (one frame). By precharging the data lines X and liquid-crystal pixels LC with a positive polarity potential level of the voltage power source 604 prior to the application of the positive polarity image signal opposite in polarity to the preceding image signal, charging and discharging of the data lines and liquid-crystal pixels are completed at the application of the image signal, and the image signal is sufficiently written thereon.

In the horizontal scanning period for writing the negative polarity image signal, on the other hand, the voltage power source 604 successively outputs voltages of level V3 and V4 to the data lines X and liquid-crystal pixels LC within the period P1 during which the precharge circuit driving signal PC is output. The voltage levels V3 and V4 are negative polarity potential relative to the opposite electrode potential VC. After these voltage levels are applied, the negative polarity image signal is written onto the liquid-crystal pixels LC through the data lines X and the thin-film transistors T after sampled by the sampling signals S1–Sn of the data line driving circuit 104.

When the negative polarity image signal is written onto the liquid-crystal pixels LC, the data lines X are in the potential state of positive polarity image signal during the prior horizontal scanning period, and the liquid-crystal pixels LC are held in the potential of the positive polarity image signal that was written before the vertical scanning period (one frame). By precharging the data lines X and liquid-crystal pixels LC with a negative polarity potential level of the voltage power source 604 prior to the application of the negative polarity image signal opposite in polarity to the preceding image signal, charging and discharging of the data lines and liquid-crystal pixels are completed at the application of the image signal, and the image signal is sufficiently written thereon.

The positive polarity and negative polarity of the image signal and the voltage level refer to the ones (potentials applied to the pixel electrode) relative to the opposite electrode potential VC when the image signal and the voltage are applied to the liquid-crystal pixels LC. According to the present invention, V2 and V3 have the above described function of spreading the charging and discharging current within the precharge period P1. Specifically, in the conventional art in which the precharging is carried out based on two levels of V1 and V4 only, the charging and discharging current is concentrated at the start of the precharge period P1, but in this embodiment, the addition of V2 and V3 disperses the timings of the charging and discharging current flowing, to the start of the period P1, a period subsequent to the transition from V2 to V1, and a period subsequent to the transition from V3 to V4. Furthermore, the data lines X and liquid-crystal pixels LC remaining at the opposite polarity potential immediately prior to the precharging is stepwise changed in potential until the polarity is inverted, the initial precharge potential level is set to be low and the charging and discharging current is dispersed so that the peak values of the precharge signal are thus lowered. The application timing and voltage level of V2 and V3 are determined by the characteristics of the individual liquid-crystal panels and driving circuits.

Since the charging and discharging current in the data lines and liquid-crystal pixels is dispersed with their variation peak reduced, variations due to the charging and discharging current in the opposite electrode potential, the capacitance electrode potential, and the circuit GND line potential common to that of the voltage power source 604 are accordingly reduced, and noise is controlled, and the risk of erratic operation of the device is substantially reduced.

The voltage power source 604 may output three-level voltages with one level common to V2 and V3, or output five-level voltages with an additional level voltage introduced, or output voltages of multi-level higher than five-level. When the number of potential levels is an odd number, the potential at an intermediate level is preferably made equal to the opposite electrode potential VC with the voltage applied to the pixel electrode so that the potential of the power source required for driving the liquid-crystal panel and the supply terminal of the power source potential to the liquid-crystal panel are made common. During a period in which the precharge circuit driving signal PC is at a low level, namely, the precharging is not performed, the output of the voltage power source 604 may take any voltage value.

The discussion of this embodiment is made on the assumption that the liquid-crystal pixels are driven in the line inversion driving method, but the dot inversion driving method may also be used. In this case, the image signal to be supplied to the data lines is inverted in polarity every data line during one horizontal scanning period. The image signal written onto a row of liquid-crystal pixels is also inverted in polarity every pixel. For this reason, the potential level precharged is inverted in polarity every data line so that the potential level is of the same polarity as that of the image signal to be applied immediately subsequent thereto and the polarity of the voltage level is also inverted every vertical scanning period. For example, when the voltage levels V1 and V2 are successively applied to the data line X1, the voltage levels V3 and V4 are successively applied to the data line X2. In the next vertical scanning period, V3 and V4 are successively applied to the data line X1 and V1 and V2 are successively applied to the data line X2.

In the above embodiment, the waveforms of the outputs of the voltage power source 604 are controlled in precharging, chiefly to control the variations in the GND potential, and by controlling the output waveforms from the voltage power source 604, variations in the precharging attributed to the signal delay, namely, variations in the amount of charge supplied to each pixel through precharging, are also restricted. By appropriately setting the output waveforms from the voltage power source 604, this embodiment of the liquid-crystal apparatus presents a high-quality image with the luminance (transmittance ratio) non-uniformity and chrominance non-uniformity minimized.

In the present invention, the above-described voltage level output form the voltage power source 604 is called the precharge signal.

[Seventh Embodiment]

Figure 22:
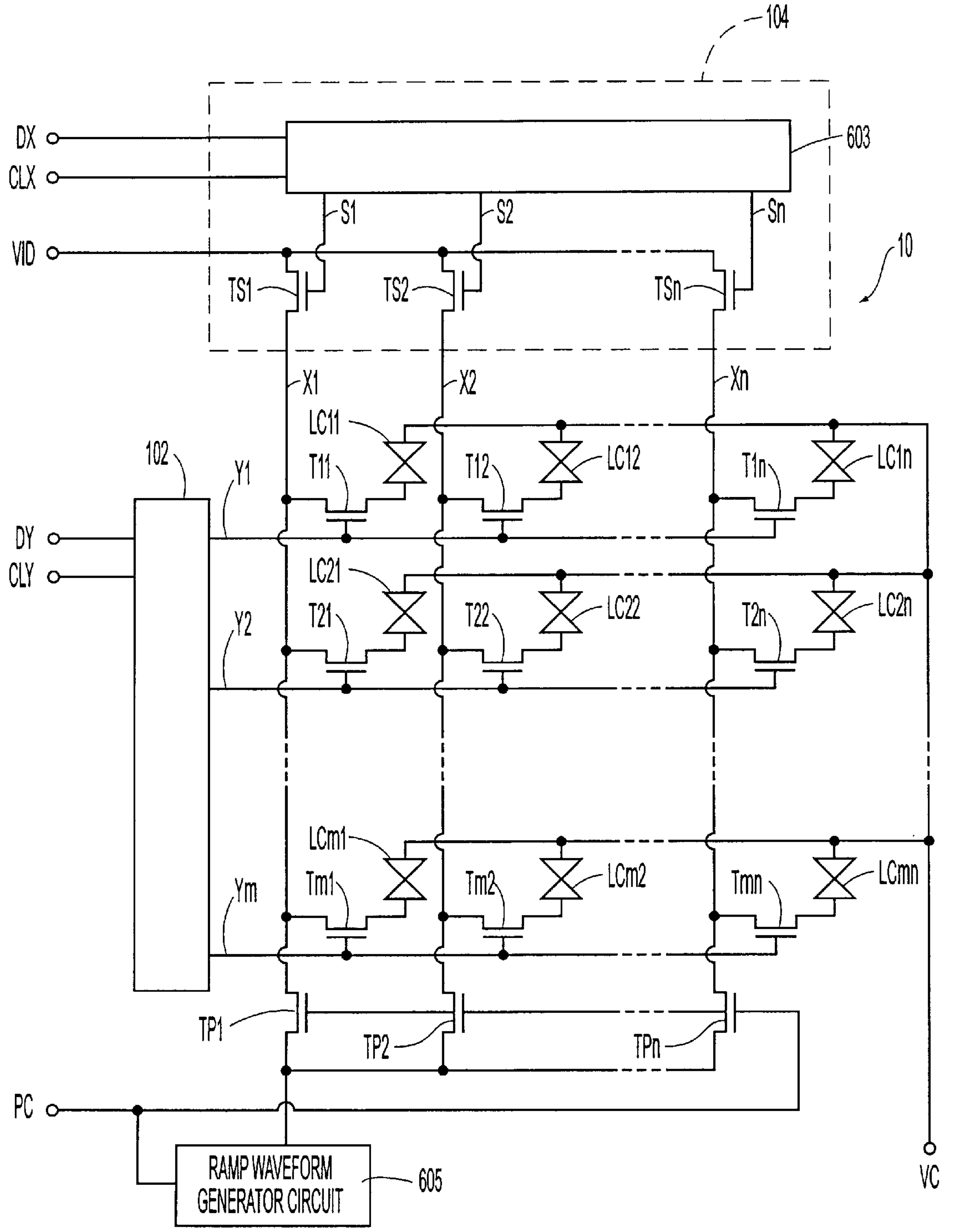
FIG. 22 is a schematic diagram illustrating an active-matrix-type liquid-crystal apparatus of a seventh embodiment of the present invention.

Referring to FIG. 22, a seventh embodiment of the active-matrix-type liquid-crystal apparatus is discussed as an example of electro-optical apparatus of the present invention.

FIG. 22 shows a liquid-crystal panel block 10 of the active-matrix-type liquid-crystal apparatus of this embodiment.

In this embodiment, a scanning line driving circuit 102, a data line driving circuit 104, liquid-crystal pixels LC11, LC12, . . . , LCmn in a matrix form, thin-film transistors T11, T12, . . . , Tm, and precharge switches TP1, TP2, . . . , TPn for precharging remain unchanged from those of the sixth embodiment in terms of construction and operation. In this embodiment, a ramp waveform generating circuit 605 is substituted for the voltage power source 604. The output waveforms of the precharge circuit driving signal PC and the precharge signal in this embodiment are shown in the timing chart of FIG. 23.

Figure 23:
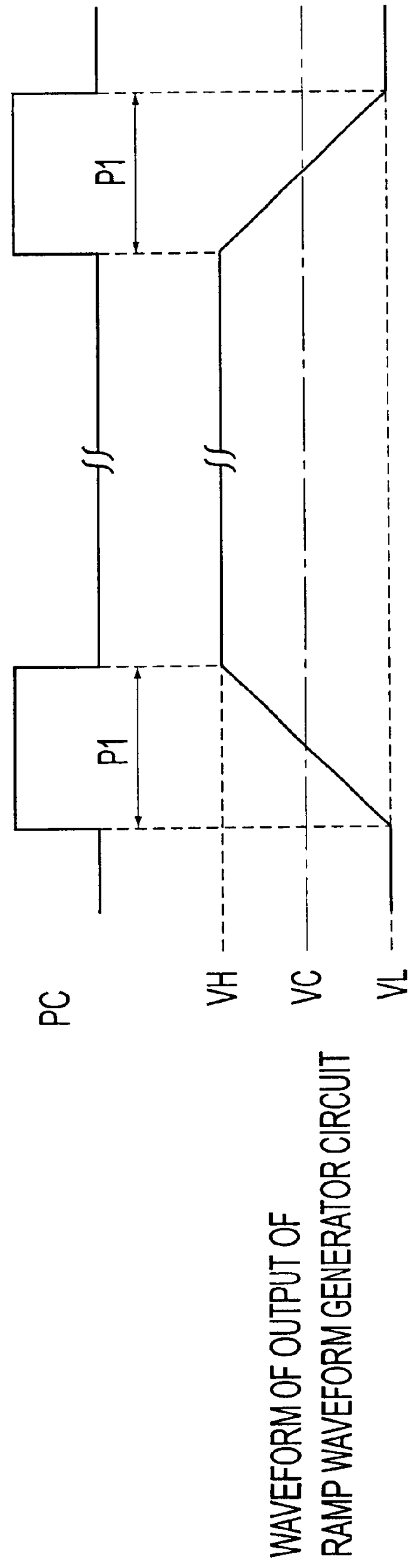
FIG. 23 is a timing chart illustrating an example of the output waveform of a ramp waveform generating circuit shown in FIG. 22.

In the horizontal scanning period during which the positive polarity image signal V1D is written onto the liquid-crystal pixels LC, the ramp waveform generating circuit 605 outputs a ramp waveform having a voltage level changing from VL to VH during the period P1 of the precharge circuit driving signal PC prior to the sampling and supplying of the image signal to the data lines as shown in FIG. 23. In the horizontal scanning period during which the negative polarity image signal V1D is written, the ramp waveform generating circuit 605 outputs a ramp waveform having a voltage level changing from VH to VL during the period P1 within the horizontal scanning period.

When the positive polarity image signal is written onto the liquid-crystal pixels LC, the data lines X are in the potential state of negative polarity image signal during the prior horizontal scanning period, and the liquid-crystal pixels LC are held in the potential of the negative polarity image signal that was written prior to the vertical scanning period (one frame). By precharging the data lines X and liquid-crystal pixels LC with the ramp waveform, changing from the negative polarity to the positive polarity, output by the ramp waveform generating circuit 605 prior to the application of the positive polarity image signal opposite to the preceding image signal, charging and discharging of the data lines and liquid-crystal pixels are completed at the application of the image signal, and the image signal is sufficiently written thereon.

When the negative polarity image signal is written onto the liquid-crystal pixels LC, the data lines X are in the potential state of positive polarity image signal during the prior horizontal scanning period, and the liquid-crystal pixels LC are held in the potential of the positive image signal that was written prior to the vertical scanning period (one frame). By precharging the data lines X and liquid-crystal pixels LC with the ramp waveform, changing from the positive polarity to the negative polarity, output by the ramp waveform generating circuit 605 prior to the application of the negative polarity image signal opposite to the preceding image signal, charging and discharging of the data lines and liquid-crystal pixels are completed at the application of the image signal, and the image signal is sufficiently written thereon.

The positive polarity and negative polarity of the image signal and the voltage level refer to the ones (potentials applied to the pixel electrode) relative to the opposite electrode potential VC when the image signal and the voltage are applied to the liquid-crystal pixels LC. The ramp waveform has the function of averaging the charging and discharging current within the precharge period P1.

Since the charging and discharging current in the data lines and liquid-crystal pixels is averaged and dispersed, variations, due to the charging and discharging current, in the opposite electrode potential, the capacitance electrode potential, and the circuit GND potential common to that of the output circuit of the precharge voltage are accordingly reduced, and noise is controlled, and the risk of erratic operation of the device is substantially reduced.

The ramp waveform output by the ramp waveform generating circuit 605 may be trapezoidal with its voltage level reaching VH in the midway point in the period P1 and its level kept thereafter. During a period in which the precharge circuit driving signal PC is at a low level, namely, the precharging is not performed, the output of the ramp waveform generating circuit 605 may take any voltage value.

The discussion of this embodiment is made on the assumption that the liquid-crystal pixels are driven in the line inversion driving method, but the dot inversion driving method may also be used. In this case, the image signal to be supplied to the data lines is inverted in polarity every data line during one horizontal scanning period. The image signal written onto a row of liquid-crystal pixels is also inverted in polarity every pixel. For this reason, the potential level precharged is inverted in polarity every data line so that the potential level is of the same polarity as that of the image signal to be applied immediately subsequent thereto and the polarity of the voltage level is also inverted every vertical scanning period. For example, when the ramp waveform with its voltage level changing from VL to VH is applied to the data line X1, the ramp waveform with its voltage level changing from VH to VL is applied to the data line X2. In the next vertical scanning period, the ramp waveform with its voltage level changing from VH to VL is applied to the data line X1, and the ramp waveform with its voltage level changing from VL to VH is applied to the data line X2.

In this embodiment, as in the first through fifth embodiments, by controlling appropriately the output waveforms from the ramp waveform generating circuit 605, variations in the precharging attributed to the signal delay are also restricted. By appropriately setting the output waveforms from the ramp waveform generating circuit 605, this embodiment of the liquid-crystal apparatus presents a high-quality image with the luminance (transmittance ratio) non-uniformity and chrominance non-uniformity minimized.

In the present invention, the signal having the above-described waveform output from the ramp waveform generating circuit 605 is called the precharge signal.

[Eighth Embodiment]

Figure 24:
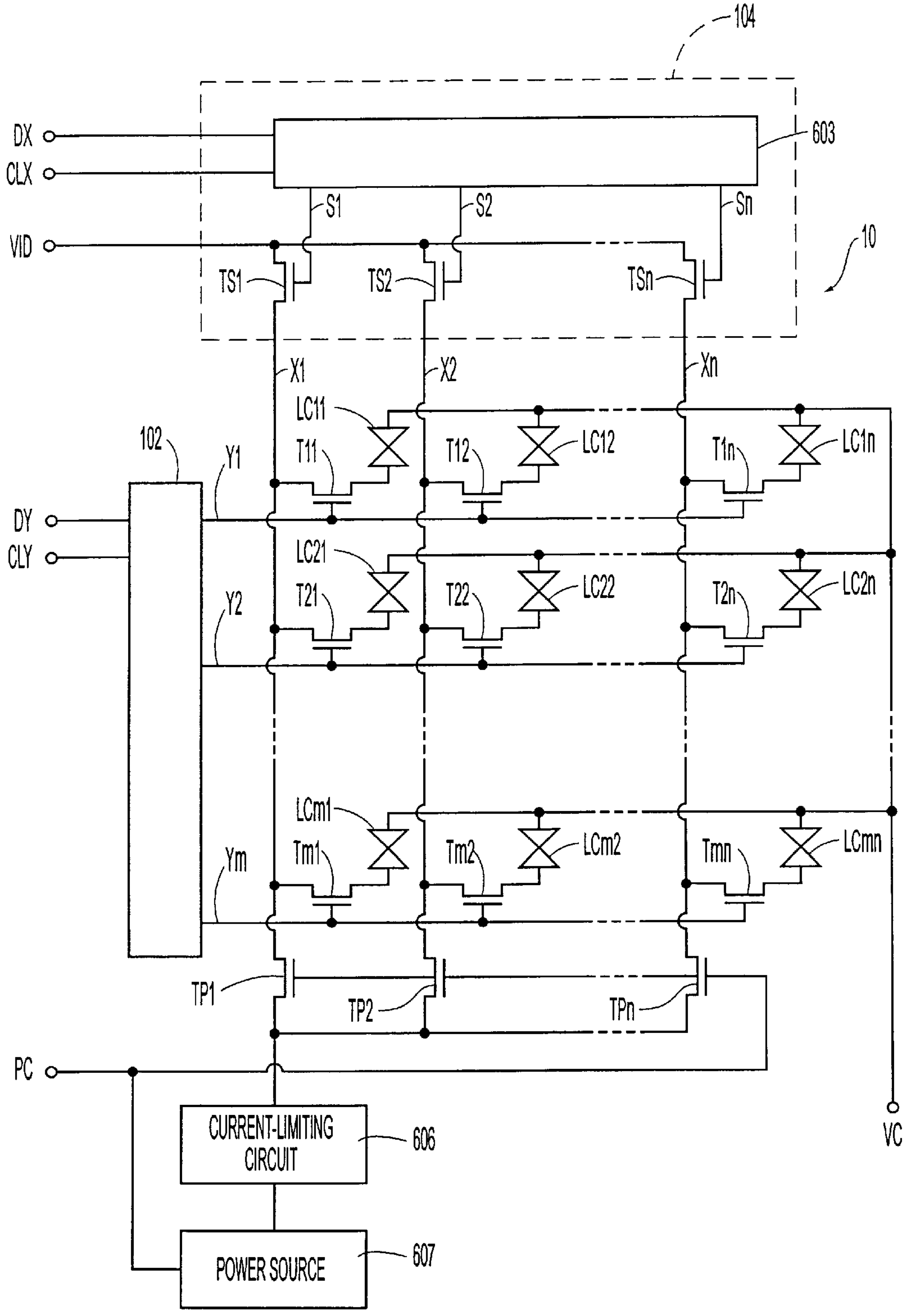
FIG. 24 is a schematic diagram illustrating an active-matrix-type liquid-crystal apparatus of an eighth embodiment of the present invention.

Referring to FIG. 24, an eighth embodiment of the active-matrix-type liquid-crystal apparatus is discussed as an example of electro-optical apparatus of the present invention.

FIG. 24 shows a liquid-crystal panel block 10 of the active-matrix-type liquid-crystal apparatus of this embodiment.

In the liquid-crystal apparatus of this embodiment, a scanning line driving circuit 102, a data line driving circuit 104, liquid-crystal pixels LC11, LC12, . . . , LCmn in a matrix form, thin-film transistors T11, T12, . . . , Tm, and precharge switches for precharging, TP1, TP2, . . . , TPn, remain unchanged from those of the sixth and seventh embodiments in terms of construction and operation. In this embodiment, a voltage power source 607 is substituted for the voltage power source 604 in the sixth embodiment and the ramp waveform generating circuit 605 in the seventh embodiment. The voltage power source 607 has the same construction as that of the voltage power source 604 or the ramp waveform generating circuit 605, and operates in the same manner as the voltage power source 604 or the ramp waveform generating circuit 605, and thus outputs the same precharge signal as the voltage power source 604 or the ramp waveform generating circuit 605. The voltage power source 607 may output a positive polarity constant-potential (for example, V1 in FIG. 21, VH in FIG. 23) and a negative polarity constant-potential (for example, V4 in FIG. 21, VL in FIG. 23), as a precharge signal, as in the conventional art. This embodiment is characterized by its added current-limiting circuit 606.

The current-limiting circuit 606 limits an output current to below a predetermined value when the voltage power source 607 outputs the precharge signal during the period P1 during which the precharge circuit driving signal PC is output in the horizontal scanning period, and prevents the generation of noise and erratic operation due to excessive charging and discharging current within the precharge period. The absolute value of the current limitation value of the charging current may be set to be different from that of the discharging current. The current limitation value may be varied within the precharge period.

In each of the above embodiments, the storage capacitor of each pixel is formed between the pixel electrode and the capacitance electrode, but alternatively, the storage capacitor may be formed between the preceding-stage scanning line as the capacitance electrode and the pixel electrode. In such a case, variations in potential caused by the charging and discharging current, which are the problem to be solved by the present invention, take place at the preceding-stage scanning line. If the amount of variations in potential are large, the preceding-stage TFT possibly becomes conductive, causing the already written image signal to be leaked.

[Ninth Embodiment]

A ninth embodiment of the present invention is now discussed.

In this embodiment, a bidirectional shift register is used for the shift register in the data line driving circuit 104 (FIG. 1, FIG. 15, FIG. 16, FIG. 19, FIG. 22 and FIG. 24) and/or the shift register in the precharge signal driving circuit 401 (FIG. 16), described in connection with each of the above embodiments. Such an embodiment as this one with a bidirectional shift register employed can selectively execute a mode in which the image signal is written from right to left and a mode in which the image signal is written from left to right.

With this arrangement, the image can be presented left side right, or upside down and left side right at the same time, if the liquid-crystal panel is used for an 8-mm image monitor, for example. This arrangement is particularly advantageous for color liquid-crystal projector applications, and the liquid-crystal panels are combined as three light valves to construct a color liquid-crystal projector, as will be described later.

In the liquid-crystal apparatus of this embodiment, the waveform of the precharge signal is appropriately changed depending on the direction of writing of the image signal. When the bidirectional shift register inverts the supplying direction of the image signal to the data lines, a luminance (transmittance ratio) non-uniformity sometimes takes place on the display screen depending on the supplying direction of the image signal. The liquid-crystal apparatus of this embodiment changes the waveform of the precharge signal to eliminate a non-uniformity in the distribution of transmittance ratio of the liquid-crystal apparatus depending of the scanning direction of the bidirectional shift register, using the method already described in connection with each of the above embodiments. The liquid-crystal apparatus of this embodiment thus efficiently reduces the luminance (transmittance ratio) non-uniformity involved in the inversion of the screen.

[Description of the Construction of the Liquid-crystal Apparatus]

Referring to FIG. 25–FIG. 32, the diagrams of the liquid-crystal apparatus as one example of the electro-optical apparatus in each of the above-described embodiments are now discussed.

Figure 25:
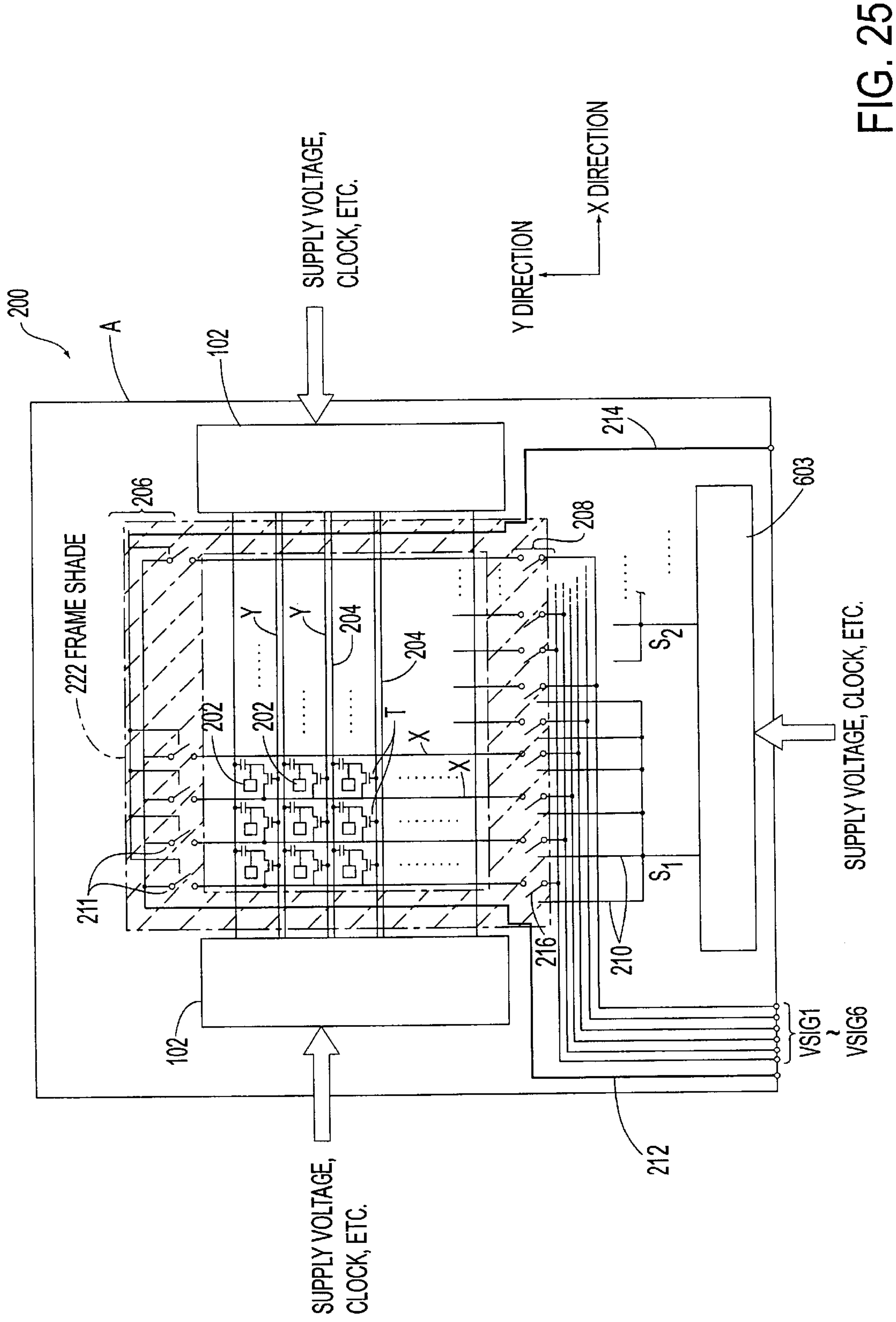
FIG. 25 is a block diagram illustrating the configuration of various wirings and peripheral circuits or the like arranged in the liquid-crystal apparatus of the first through ninth embodiments.

FIG. 25 is a block diagram showing a diversity of wirings, peripheral circuits and the like arranged on a thin-film transistor array substrate (hereinafter referred to as a TFT array substrate) incorporated in a liquid-crystal apparatus 200 of this embodiment. Referring to FIG. 25, the liquid-crystal apparatus 200 includes a TFT array substrate A manufactured of a quartz substrate or hard-glass or the like. Arranged on the TFT array substrate A are a plurality of pixel electrodes 202 in a matrix form, data lines X–Xn each extending in the Y direction and arranged side by side in the X direction, scanning lines Y1–Ym each extending in the X direction and arranged side by side in the Y direction, a plurality of TFTs (T11–Tmn) as an example of a switching element, each arranged between one data line X and one pixel electrode 202, for selecting a conductive state and a nonconductive state between the data lines X and the pixel electrodes 202 in response to a scanning signal supplied through the scanning line Y. Also arranged on the TFT array substrate A are capacitance lines 204 (capacitance electrodes), running in parallel with the scanning lines Y, as the wiring for the storage capacitor to be described later.

In this embodiment, the storage capacitor of each pixel is formed of the pixel electrode and the capacitance electrode, but alternatively, the storage capacitor may be formed between the preceding-stage scanning line as the capacitance electrode and the pixel electrode. In such a case, variations in potential attributable to charging and discharging current according to precharging take place at the preceding-stage scanning line. If variations in potential are large, the preceding-stage TFT possibly becomes conductive, causing the already written image signal to be leaked.

Arranged further on the TFT array substrate A are a precharge signal control circuit 206 (corresponding to the precharge switches 172 shown in FIG. 1, FIG. 15, and FIG. 16, and the precharge switches TP1–TPn shown in FIG. 19, FIG. 22 and FIG. 24) for supplying the precharge signal having a predetermined voltage level to the plurality of data lines X prior to the supplying of the image signal, a sampling circuit 208 (corresponding to the sampling switches 106 shown in FIG. 1, FIG. 15 and FIG. 16 and the sampling switches TS1–TSn shown in FIG. 19, FIG. 22 and FIG. 24)for sampling the image signal to supply to the plurality of data lines X respectively, a scanning line driving circuit 102, and a shift register 603 (additionally including a logic circuit for forming a sampling signal S based on its output). In this block diagram, the sampling circuit 208 is separated from the data line driving circuit 104 in the above embodiments.

The scanning line driving circuit 102 line-sequentially applies the Y-side shift register output signal in a pulse form at a predetermined timing based on the power source, a reference clock and the like supplied by an external control circuit.

Based on the power source, the reference clock and the like output by the external control circuit, the shift register 603 supplies sampling signals S–Sn to the sampling circuit 208 via sampling circuit driving signal lines 210 every data line, for each of six image input signal lines VID1–VID6, in synchronization with the timing the scanning line driving circuit 102 applies the Y-side shift register output signal.

The precharge signal control circuit 206 has TFT 211 for each data line. The source electrode of each TFT 211 is connected to a precharge signal line 212. The gate electrode of each TFT 211 is connected to a precharge control signal line 214. An external power source circuit (the voltage power sources 604, 607, the ramp waveform generating circuit 605 in FIG. 19, FIG. 22, and FIG. 24 or the like) supplies the precharge signal to TFT 211 via the precharge signal line 212, while the external control circuit supplies to TFT 211 via the precharge control signal line 214, the precharge circuit driving signal PC required for writing the precharge signal. In response to these signals, TFT 211 writes the precharge signal to each data line at the timing prior to the image signal.

The sampling circuit 208 has TFT 216 for each data line. Image input signal lines VSIG1–VSIG6 are connected to the source electrode of each TFT 216. A sampling circuit driving signal line 210 is connected to the gate electrode of each TFT 216. TFT 216 samples six parallel image signals VID1–VID6 when these image signals VID1–VID6 are input through the image input signal lines VSIG1–VSIG6.

When receiving the sampling signal S from the shift register 603 via the sampling circuit driving signal line 210, TFT 216 concurrently applies the sampled image signals VID1–VID6 from the six image input signal lines VSIG1–VSIG6 to six adjacent data lines, and further successively applies image signals VID1–VID6 to each group of six data lines. In other words, the shift register 603 and the sampling circuit 208 are designed to supply, to the data lines X, the six parallel image signals VID1–VID6 which were expanded into six phases and input from the image input signal lines VSIG1–VSIG6.

Figure 26:
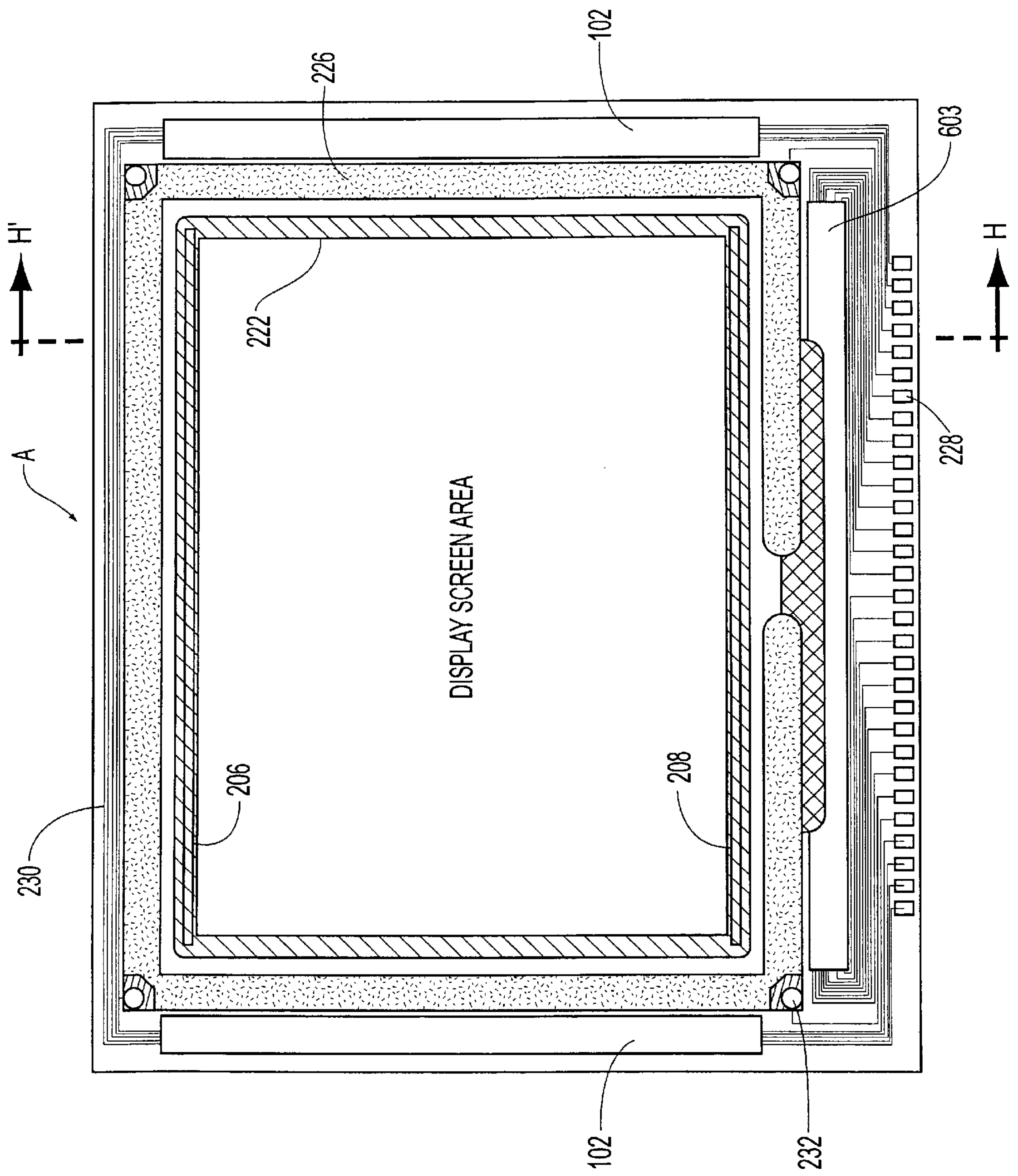
FIG. 26 is a plan view showing a liquid-crystal panel arranged in the liquid-crystal apparatus shown in FIG. 25.
Figure 27:
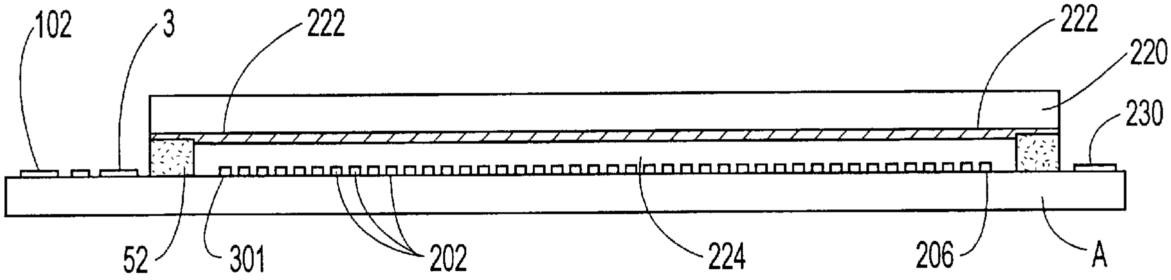
FIG. 27 is a cross-sectional view of the liquid-crystal panel shown in FIG. 26.

The panel construction of the liquid-crystal apparatus is now discussed. FIG. 26 is a plan view of the TFT array substrate with respective elements formed thereon, viewed from an opposite substrate. FIG. 27 is a cross-sectional view of the liquid-crystal apparatus including the opposite substrate, taken along a line H-H' shown in FIG. 26.

In this embodiment, the precharge signal control circuit 206 and the sampling circuit 208 are arranged on the portion of the TFT array substrate A facing a shading light-shielding frame 222 formed on the opposite substrate 220, as represented by a hatched area in FIG. 25, and as shown in FIG. 26 and FIG. 27. On the other hand, the scanning line driving circuit 102 and the shift register 603 are arranged on narrow, elongated marginal portions of the TFT array substrate A outside the area of its liquid-crystal layer 224.

Referring to FIG. 26 and FIG. 27, a sealing material 226 is mounted around a screen display area on the TFT array substrate A. The sealing material 226 glues both substrates together around the screen display area defined by a plurality of pixel electrodes 202 (namely, the area of liquid-crystal panel in which an image is actually presented depending on a change in the alignment status of the liquid-crystal layer 224), and thus surrounds the liquid-crystal layer 224. The sealing material 226 is manufactured of a photo-curing resin as an example of sealing material. The shading light-shielding frame 222 is arranged between the screen display area on the opposite substrate 220 and the sealing material 226. The light-shielding frame 222 is made of a band of shading material having a width of 500 $\mu$m or wider around the screen display area. When the TFT array substrate A is housed later in a light-shielding case having an opening portion corresponding to the screen display area, the light-shielding frame 222 is arranged so that the screen display area is not hidden by the edge of the opening portion of the light-shielding case, due to manufacturing tolerances, specifically, a deviation of several hundreds $\mu$m or so of the TFT array substrate A relative to the case is covered by the light-shielding frame 222.

Arranged outside the sealing material 226 are the shift register 603 and mounting terminals 228 on the lower periphery of the screen display area, and the scanning line driving circuit 102 on both sides of the screen display area. A plurality of wirings 230 are arranged on the topside periphery of the screen display area. Arranged on at least one corner of the opposite substrate 220 is a silver point 232, made of a conductive agent, for achieving electrical conduction between the TFT array substrate A and the opposite substrate 220. The opposite substrate 220 having almost the same outline as the sealing material 226 is rigidly affixed to the TFT array A by the sealing material 226.

[Electronic Apparatus]

Referring to FIG. 28 through FIG. 32, an embodiment of an electronic apparatus incorporating the liquid-crystal apparatus 200 already described in detail is now discussed.

Figure 28:
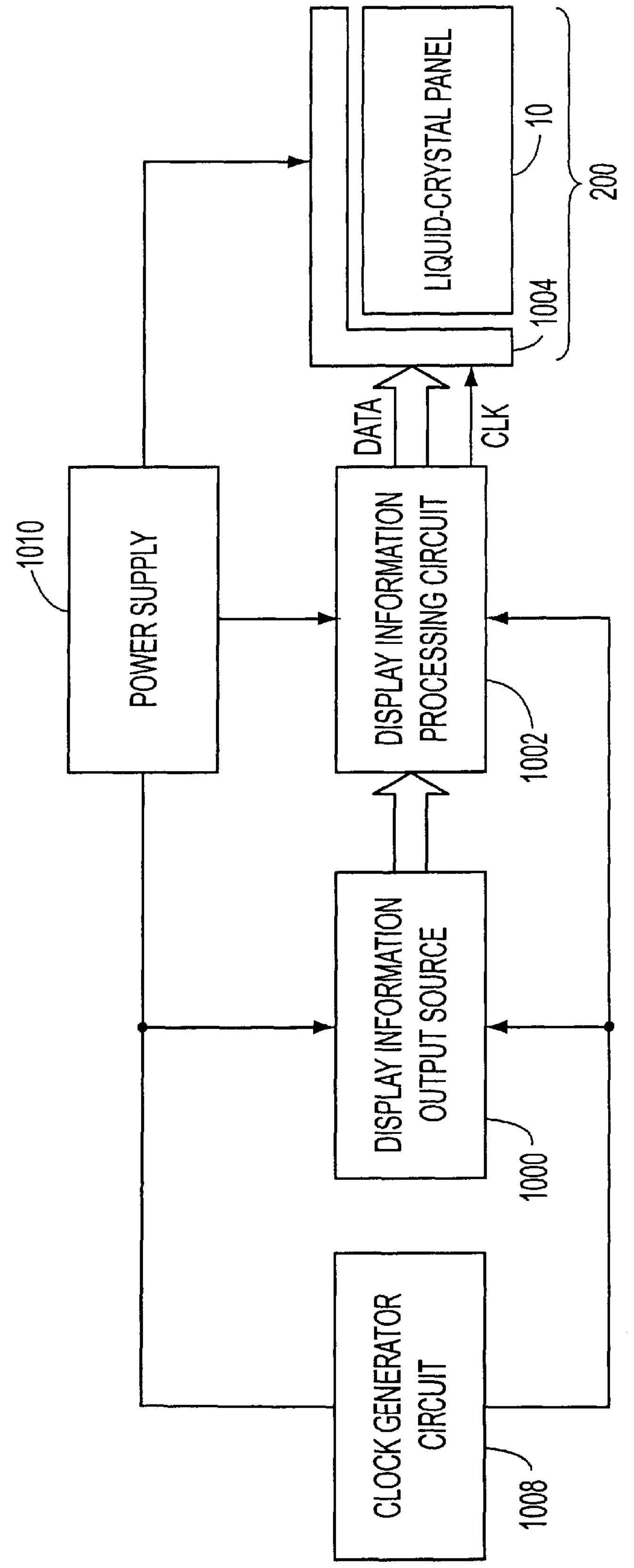
FIG. 28 is a block diagram of an electronic apparatus that incorporates one of the liquid-crystal apparatus of the first through ninth embodiments.

The electronic apparatus shown in FIG. 28 includes a display information output source 1000, a display information processing circuit 1002, a driving circuit 1004 including the already-described scanning line driving circuit 102 and data line driving circuit 104, a liquid-crystal panel block 10, a clock generating circuit 1008 and a power source circuit 1010. The display information output source 1000 includes a memory such as ROM (Read Only Memory), RAM (Random Access Memory), and optical disk device, and a tuning circuit and the like, and outputs display information such as a image signal of a predetermined format to the display information processing circuit 1002, based on a clock from the clock generating circuit 1008.

The display information processing circuit 1002 includes a diversity of known processing circuits such as an amplifier/polarity inversion circuit, a phase expansion circuit, a rotation circuit, a gamma correction circuit, and a clamp circuit, and successively generates a digital signal from display information input based on the clock, and outputs the digital signal together with the clock CLK to the driving circuit 1004. The driving circuit 1004, with its scanning line driving circuit 102 and data line driving circuit 104, drives the liquid-crystal panel block 10 in the already-described driving method. The power source circuit 1010 supplies predetermined power to the above respective circuits. In the liquid-crystal apparatus 200, the driving circuit 1004 is mounted on the TFT array substrate that forms the liquid-crystal panel block 10 as described above. The display information processing circuit 1002 and the driving circuit 1004, may be mounted on the TFT array substrate.

Referring to FIG. 29 through FIG. 32, specific examples of the electronic apparatus thus constructed are discussed.

(Three-panel liquid-crystal projector)

Figure 29:
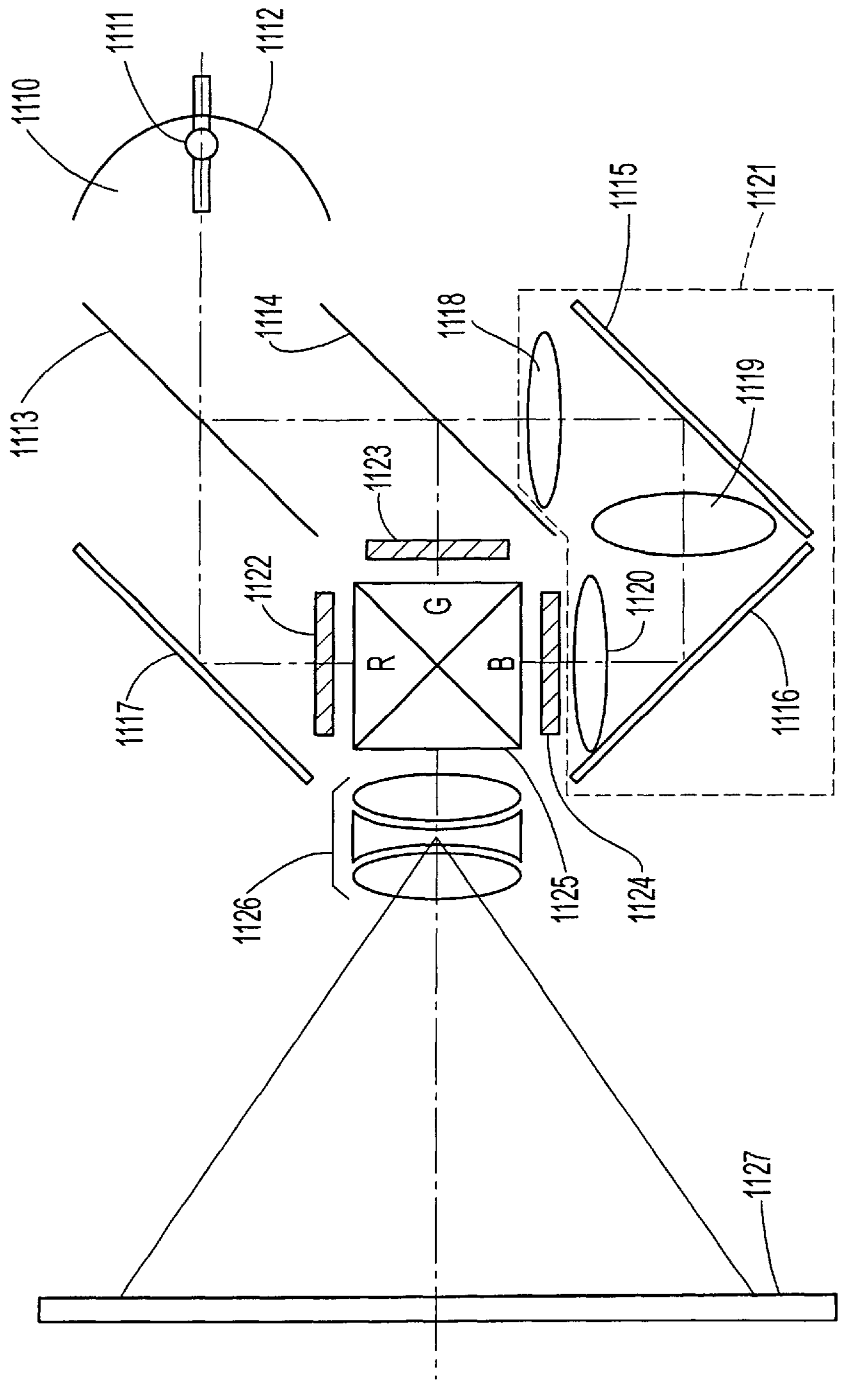
FIG. 29 is a block diagram roughly illustrating the construction of a three-panel-type liquid-crystal projector employing one of the liquid-crystal apparatus of the first through ninth embodiments.

Referring to FIG. 29, a liquid-crystal projector 1100 as one example of the electronic apparatus is a projection-type liquid-crystal projector, and includes a light source 1110, dichroic mirrors 1113 and 1114, reflective mirrors 1115, 1116, and 1117, an incident lens 1118, a relay lens 1119, an outgoing lens 1120, liquid-crystal light valves 1122, 1123, and 1124, a cross-dichroic prism 1125, and a projection lens 1126. The liquid-crystal light valves 1122, 1123, and 1124 are three units of the already-described liquid-crystal apparatus 200, and each is used as a liquid-crystal light valve. The light source 1110 includes a lamp 1111 of metal halide or the like and a reflector 1112 for reflecting light from the lamp 1111.

In the liquid-crystal projector 1110 thus constructed, the dichroic mirror 1113 reflecting blue and green color lights transmits a red color light of a white luminous flux coming in from the light source 1110 while reflecting the blue and green color lights. The transmitted red color light is reflected from the reflective mirror 1117, and is incident on a red color liquid-crystal light valve 1122. The green color light of the color light lights reflected from the dichroic mirror 1113 is reflected from the green color light reflective dichroic mirror 1114, and is incident on the green color liquid-crystal light valve 1123. The blue color light is transmitted through the second dichroic mirror 1114. To compensate for a light loss along a long optical path, light guide means 1121, including a relay lens system composed of the incident lens 1118, the relay lens 1119, and the outgoing lens 1120, is arranged for the blue light. After being transmitted through the light guide means 1121, the blue light is incident on the blue color liquid-crystal light valve 1124. The three color lights, modulated by their respective light valves, are then incident on the cross-dichroic prism 1125. This prism is constructed by gluing four rightangle prisms with a dielectric multilayered film reflecting the red light and a dielectric multilayered film reflecting the blue light interposed in a cross configuration in the interfaces between the rightangle prisms. These dielectric multilayered films synthesize the three color lights forming light displaying a color image. The projection lens 1126 as a projection optical system projects the synthesized light onto the screen 1127 to display the enlarged image on the screen 1127.

Since each of the light valves incorporating the liquid-crystal apparatus of the present invention is free from the luminance non-uniformity, the color liquid-crystal projector with such a valve built in benefits from the advantage, thereby presenting an excellent image free from chrominance non-uniformity. The advantages provided by the color liquid-crystal projector when the liquid-crystal apparatus of the present invention is used are now discussed.

The color liquid-crystal projector shown in FIG. 29 is a three-panel liquid-crystal projector, and employs a colorless liquid-crystal apparatus with no color filter formed as a light valve, and thus employs the three light valves 1122, 1123, and 1124 separately for RGB colors. The light valves are irradiated with the respective color lights of R, G, and B as shown in FIG. 29. The three color lights, which are separately modulated by the three light valves 1122, 1123, and 1124, are synthesized by the dichroic mirror or prism 1125 into a single projected light beam, which is then projected on the screen 1127.

When the three color lights are synthesized using the prism 1125, the G light is not reflected from the prism 1125, in contrast to the R light and the B light subsequent to modulation, the number of inversions of G light is therefore smaller by one than the number of inversions of the other lights. This phenomenon occurs in the R light or B light instead of in the G light if an optical system is arranged so that the R light or B light is not reflected from the prism 502, and the same phenomenon also occurs when the three color lights are synthesized using the dichroic mirrors or the like. In such a case, the image signal of the G light needs to be inverted left side right in some way.

Figure 30A:
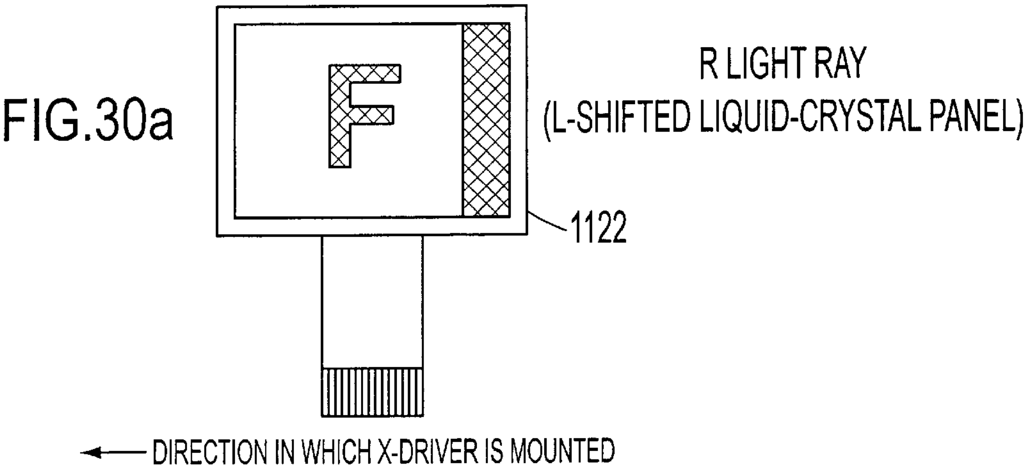
FIGS. 30(*a*), 30(*b*) and 30(*c*) show display states in color light valves in the three-panel-type liquid-crystal projector, wherein FIG. 30(*a*) shows the display state for a light valve for red-color, FIG. 30(*b*) shows the display state for a light valve for green-color, and FIG. 30(*c*) shows the display state for a light valve for blue-color.
Figure 30B:
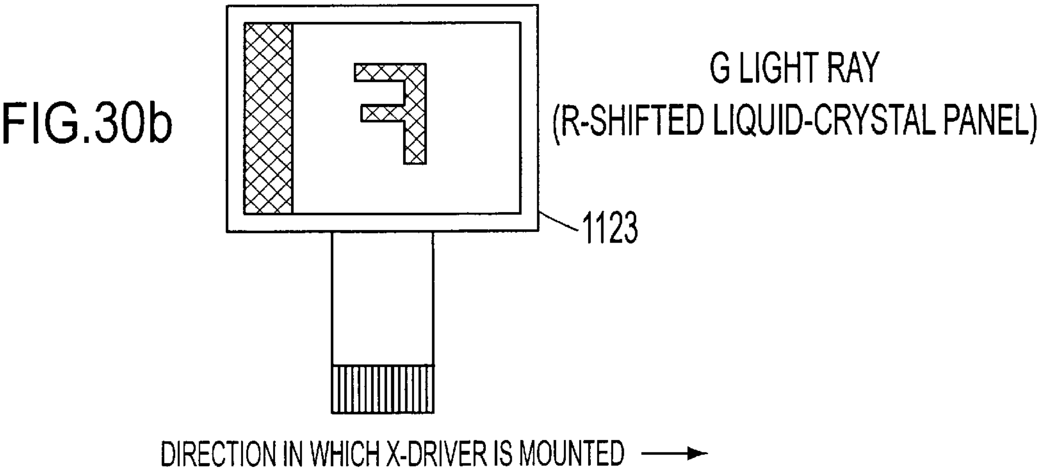
Figure 30C:
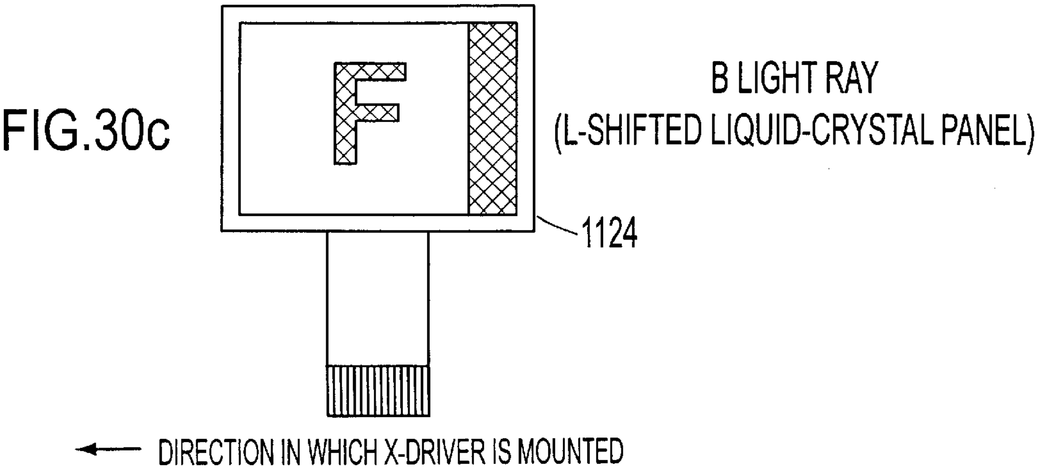

For example, using the liquid-crystal apparatus of the ninth embodiment, namely, the liquid-crystal apparatus employing the bidirectional shift register, the image signal of the G light may be inverted to appear left side right as shown in FIG. 30. Using the liquid-crystal apparatus described above, the data line driving circuit 104 causes the light valve 1123 irradiated with the G light to shift-in the scanning direction from left to right as shown in FIG. 30(*b*), and the other light valves 1122 and 1124 to shift in the scanning direction from right to left as shown in FIG. 30(*a*) and FIG. 30(*c*).

With this arrangement, the light valve 1123 only, irradiated with the G light, has a different direction of writing of the precharge signal. However, with the liquid-crystal apparatus of the ninth embodiment described above employed, the generation of luminance non-uniformity and chrominance non-uniformity is prevented in either scanning direction. The liquid-crystal projector having the above arrangement efficiently prevents the chrominance non-uniformity from developing in the course of image synthesis.

As described above, the liquid-crystal apparatus 200 having one of the constructions discussed in connection with the first through ninth embodiments, sufficiently controls the luminance non-uniformity between the left portion and the right portion of the display screen even when there is a parasitic capacitance in the precharge signal line and the precharge gate line, by changing the precharge signal continuously or stepwise with time. When the liquid-crystal apparatus 200 of one of the embodiments is incorporated for the light valves of the three-panel liquid-crystal projector shown in FIG. 29, the generation of the luminance non-uniformity is prevented in all light valves 1122, 1123, and 1124, and the luminance non-uniformity and chrominance non-uniformity between a text area "F" and band areas are eliminated from all images in FIG. 30(*a*), FIG. 30(*b*), and FIG. 30(*c*). Even when the display image on the light valve 1123 only is inverted to synthesize the three color lights, the synthesized image is free from chrominance non-uniformity, and becomes an excellent color image.

Considering that the image of the color liquid-crystal projector is projected in an enlarged size on a screen, and that the vision of humans is particularly sensitive to a chrominance non-uniformity, it is particularly advantageous to incorporate the liquid-crystal apparatus of each of the above embodiments in the liquid-crystal projector.

When a fast display mode such as an XGA mode or EWS mode is adopted, the number of data lines is doubled in comparison with the conventional display mode. The parasitic capacitance attached to the lines for transmitting the precharge signal along with the increase of the data lines is also approximately doubled. In the liquid-crystal apparatus of the above embodiments, the precharge signal is changed continuously or stepwise with time while the waveform of the precharge signal is controlled depending on the transfer direction of the image signal, and the generation of luminance non-uniformity and chrominance non-uniformity is controlled, and a high-definition and excellent image display is thus presented.

(Two-panel liquid-crystal projector)

Figure 31:
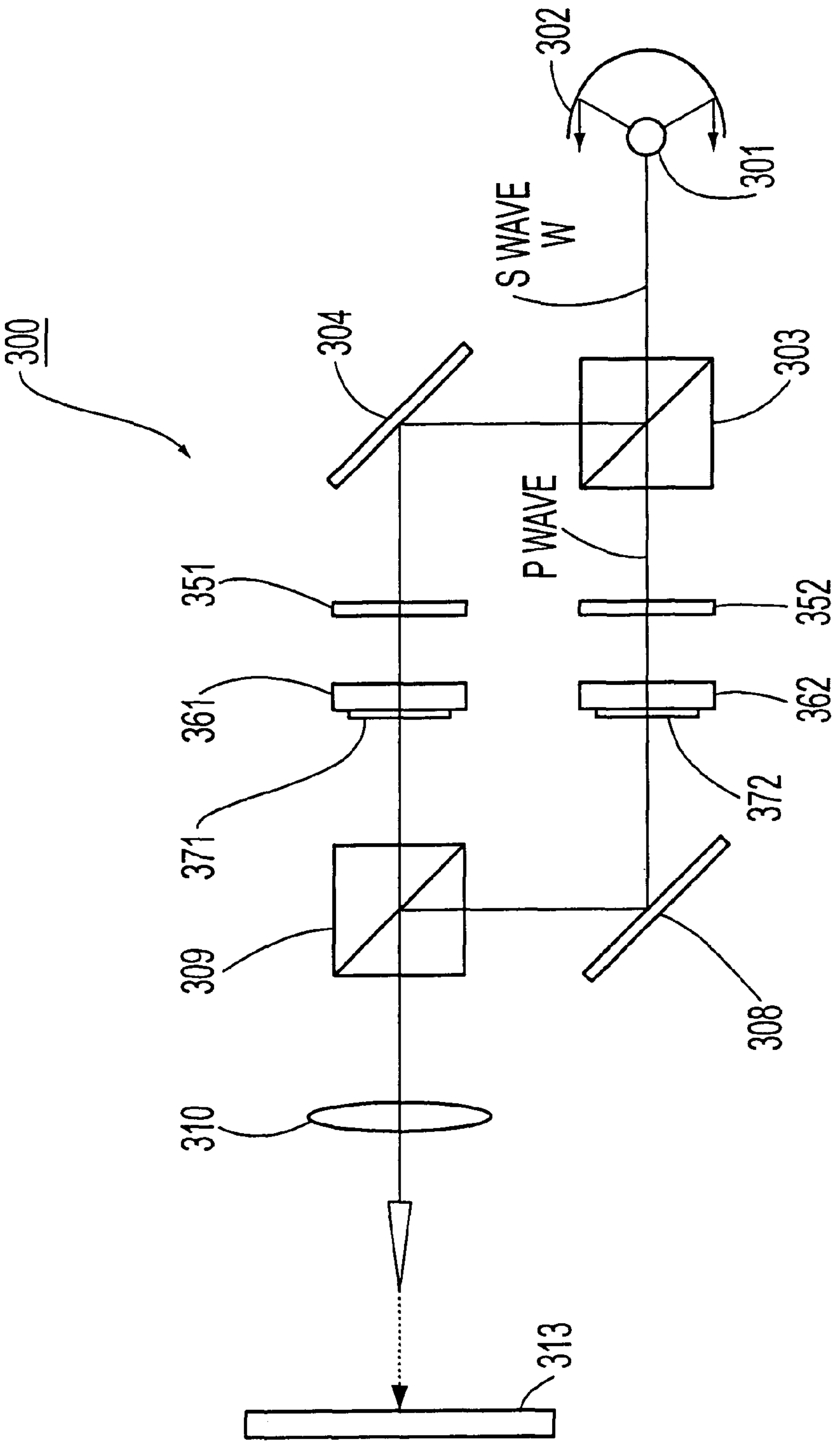
FIG. 31 is a block diagram roughly illustrating a two-panel-type liquid crystal projector employing one of the liquid-crystal apparatus of the first through ninth embodiments.
Figure 32:
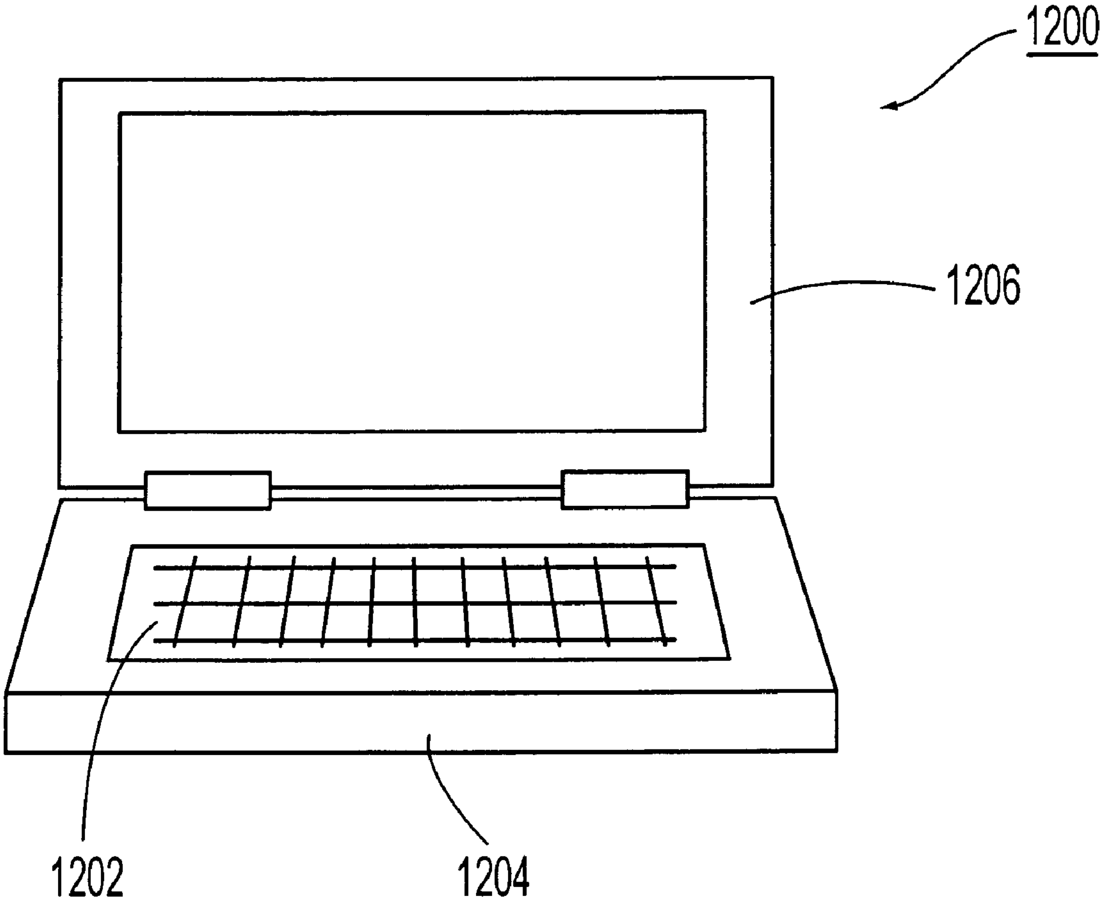
FIG. 32 is a front view showing a personal computer employing one of the liquid-crystal apparatus of the first through ninth embodiments.

FIG. 31 shows an example of two-panel liquid-crystal projector incorporating the liquid-crystal apparatus of the present invention. In the liquid-crystal projector 300 shown in FIG. 31, the light from a light source lamp 301 is collimated by a reflective mirror 302 into a white parallel luminous flux W, which is then incident on a polarizing beam splitter 303. A P-polarized luminous flux, separated by the polarizing beam splitter 303, is transmitted through an incident side polarizer 352, and is then incident on a first liquid-crystal light valve 362 having RGB color filter layers. The first liquid-crystal light valve 362 has an outgoing polarizer 372 which is glued thereto in an optically tight state, and modulates the incoming P-polarized luminous flux in accordance with a given image.

An S-polarized luminous flux, reflected from a mirror 304, is transmitted through an incident polarizer 351 and is incident on a second liquid-crystal light valve 361 having CMY color filter layers that are in a complementary color relationship with RGB. The second liquid-crystal light valve 361 has an outgoing polarizer 371 which is glued on its outgoing surface in an optically tight state, and modulates the incoming P-polarized luminous flux in accordance with given image information.

The outgoing modulated luminous fluxes formed through the respective liquid-crystal light valves 361 and 362 are synthesized by a polarizing beam synthesizer 309 into a single modulated luminous flux to form a synthesized image. The synthesized image is enlarged and projected on a projection surface 313 such as a screen through a projection lens 310.

Since the liquid-crystal projector, employing the two liquid-crystal light valves 361 and 362, ensures the luminance of the projected image while ensuring reproducibility of color, the liquid-crystal projector presents a higher color purity and brighter projected image than the conventional two-panel liquid-crystal projector. Since the liquid-crystal light valves 361 and 362 are free from luminance non-uniformity and chrominance non-uniformity, the synthesized image is also free from chrominance non-uniformity, and a high-quality image is thus presented.

The liquid-crystal apparatus of each of the above embodiments is implemented not only in a three-panel liquid-crystal projector but also in a two-panel liquid-crystal projector, and the liquid-crystal apparatus of the present invention, in either type of liquid-crystal projector, presents a high-quality image display free from luminance non-uniformity and chrominance non-uniformity.

(Laptop personal computer)

Referring to FIG. 31, a laptop personal computer 1200 as another example of the electronic apparatus has an above described liquid-crystal panel block 10 in its top cover case, and a main body 1204 housing a CPU, a memory, a modem and a keyboard 1202.

The liquid-crystal apparatus of the present invention, if employed in the laptop personal computer 1200, presents a high-quality image display free from luminance non-uniformity and chrominance non-uniformity and supports an operating environment that is as good as the one provided by a desktop personal computer equipped with a CRT or the like.

Besides the electronic apparatuses described with reference to FIG. 29 through FIG. 32, examples of the electronic apparatus shown in FIG. 28 may be head-mounted display, liquid-crystal television, viewfinder-type or monitor direct-view type video tape recorder, car navigation device, electronic pocketbook, calculator, wordprocessor, workstation, portable telephone, television telephone, POS terminal, and devices having a touchpanel, and the like.

As described above, according to the present invention, a diversity of electronic apparatuses, with the liquid-crystal apparatus 200 incorporated, presenting a high-quality image display free from luminance non-uniformity and chrominance non-uniformity are provided.

The present invention is not limited to the above embodiments, and a variety of changes are possible within the scope of the present invention. For example, the switching element arranged for each pixel and active elements constituting the peripheral circuits such as a driving circuit are constructed of thin-film transistors (TFTs), but alternatively, the substrate may be constructed of a semiconductor substrate so that the switching element and active element may be constructed of MOS transistors formed on the surface of the semiconductor substrate. In this case, the pixel electrode is a reffective electrode, and the device is a reflective liquid-crystal apparatus.

The present invention is implemented not only in the above-described diversity of liquid-crystal apparatuses, but also in a diversity of display devices in which an image is presented by pixels to which a image signal is supplied through a plurality of data lines arranged on a substrate. For example, the present invention may be implemented in the data lines of self-emitting devices such as electroluminescence (EL), plasma display panel device (PDP), and field emission device (FED). The present invention may also implemented in the data lines of a mirror device (for example, DMD) in which an image signal is stored in a memory of respective pixels through data lines arranged on a substrate and a micro mirror of each pixel is modified in angle in response to the image signal.

Since the precharge signal is changed continuously or stepwise with time and is then supplied, as described above, according to the present invention, the electro-optical apparatus such as the liquid-crystal apparatus features reduced luminance (transmittance ratio) non-uniformity and reduced chrominance non-uniformity even if the signal waveform is distorted and delayed by the wiring resistance and parasitic capacitance of the precharge signal line and the like. When the liquid-crystal projector is constructed of a plurality of liquid-crystal apparatuses, an electronic apparatus presenting a high-quality display free from chrominance non-uniformity is provided. The charging and discharging current of the data lines by the precharge signal is spread with time and the peak value of the precharge current is lowered; thus, variations in the potential of the opposite electrode of the pixel, the potential of the capacitance electrode, and the GND potential of the circuit are reduced, noise radiation is controlled, and an erratic operation of the device is thus prevented.

What is claimed is:

1. An electro-optical apparatus having a plurality of data lines, and a plurality of pixels to which an image signal is supplied through the plurality of data lines, comprising:

a precharge signal line that transmits a precharge signal;

a precharge circuit that supplies the precharge signal to the plurality of data lines by a plurality of switching elements, each of the switching elements being arranged between each of the plurality of data lines and the precharge signal line, prior to the supplying of the image signal to the data lines; and a precharge signal supply circuit that generates the precharge signal of which the potential level changes continuously or stepwise and supplies the precharge signal to the precharge signal line, wherein the plurality of said switching elements are simultaneously in conductive state when a potential level of which the precharge signal is generated by the precharge signal supply circuit is changing.

2. The electro-optical apparatus according to claim 1, the precharge signal, supplied by the precharge signal supply circuit, being a signal waveform in which the signal voltage level of the precharge signal becomes progressively lower.

3. The electro-optical apparatus according to claim 1, the precharge signal, supplied by the precharge signal supply circuit, being a signal waveform in which the signal voltage level of the precharge signal becomes progressively higher.

4. The electro-optical apparatus according to claim 1, the precharge signal, supplied by the precharge signal supply circuit, being a pulse waveform.

5. The electro-optical apparatus according to claim 1, the precharge signal being supplied at opposite ends of a precharge circuit driving signal line for transmitting a driving signal to the plurality of switching elements of the precharge circuit and at both ends of the precharge signal line.

6. The electro-optical apparatus according to claim 1, the precharge circuit causing the plurality of switching elements to concurrently conduct.

7. The electro-optical apparatus according to claim 1, the precharge circuit causing the switching elements to conduct in a predetermined sequence prior to the timing of supplying the image signal to the data lines, and the precharge signal supply circuit changes the precharge signal continuously or stepwise within one horizontal scanning period.

8. The electro-optical apparatus according to claim 1, the precharge signal supply circuit changing the precharge signal waveform so that potential levels of data lines immediately subsequent to the supplying of the precharge signal are approximately equal to each other.

9. The electro-optical apparatus according to claim 1, further comprising a data line driving circuit that supplies the image signal to the plurality of data lines in a predetermined sequence in accordance with a shift operation of a bidirectional shift register, the precharge signal supply circuit modifying a change in the precharge signal in accordance with a direction of shifting of the bidirectional shift register.

10. An electronic apparatus comprising an electro-optical apparatus according to claim 1.

11. A driving method for an electro-optical apparatus having a plurality of data lines, and pixels to which an image signal is supplied through the plurality of data lines, comprising the steps of:

supplying a precharge signal to the plurality of data lines, through a plurality of switching elements connected to the plurality of data lines, prior to supplying of the image signal to the data lines; and changing continuously or stepwise the potential level of the precharge signal to be supplied to the plurality of data lines, wherein the plurality of said switching elements are simultaneously in conductive state when a potential level of which the precharge signal is generated by the precharge signal supply circuit is changing.

12. The driving method for an electro-optical apparatus according to claim 11, the precharge signal being a signal waveform in which the signal voltage level of the precharge signal becomes progressively lower.

13. The driving method for an electro-optical apparatus according to claim 11, the precharge signal being a signal waveform in which the signal voltage level of the precharge signal becomes progressively higher.

14. The driving method for an electro-optical apparatus according to claim 11, the precharge signal being a pulse waveform.

15. The driving method for an electro-optical apparatus according to claim 11, the precharge signal being supplied from opposite ends of a supply wiring that supplies the precharge signal to the precharge circuit.

16. The driving method for an electro-optical apparatus according to claim 11, the plurality of switching elements becoming concurrently conductive when the precharge signal is supplied.

17. The driving method for an electro-optical apparatus according to claim 11, the switching elements becoming conductive in a predetermined sequence prior to the timing of supplying the image signal to the data lines, and the potential level of the precharge signal changing continuously or stepwise within one horizontal scanning period.

18. The driving method for an electro-optical apparatus according to claim 11, the precharge signal supply circuit changing the precharge signal waveform so that the potential levels of the plurality of data lines immediately subsequent to the supplying of the precharge signal are approximately equal to each other.

19. The driving method for an electro-optical apparatus according to claim 11, wherein voltage-transmittance characteristics of the electro-optical apparatus big adjusted to be equalized on screen by adjusting the waveform of the precharge signal.

20. A driving method for an electro-optical apparatus having a plurality of data lines, and a plurality of pixels to which an image signal is supplied through the plurality of data lines, comprising the steps of:

supplying a precharge signal to the plurality of data lines through each of a plurality of switching elements connected to the plurality of data lines, prior to the supplying of the image signal to the data lines; and adjusting on-screen variations in voltage-luminance characteristics or transmittance characteristics of the electro-optical apparatus by adjusting the potential level of the precharge signal supplied to the plurality of data lines.

21. An electro-optical apparatus having a plurality of scanning lines, a plurality of data lines crossing mutually the plurality of scanning lines, and a plurality of pixels respectively connected to the scanning lines and the data lines, comprising:

a scanning line control circuit that selects the scanning lines;

a data line control circuit that outputs an image signal to the data lines each time one of the scanning lines is selected to supply the image signal to the pixel connected to the selected scanning line; and a precharge signal control circuit that outputs a precharge signal to the data lines prior to the output of the image signal to the data lines;

a polarity of the potential level of the image signal output to the data lines with respect to a reference potential being inverted every predetermined period, and the precharge signal control circuit outputting, to the data lines, a precharge signal having at least two potential levels, prior to the output of the image signal to the data lines, wherein the plurality of said switching elements are simultaneously in conductive state when a potential level of which the precharge signal is generated by the precharge signal supply circuit is changing.

22. A driving method for an active-matrix-type electro-optical apparatus having a plurality of scanning lines, a plurality of data lines crossing mutually the plurality of scanning lines, and a plurality of pixels respectively connected to the scanning lines and the data lines, comprising the steps of:

selecting successively the plurality of scanning lines;

outputting an image signal to the data lines each time one of the scanning lines is selected to supply the image signal to the pixel connected to the selected scanning line;

outputting a precharge signal to the data lines prior to the output of the image signal to the data lines; and inverting the polarity of the potential level of the image signal output to the data lines with respect to a reference voltage every predetermined period;

the precharge signal has at least two precharge signal potential levels, and the precharge signal is output successively so that one precharge signal potential level having a smaller potential difference from the potential at the data lines immediately prior to the output of the precharge signal is output first.

23. An electro-optical apparatus having a plurality of scanning lines, a plurality of data lines crossing mutually the plurality of scanning lines, and a plurality of pixels respectively connected to the scanning lines and the data lines, comprising:

a scanning line control circuit that selects the scanning lines;

a data line control circuit that outputs an image signal to the data lines each time one of the scanning lines is selected to supply the image signal to the pixel connected to the selected scanning line; and a precharge signal control circuit for outputting a precharge signal, having a continuously changing potential level, to the data lines prior to the output of the image signal to the data lines, wherein the plurality of said switching elements are simultaneously in conductive state when a potential level of which the precharge signal is generated by the precharge signal supply circuit is changing;

a polarity of the potential level of the image signal output to the data lines with respect to a reference voltage being inverted every predetermined period.

24. A driving method for an electro-optical apparatus having a plurality of scanning lines, a plurality of data lines crossing mutually the plurality of scanning lines, and a plurality of pixels respectively connected to the scanning lines and the data lines, comprising the steps of:

selecting successively the plurality of scanning lines;

outputting an image signal to the data lines each time one of the scanning lines is selected to supply the image signal to the pixel connected to the selected scanning line;

outputting a precharge signal to the data lines prior to the output of the image signal to the data lines; and inverting a polarity of the potential level of the image signal output to the data lines with respect to a reference voltage every predetermined period;

the precharge signal changing in voltage successively from a predetermined potential close to the potential level of the data lines immediately prior to the output of the precharge signal, wherein the plurality of said switching elements are simultaneously in conductive state when a potential level of which the precharge signal is generated by the precharge signal supply circuit is changing.

25. An electronic apparatus incorporating an electro-optical apparatus having a plurality of scanning lines, a plurality of data lines crossing mutually the plurality of scanning lines, and a plurality of pixels respectively connected to the scanning lines and the data lines, comprising:

a scanning line control circuit that selects the scanning lines;

a data line control circuit that outputs an image signal to the data lines each time one of the scanning lines is selected to supply the image signal to the pixel connected to the selected scanning line; and a precharge signal control circuit that outputs a precharge signal to the data lines prior to the output of the image signal to the data lines, while limiting an output current to within a predetermined value during the output of the precharge signal, wherein the plurality of said switching elements are simultaneously in conductive state when a potential level of which the precharge signal is generated by the precharge signal supply circuit is changing, a polarity of the potential level of the image signal output to the data lines with respect to a reference voltage being inverted every predetermined period.

26. A driving method for an electro-optical apparatus having a plurality of scanning lines, a plurality of data lines crossing mutually the plurality of scanning lines, and a plurality of pixels respectively connected to the scanning lines and the data lines, comprising the steps of:

selecting successively the plurality of scanning lines;

outputting an image signal to the data lines each time one of the scanning lines is selected to supply the image signal to the pixel connected to the selected scanning line;

inverting the polarity of the potential level of the image signal output to the data lines with respect to a reference voltage every predetermined period; and outputting, to the data lines, a precharge signal with an output current limited to within a predetermined value, prior to the output of the image signal to the data lines, wherein the plurality of said switching elements are simultaneously in conductive state when a potential level of which the precharge signal is generated by the precharge signal supply circuit is changing.

* * * * *